CROSSBAR TANDEM OFFICE FOR STEP-BY-STEP TELEPHONE AREAS

Filed May 6, 1949

26 Sheets-Sheet 1

INVENTORS W.T. HAINES
J.B. NEWSOM
BY John E. Cassidy
ATTORNEY

April 22, 1952 W. T. HAINES ET AL 2,594,014

CROSSBAR TANDEM OFFICE FOR STEP-BY-STEP TELEPHONE AREAS

Filed May 6, 1949 26 Sheets-Sheet 2

INVENTORS W.T. HAINES
J.B. NEWSOM
BY John E. Cassidy
ATTORNEY

CROSSBAR TANDEM OFFICE FOR STEP-BY-STEP TELEPHONE AREAS

Filed May 6, 1949 26 Sheets-Sheet 3

INVENTORS W.T. HAINES
J.B. NEWSOM
BY John E. Cassidy
ATTORNEY

April 22, 1952 W. T. HAINES ET AL 2,594,014

CROSSBAR TANDEM OFFICE FOR STEP-BY-STEP TELEPHONE AREAS

Filed May 6, 1949 26 Sheets-Sheet 4

INVENTORS W.T. HAINES
J.B. NEWSOM
BY John E. Cassidy
ATTORNEY

INVENTORS W.T. HAINES
J.B. NEWSOM
BY John E. Cassidy
ATTORNEY

CROSSBAR TANDEM OFFICE FOR STEP-BY-STEP TELEPHONE AREAS

INVENTORS W.T. HAINES
J.B. NEWSOM
BY John E. Cassidy
ATTORNEY

CROSSBAR TANDEM OFFICE FOR STEP-BY-STEP TELEPHONE AREAS

Filed May 6, 1949

INVENTORS W. T. HAINES
J. B. NEWSOM
BY John E. Cassidy
ATTORNEY

INVENTORS W. T. HAINES
J. B. NEWSOM
BY John E. Cassidy
ATTORNEY

CROSSBAR TANDEM OFFICE FOR STEP-BY-STEP TELEPHONE AREAS

Filed May 6, 1949 26 Sheets-Sheet 9

INVENTORS W.T. HAINES
J.B. NEWSOM
BY

ATTORNEY

INVENTORS W.T. HAINES
J.B. NEWSOM
BY John E. Cassidy
ATTORNEY

INVENTORS W.T. HAINES
J.B. NEWSOM
BY John E. Cassidy
ATTORNEY

CROSSBAR TANDEM OFFICE FOR STEP-BY-STEP TELEPHONE AREAS

Filed May 6, 1949 26 Sheets-Sheet 12

INVENTORS W.T. HAINES
J.B. NEWSOM
BY John L. Cassidy
ATTORNEY

CROSSBAR TANDEM OFFICE FOR STEP-BY-STEP TELEPHONE AREAS

INVENTORS W.T. HAINES
J.B. NEWSOM
BY John E. Cassidy
ATTORNEY

INVENTORS W. T. HAINES
J. B. NEWSOM
BY John E. Cassidy
ATTORNEY

INVENTORS W.T. HAINES
J.B. NEWSOM
BY John E. Cassidy
ATTORNEY

INVENTORS W. T. HAINES
J. B. NEWSOM
BY John E. Cassidy
ATTORNEY

CROSSBAR TANDEM OFFICE FOR STEP-BY-STEP TELEPHONE AREAS

INVENTORS W.T. HAINES
J.B. NEWSOM
BY John E. Cassidy
ATTORNEY

April 22, 1952 W. T. HAINES ET AL 2,594,014

CROSSBAR TANDEM OFFICE FOR STEP-BY-STEP TELEPHONE AREAS

Filed May 6, 1949 26 Sheets-Sheet 18

INVENTORS W. T. HAINES
J. B. NEWSOM
BY John E. Cassidy
ATTORNEY

INVENTORS W. T. HAINES
J. B. NEWSOM
BY John E. Cassidy
ATTORNEY

INVENTORS W. T. HAINES
J. B. NEWSOM
BY John E. Cassidy
ATTORNEY

INVENTORS W.T. HAINES
J.B. NEWSOM
BY John E. Cassidy
ATTORNEY

INVENTORS W. T. HAINES
J. B. NEWSOM
BY John E. Cassidy
ATTORNEY

INVENTORS W. T. HAINES
J. B. NEWSOM
BY John E. Cassidy
ATTORNEY

CROSSBAR TANDEM OFFICE FOR STEP-BY-STEP TELEPHONE AREAS

Filed May 6, 1949 26 Sheets-Sheet 24

INVENTORS W.T. HAINES
J.B. NEWSOM
BY John E. Cassidy
ATTORNEY

April 22, 1952 W. T. HAINES ET AL 2,594,014

CROSSBAR TANDEM OFFICE FOR STEP-BY-STEP TELEPHONE AREAS

Filed May 6, 1949 26 Sheets-Sheet 25

INVENTORS W. T. HAINES
J. B. NEWSOM
BY John E. Cassidy
ATTORNEY

CROSSBAR TANDEM OFFICE FOR STEP-BY-STEP TELEPHONE AREAS

Filed May 6, 1949

INVENTORS W. T. HAINES
J. B. NEWSOM
BY John E. Cassidy
ATTORNEY

Patented Apr. 22, 1952

2,594,014

UNITED STATES PATENT OFFICE 2,594,014

CROSSBAR TANDEM OFFICE FOR STEP-BY-STEP TELEPHONE AREAS

William T. Haines, Mountain Lakes, N. J., and James B. Newsom, Great Neck, N. Y., assignors to Bell Telephone Laboratories, Incorporated, New York, N. Y., a corporation of New York Application May 6, 1949, Serial No. 91,732

16 Claims. (Cl. 179—18)

This invention relates to telephone systems and has for its object to facilitate the establishment of connections between subscribers in offices within exchange areas.

Telephone switching offices within an exchange area may be either connected by direct trunks or by trunks extending through a tandem office. Whether direct trunks or tandem trunks are provided for use in a particular connection is primarily an economic matter, dependent on traffic density, although tandem trunking may also serve to supplement direct trunking to increase the reliability of the service.

The present invention features a tandem sender at a tandem office interconnected into a system which may include various well known cooperating equipment such as different types of originating equipment including senders at originating offices and which may include for instance cross bar switching equipment at the tandem office. The tandem office may include trunk terminating equipment for trunks incoming to the tandem office from the originating offices, sender link and controller equipment to interconnect the trunk to the tandem sender, tandem markers, marker connectors, trunk links and connectors and office links and connectors for extending the call under the guidance of the sender with the cooperation of the marker over outgoing tandem trunks to the terminating facilities.

The terminating facilities at the end of the outgoing tandem trunk may be of three main different classifications. The termination may be directly to step-by-step selectors. It may be to a terminating sender in a terminating office. It may be to a straightforward desk or to a manual office telephone operator's position. In this last case the connection is established in response to the reception by the sender of three trains of pulses only, corresponding to the office code, which establishes a connection between two operators. If the call is to be further extended the information is passed verbally. In the case of the first two classes of calls, the office code and numerical portion of the number are both pulsed into the sender. The number of trains of pulses which are received by the sender may vary in any cycle and the number of trains of pulses which are outpulsed in response to the received train may vary dependent on the information received by the sender. Under certain circumstances, for instance, six trains of pulses are always received. Under other circumstances seven trains of pulses are always received. Under yet another condition either six trains of pulses or seven trains of pulses may be received and the sender upon receiving the sixth train has to introduce a delay before proceeding, during which delay a seventh pulse may be received if there are in fact seven trains of pulses in the incoming group in the particular cycle.

With respect to outpulsing from the sender, in the case of straightforward routing, overflow or vacant codes, no digits are outpulsed. For other classes four, five or six digits are outpulsed and for each of these the outpulsing may be through two different loops established in the sender, or the pulsing may be battery and ground pulsing.

There is another feature of the invention. Under certain circumstances, upon the reception of a two-digit office code the sender is conditioned for and receives a third office code which is added by the originating operator.

Another feature is the addition by the marker of an extra digit by controlling a combination of relays within the sender which sets up any digit from 0 to 9 as the added digit as required by coding information received by the sender.

Another feature is the establishing of a short delay interval on certain classes of service before the outgoing tandem trunk is tested to insure the release of terminal equipment after a previous call.

These and other features of the invention will be more clearly understood from a consideration of the following description in connection with the accompanying drawings which disclose a preferred form in which the invention is presently incorporated. It is to be understood, however, that the invention may be incorporated in other forms which will readily suggest themselves to those skilled in the art from a consideration of the disclosure of the present embodiment.

In the drawings:

Figs. 4 to 26 show the tandem step-by-step sender in which:

Figs. 4, 5, 6 and 7 show the cross bar register;

Figs. 8 and 9 show the incoming frame group designating relays and the register hold magnet control relays;

Fig. 10 shows the connections incoming to the sender from the sender link and control circuit and the relays which control these connections;

Figs. 11 and 12 show the digit pulse counting and control relays and the off-normal ground supply relay;

Figs. 13, 14 and 15 show the relays which respond to pulses incoming to the sender, supplementary off-normal relays, start dialing signal circuit and dial tone circuit, sender release and other control relays;

Fig. 16 shows the class of service relays;

Figs. 17 and 18 shows the sender progress timing relays, timing control circuit and other relays;

Fig. 19 shows the relays which effect connection of a sender through the marker connector to a marker and the relay which responds when the marker is connected, together with the trouble release relays and marker trial relays;

Figs. 20 and 21 show the outpulse counting relays and other relays;

Fig. 22 shows the marker selection relays which control the number and character of the pulses to be outpulsed by the sender for different terminations;

Figs. 23 and 24 show the outpulse circuit and the control relays therefor;

Figs. 25 and 26 show a circuit which cooperates with Fig. 22 in response to the marker control to establish the number of digits to be outpulsed.

Figure 1:
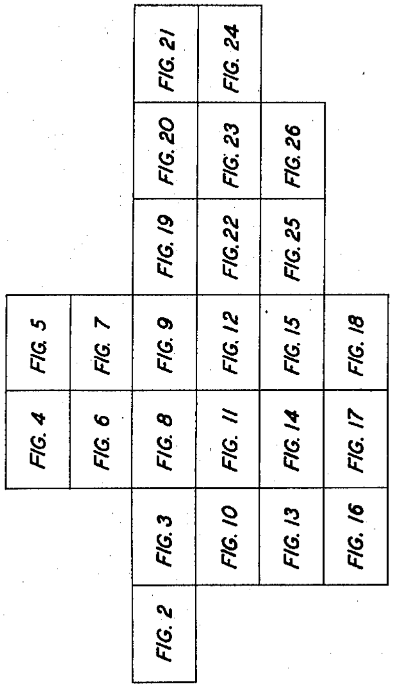
Fig. 1 shows the manner of arranging Figs. 2 to 26, inclusive.

No details of the originating and terminating offices have been shown. Reference is made here to United States Patent No. 2,089,921 granted March 18, 1941, to W. W. Carpenter for a complete showing of the originating circuits at a cross bar office. Stop-start pulsing arrangements such as are required to control outpulsing from the present sender to successive step-by-step selectors are disclosed in United States Patent No. 2,209,777, granted July 30, 1940 to R. E. King, particularly in Figs. 14 to 18, inclusive, thereof. The fundamental operation of step-by-step systems is described in Automatic Telephony, by A. B. Smith and W. L. Campbell, second edition, published in 1921 by McGraw-Hill Book Company, particularly chapter 3 thereof.

*Description of operation—Transient connections to other circuits*

Each group of senders is connected to the sender link and control circuit by a plurality of wires which are connected into any one individual sender for a short time when it is first seized for service. These are leads 311, 312 and 313, which assist the link control circuit in its functions; twelve leads, numbered 320 to 331, for registering in the sender the number of the incoming trunk frame; the class of service leads numbered 340 to 346; and lead 318 which supplies the initial operating ground for the sender link hold magnets.

Each sender is individually connected to the sender link and control circuit by eleven leads 302 to 310, 315 and 316.

Figure 2:
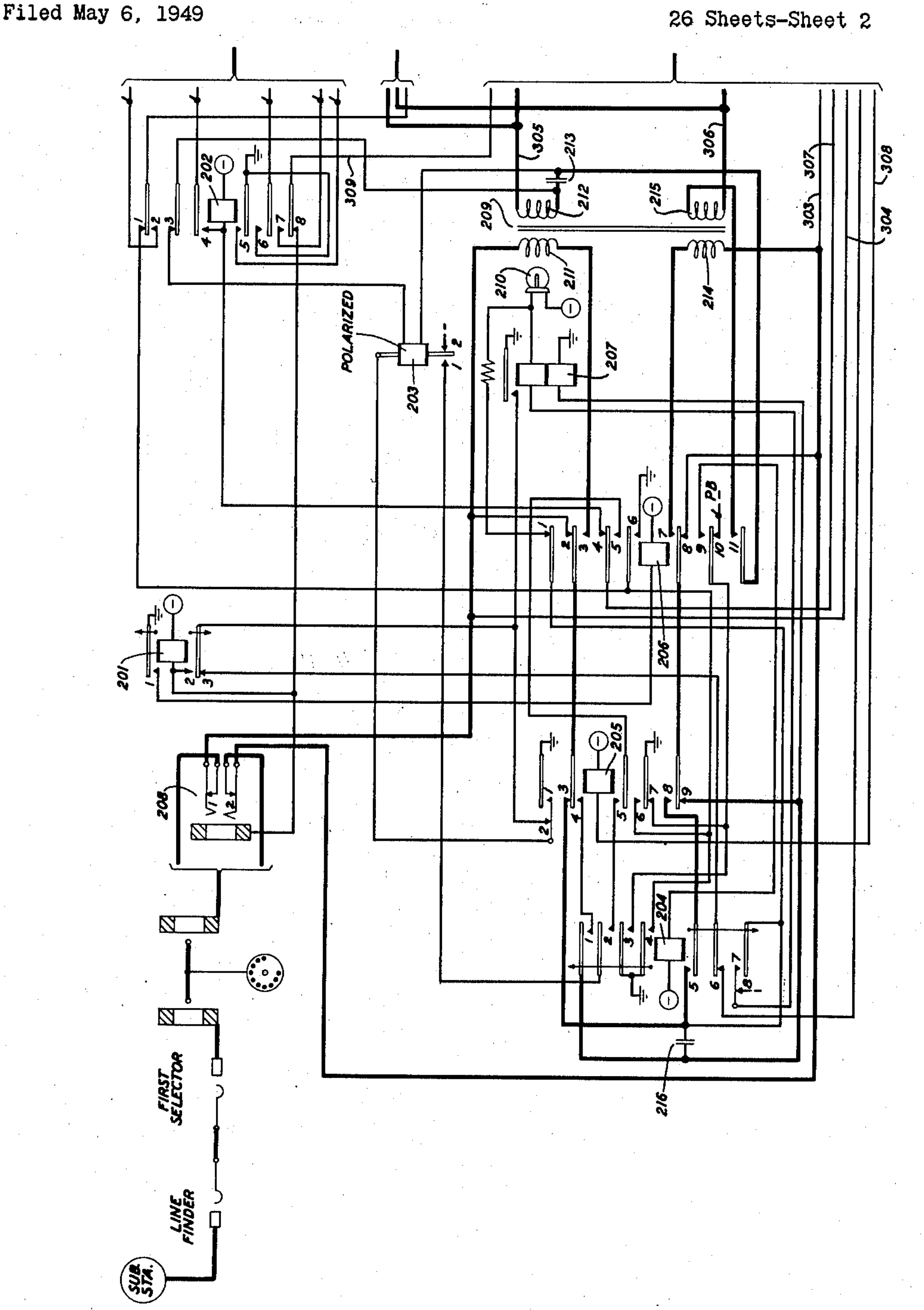
Fig. 2 shows in diagrammatic form equipment at an originating office as well as an incoming trunk at a tandem office.
Figure 3:
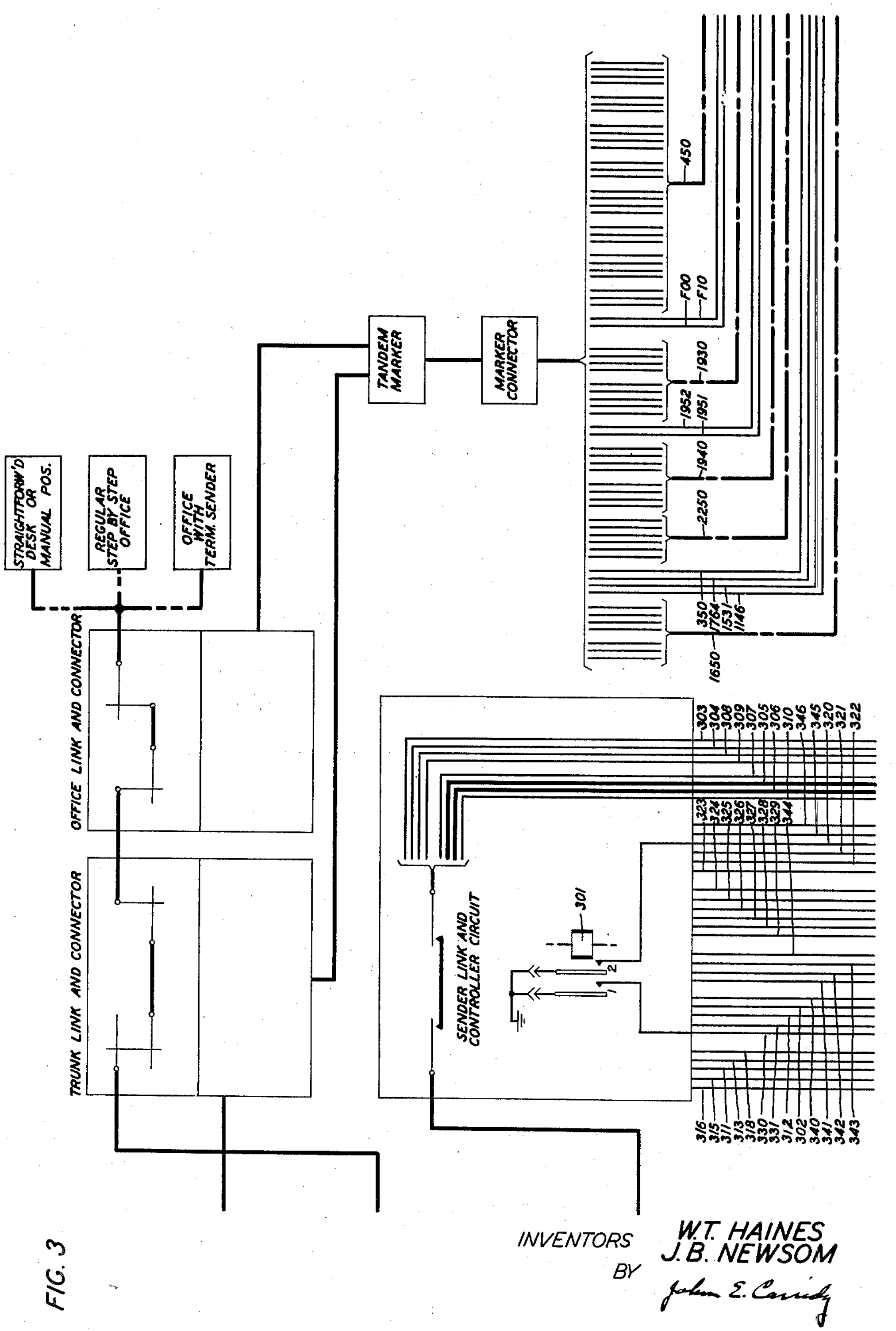
Fig. 3 shows a trunk link and office connector, an office link and connector, both indicated schematically, connecting to a plurality of terminating offices indicated by rectangles, a tandem marker and a marker connector, both also indicated by rectangles and a sender link and controller circuit indicated schematically.

The tip and ring leads 303 and 304, respectively, are connected straight through the contacts of the sender link and controller circuit to the contacts of the incoming trunk circuit shown in Fig. 2 and serve to transmit dial pulses from the originating end as well as dial tone when required and start dialing signals.

Leads 308, 309 and 305 are also connected through the sender link and controller circuit to the incoming trunk and serve for mutual control while the sender is engaged.

Lead 310 is connected through the sender link and controller circuit switch contacts to hold the switches operated while the sender is engaged.

Lead 302 operates relays in the sender while the link control circuit is engaged in seizing the sender, principally for the purpose of connecting the common leads into the sender.

While the sender is either engaged or plugged busy it operates a relay individual to itself in the link control circuit over lead 315 and that relay returns an indication of its own operation to the sender over lead 316.

The sender is connected through the tandem marker connector to a tandem marker for a fraction of a second on each call. A plurality of wires are involved in this connection for mutual control and transmitting information in both directions.

Leads 305 and 306 are used for pulsing toward the called end. Lead 305 is used for mutual control between marker, trunk and sender and lead 309 for sending a trouble release from the marker by way of the trunk or to signal the trunk to assume a cut-through condition.

*General method of operation*

When a sender is seized by a sender link and control circuit to serve a call, it immediately registers the class of incoming trunk and the number of the incoming frame involved by indications over the frame number leads 320 to 331 and the class leads 340 to 344 from the link control circuit. The sender then sends a start dialing signal and registers all of the digits dialed using the tip and ring leads 303 and 304, respectively. When these digits are registered in the sender, the sender connects to a marker and sends the marker these digits representing the office code, class of trunk, frame number and other information and the sender receives back such information as it requires for completing its part in the selection of the called station.

When the marker has established a connection through the trunk link frame and office link frame, it notifies the sender and the sender proceeds. The sender first tests the outgoing trunk to make sure it is normal at the distant end, except on straightforward class. Following trunk test 4, 5 or 6 trains of dial pulses are outpulsed, the trunk is advanced to the cut-through position and the sender releases itself.

If the called end returns a premature reversed battery because of a reversed trunk, for example, the sender calls a marker again and notifies it to try again using a different trunk if possible.

If the call is abandoned the sender immediately releases itself and the sender link.

A timing circuit in the sender monitors its progress and initiates the proper disposition of the call, if no digits are dialed, if an insufficient number of digits are dialed, if the trunk is open or if the call fails because of any other trouble condition.

*Sender seized and held for a service connection*

When an incoming trunk calls for a sender, the sender link control circuit chooses an idle sender and grounds its individual lead 302 thereby operating relays 1001 and 1002 in the sender. The path extends from ground, not shown, connected to lead 302 in the sender link control circuit and into the sender. A branch extends from lead 302 through the winding of relay 1001 to battery. Lead 302 extends through contact 1 of relay 603 to lead 611 which passes through the winding of relay 1002 to battery. Relays 1001 and 1002 operate. When operated relay 1001 connects common leads 311, 312 and 313 through its contacts 1, 6 and 2 respectively, into the selected sender and operates the armature of relay 1304 to engage its contact 2. The path for the operation of relay 1304 extends from battery through the bottom winding of relay 1304, resistance 1309, conductor 1415, contact 4 of relay 1410, lead 1709, contact 2 of relay 1701, lead 1006, contact 2 of relay 1003, lead 1005 and contact 7 of relay 1001 to ground. Relay 1304 is operated in this manner, as will become more apparent hereinafter, to prevent the link circuit from timing out if the call is abandoned just after the link passes the point where it can recognize the wipe out and before the sender is in condition to recognize it.

After grounding lead 302, the link control circuit operates the link switches which close eight individual leads to the sender; seven of these leads 303 to 309 are connected straight through from sender to incoming trunk. The eighth, lead 310, is connected to the hold magnets, not shown, of the link switches.

The operating ground for the sender link switch hold magnet is supplied in the link control circuit and extends into the sender over the individual lead 310 and back through contact 1 of relay 1001 through lead 311 into the sender link control circuit through the hold magnet winding to battery energizing the magnet. The completion of the circuit through the sender satisfies the sender link control circuit that the sender is ready for the next step. After making a test to guard against a double connection, the link circuit then grounds common lead 312 and so operates the main off-normal ground supply relay 1111, after relay 903 has operated as described later. The circuit extends from ground in the link control circuit through lead 312, contact 6 of relay 1001, lead 314, contact of relay 801, contact 4 of relay 802 and contact 4 of relay 803 in parallel, lead 809, contact 3 of relay 903, after relay 903 operates in a manner to be described, lead 911 and the winding of relay 1111 to battery operating relay 1111.

Relay 1111 operated, established a circuit from ground through contact 1 of relay 1111 and individual lead 315, which extends into the sender link control circuit. As a result of this the link control circuit in turn applied ground through individual lead 316 which extends through contact 2 of relay 1107, after relay 1107 operates in a manner to be described, lead 1116 and the windings of relays 1302 and 1301 in series to battery operating relays 1302 and 1301.

Relay 1302 operated extends the ground supplied through contact 2 of relay 1107 and conductor 1116 through contact 1 of relay 1004, lead 1320, through contact 2 of relay 1102 and lead 310 into the link circuit to hold the link switch hold magnets after the link control circuit has released, and it also extends ground from lead 1116 through contacts 4 and 3 of relay 1302 through lead 317, contact 2 of relay 1001 to common lead 313 which extends into the link control circuit to release the link control circuit.

The release of the link control circuit breaks ground from lead 302 and relay 1001 releases to break the connection of the common leads into the sender, but the sender remains connected to the incoming trunk by the individual leads through the sender link switches until it has completed its work. Relays 1111 and 1302 lock each other up. The locking path extends from battery through the windings of relays 1301 and 1302, contact 5 of relay 1302, conductor 1420, contact 2 of relay 1411, conductor 1120 through contact 6 of relay 1111, all in parallel with a path from battery through the winding of relay 1111, and the circuit continues through lead 911, lead 1124, contact 1 of relay 1302, conductor 1142 and contact 3 of relay 1111 to ground. Relays 1111 and 1302 also ground off-normal ground leads to hold other relays and the cross-bar register magnets in the sender, hold the sender link switches by connecting lead 310 through contact 2 of relay 1302, contact 1 of relay 1004, conductor 1116, contact 2 of relay 1107 and conductor 316 which extends to ground in the control circuit. Conductor 315 which is grounded at contact 1 of relay 1111 over a path heretofore traced guards against the intrusion of other links or the test circuit. The operation of relay 1301 starts the timing in a manner to be explained hereinafter, which will reverse the tip and ring conductors 303 and 304 extending to the originating end as a start dialing signal. A path may be traced from battery through the winding of relay 1410, conductor 1424, contact 6 of relay 1302 to back contact 2 of relay 1303. If relay 1303 is once operated and then releases before the completion of a call relay 1410 will operate.

The operation of relay 1111 extends the tip conductor from the originating end through the trunk and the control circuit into the sender over conductor 303 through contact 10 of relay 1111, continuing over conductor 303 through contact 5 of relay 1412, contact 6 of relay 1409, upper right-hand winding of the repeating coil, contact 2 of jack 1408, conductor 1426, middle winding of relay 1304, conductor 1428, and contact 1 of jack 1408 to battery. The ring conductor from the originating end extends through the trunk and the control circuit and into the sender over conductor 304, through contact 11 of relay 1111, contact 1 of relay 1412, contact 1 of relay 1409 and the lower right-hand winding of the repeating coil to ground. Relay 1304 is held over this closed loop circuit.

Relay 1304, operated to engage its contact 2, operates relays 1303 and 1109 over a path which may be traced from battery through the winding of relay 1303, lead 1323, winding of relay 1109, lead 1125, contact 5 of relay 1410, lead 1432, contact 2 of relay 1304, lead 1322, contact 7 of relay 1206, lead 1215, lead 1515, lead 1321, lead 1135 and contact 2 of relay 1111 to ground. Relay 1303 operated, operates relay 1107. The path extends from ground through contact 1 of relay 1303, lead 1310 and the winding of relay 1107 to battery. With relay 1107 operated the path heretofore traced from the control circuit through conductor 316 and contact 2 of relay 1107 through conductor 1116 and the windings of relays 1302 and 1301 is closed and these relays operate as heretofore described.

*Sender seized and held for test*

All of the individual and common leads from the sender and the group of five senders which run to the sender link and control circuit run also to the sender test circuit except the individual leads 315, 316, 318 and 302.

The test circuit seizes a sender for test in the same way that the sender link and control circuit seizes it for service, except that it demands connection with a particular sender instead of choosing an idle sender more or less at random. Before it can seize the desired sender, the latter must be idle and to determine this condition it makes a test on lead 310, which is not made when the sender is seized for a service connection.

If the sender is engaged, lead 310 is grounded by relay 1302 through its contact 2 as heretofore traced. If the sender is made busy the lead 310 is connected to resistance battery. The test circuit tests lead 310 for battery and then for ground. Finding neither, it connects to the sender; otherwise it waits until battery or ground disappears.

When the test circuit seizes the sender the relays operate as on a service call.

*Sender released after service or test*

When a connection has been established or a test completed the release of sender and link is effected by the operation of relay 1411 which with relay 1107 released opens the circuit holding relay 1111 and relay 1302 locked to each other. The operation of relay 1411 depends upon the prior operation of relay 1206.

On a completed step-by-step call the operation of relay 2007 following units pulsing, in a manner to be described, establishes a circuit from ground through contact 2 of relay 2007, lead 2059, contact 1 of relay 2602, lead 2332, contact 2 of relay 2306, relay 2306 being operated in a manner to be described, lead 1340, contact 4 of relay 1301 and lead 1240 through the winding of relay 1206 operating relay 1206.

On a straightforward class call to an operator, vacant code trunk, etc., relay 2207 is operated locally, in a manner to be described, as soon as the marker has established connection to the trunk. Relay 2007 operated, operates 1206 over a path from ground through contact 3 of relay 2207, contact 1 of relay 2209, lead 1340, contact 4 of relay 1301, lead 1240 and the winding of relay 1206 to battery.

The operation of relay 1206 establishes a path from battery through the winding of relay 201 in the trunk circuit, per Fig. 2, contact 8 of relay 202, lead 309, through the sender link and controller circuit, and continuing through lead 309 through contact 2 of relay 1501, lead 1535, contact 4 of relay 1411, contact 8 of relay 1410, lead 1441, contact 6 of relay 1206, lead 1215, lead 1515, lead 1135 and contact 2 of relay 1111 to ground, operating relay 201 in the trunk. The operation of relay 201 in turn operates relay 206 over an obvious circuit. Relay 205 is operated over lead 308, contacts 3 of relays 1411 and 1412, leads 1435, lead 1321, lead 1135 and contact 2 of relay 1111 to ground. Relay 204 operates through contact 9 of relay 206 and contact 7 of relay 205 before relay 205 operates and then locks through its own contact 3. The armature of relay 203, which is a polar relay, is actuated to engage its contact 1, after the operation of relay 206, by the conditions imposed on leads 305 and 306 in the sender to be made apparent hereinafter. Relay 1413 is operated from battery through the winding of relay 1413, lead 1445, contact 8 of relay 1206, lead 1245, contact 4 of relay 1501 and lead 307 which extends through the sender link and controller circuit, contact 5 of relay 206, contact 5 of relay 205, contact 2 of relay 204, contact 1 of relay 203 and contact 1 of relay 205 to ground. The operation of relay 1413 establishes a circuit from ground through contact 2 of relay 1413 and the winding of relay 1412 to battery operating relay 1412 which locks through its contact 4 and leads 1321 and 1135 to ground on contact 2 of relay 1111. The operation of relay 1412 by opening its contact 3 releases relay 205 in the trunk circuit per Fig. 2. The release of relay 205, by opening its contact 5, releases relay 1413. The release of relay 1413 establishes a path from ground through contact 1 of relay 1413, contact 2 of relay 1412, lead 1447 and the winding of relay 1503 to battery, operating relay 1503. Trunk closure is maintained as long as relay 201 remains operated. Relay 1502, which is operated in a manner to be described, is released when relay 1503 operates, by the opening of contact 1 of relay 1503. Relay 1502 is a slow-to-release relay to afford time for the operation of relay 207 in the trunk before the sender releases.

The operation of relay 1206, by opening its contact 7, also removes ground from the armature of relay 1311 which supplies ground to contacts 1 and 2 of relay 1311 depending on the position to which relay 1311 is operated. This permits relay 1303 and relay 1107 to release early. Relay 1206 operated, also breaks the locking circuit for relays 802 and 803, at contact 2 of relay 1206, and breaks the circuit of the frame hold magnet 603 at contact 1 of relay 1206 so that all of the hold magnets release in cascade.

*Sender made busy for maintenance*

The sender is made busy when it is in trouble or for other maintenance purposes by inserting a make-busy plug in the make-busy jack, not shown, in the sender make-busy frame. This operates relay 1702 over a path from battery through the winding of relay 1702, and lead 1761 which extends to ground through the make-busy jack. The operation of relay 1702 also establishes a circuit from ground through contact 1 of relay 1702, leads 1763 and 315 which extend into the sender link and control circuit. Ground on lead 315 whether from make-busy relay 1702 or from off-normal relay 1111 serves as a busy indication. Relay 1702 also establishes a circuit from battery through resistance 1708, contact 2 of relay 1702, and lead 310 which extends into the sender link and controller circuit to serve as a plugged busy signal to the sender test circuit.

If a marker connector is made busy all of the senders served by that connector are made busy by grounding their make-busy leads, such as 1764, from the connector. This has the same effect on each sender as inserting a plug in the make-busy jack.

The grounding of lead 315 when the sender is made busy not only prevents link circuits from seizing it but it also causes lead 316 to be grounded from the link circuit. In order that this shall not operate relay 1302 or build it up if the sender is plugged busy while engaged on a call, lead 316 is carried through a front contact, contact 2 of relay 1107. Relay 1107 normally releases at the end of a call and relays 1302 and 1111 are therefore permitted to release.

*Incoming frame and class of trunk registered in sender*

Figure 6:
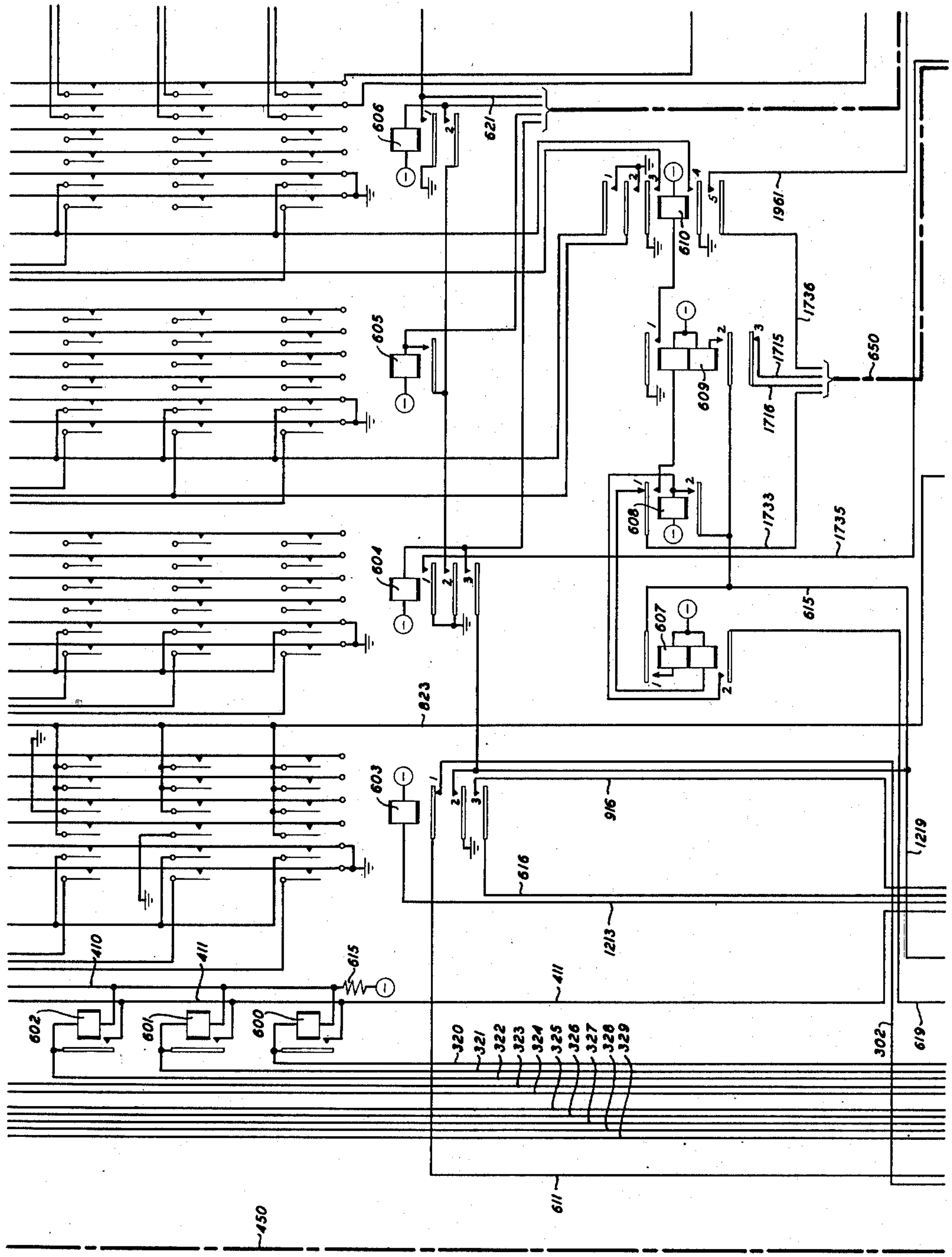
Figure 7:
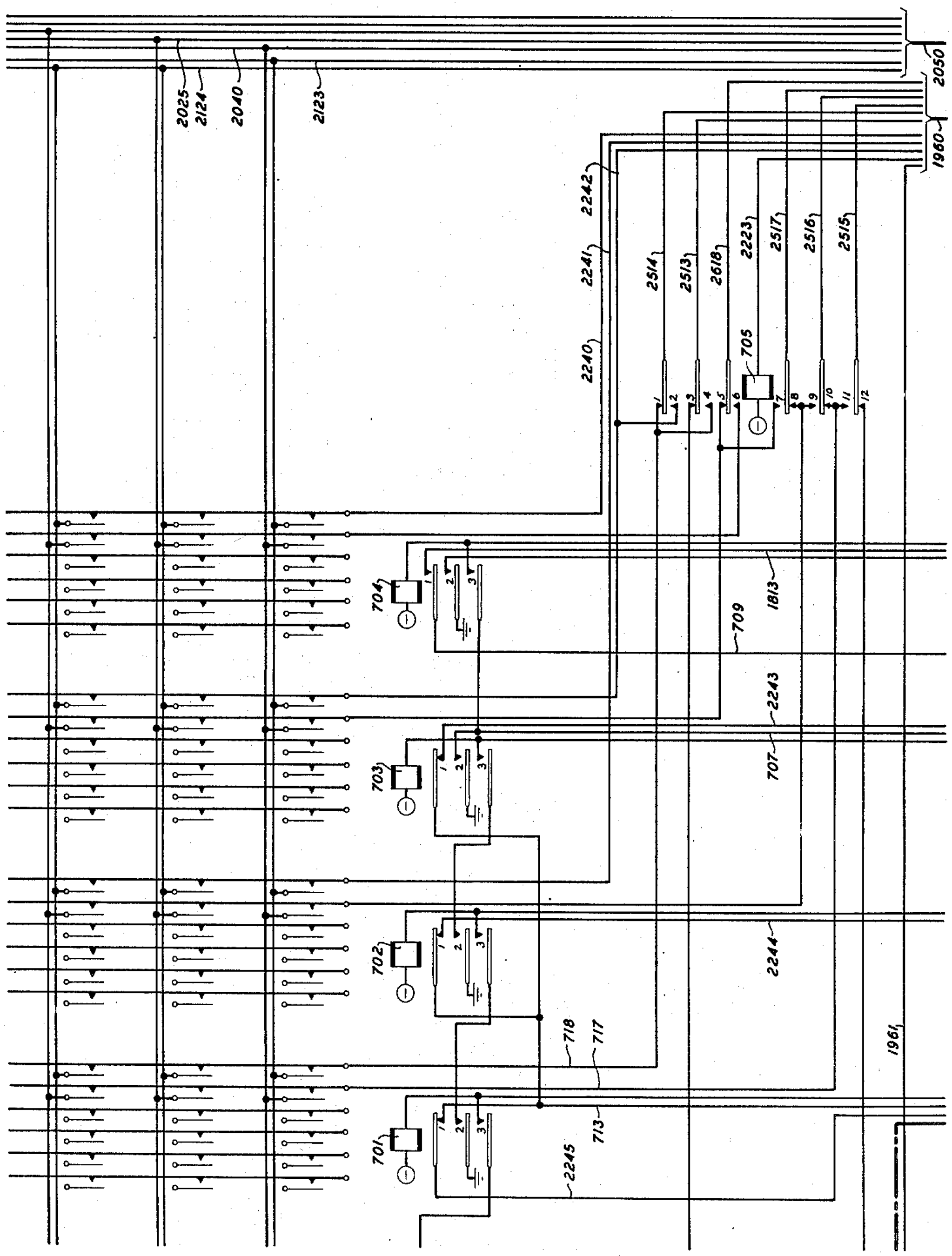
Figure 8:
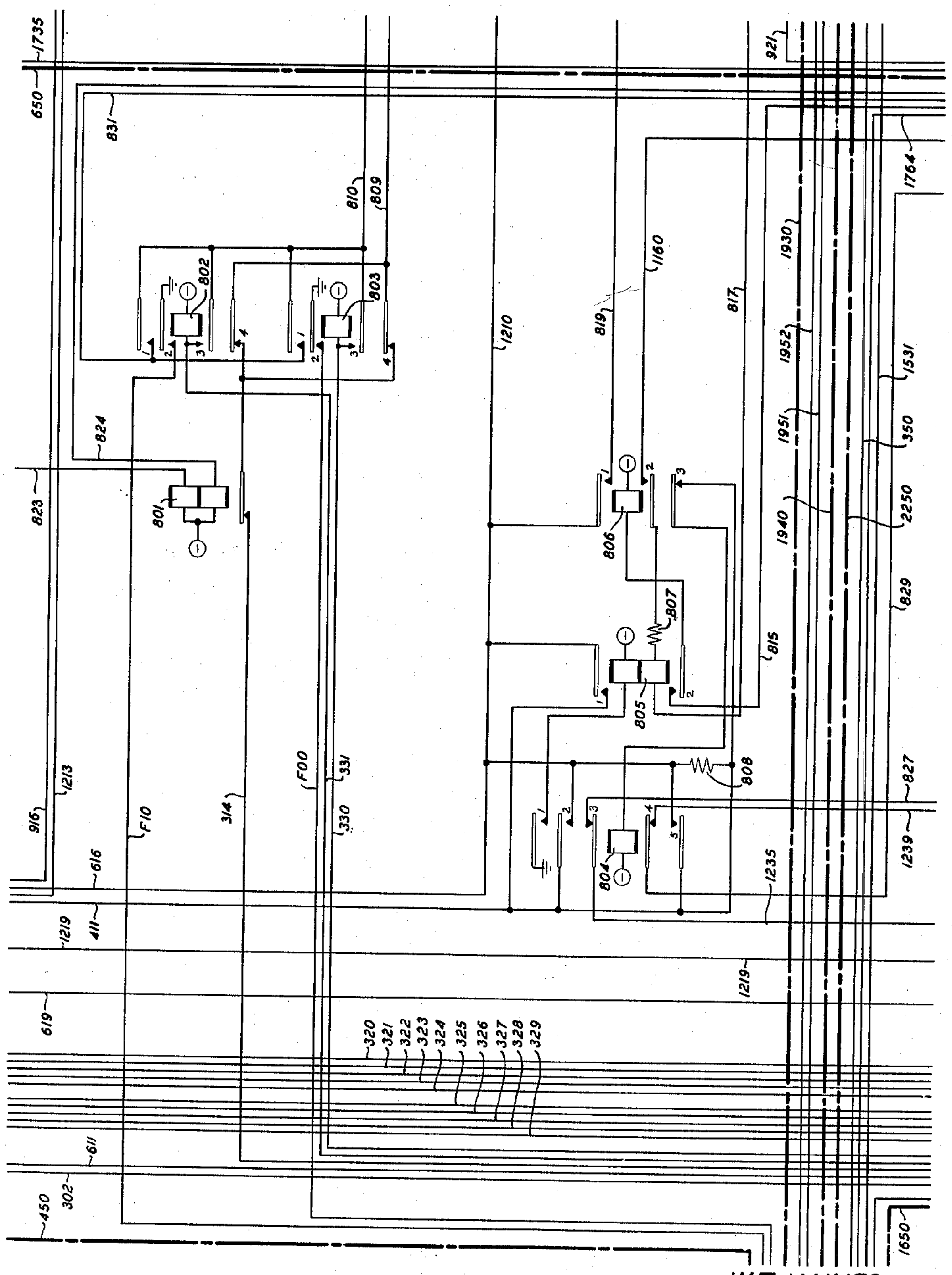
Figure 9:
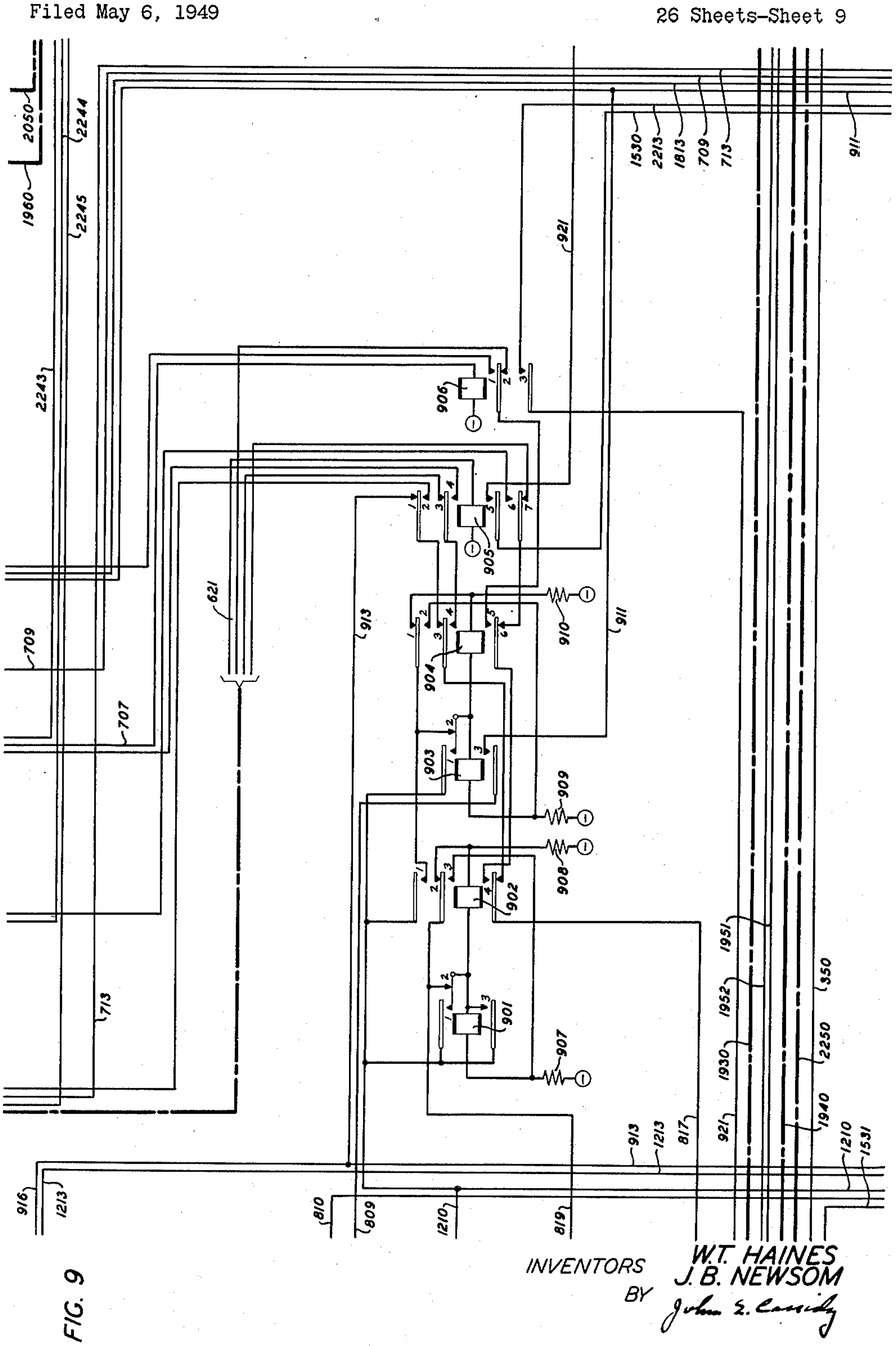
Figure 10:
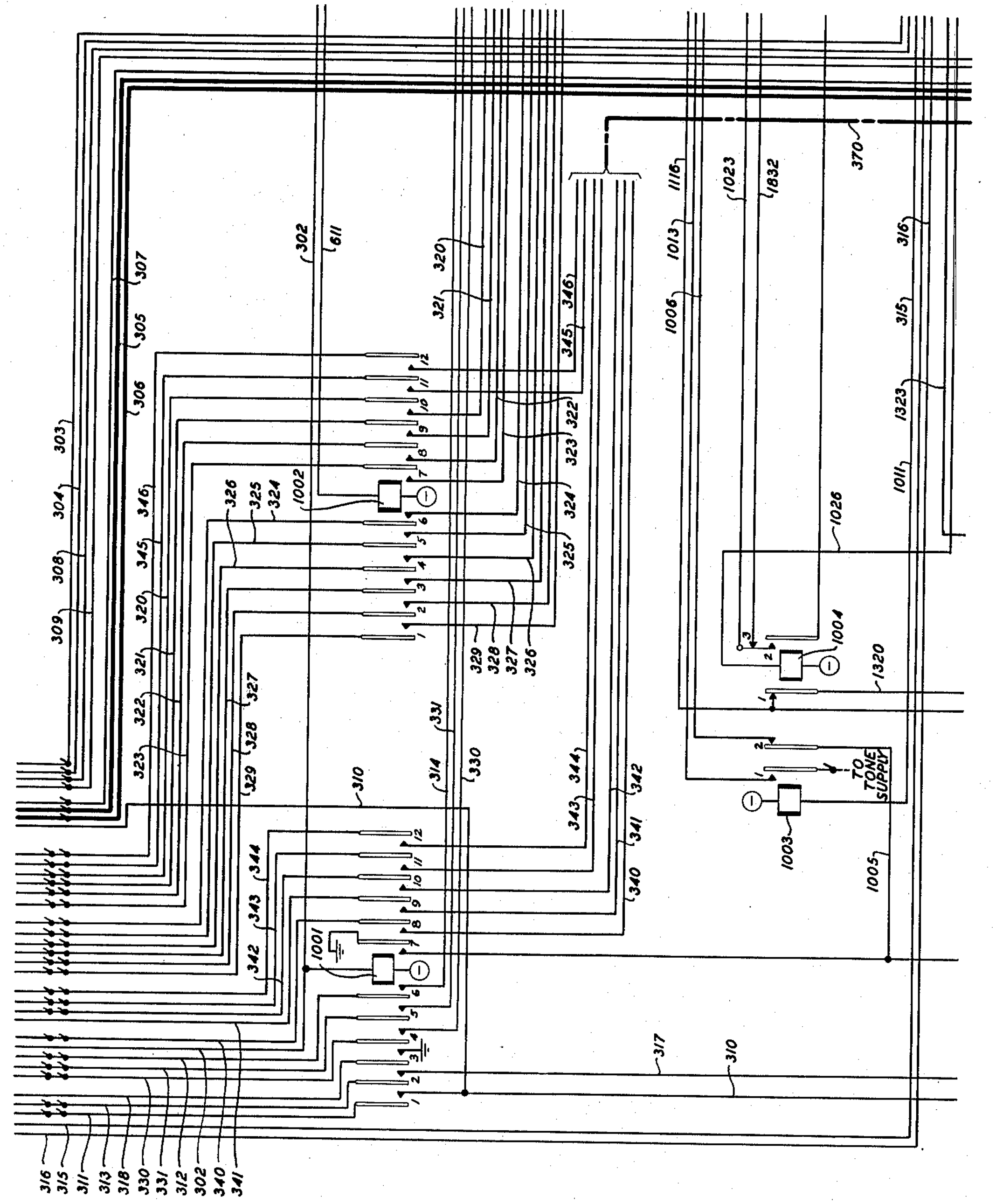
Figure 11:
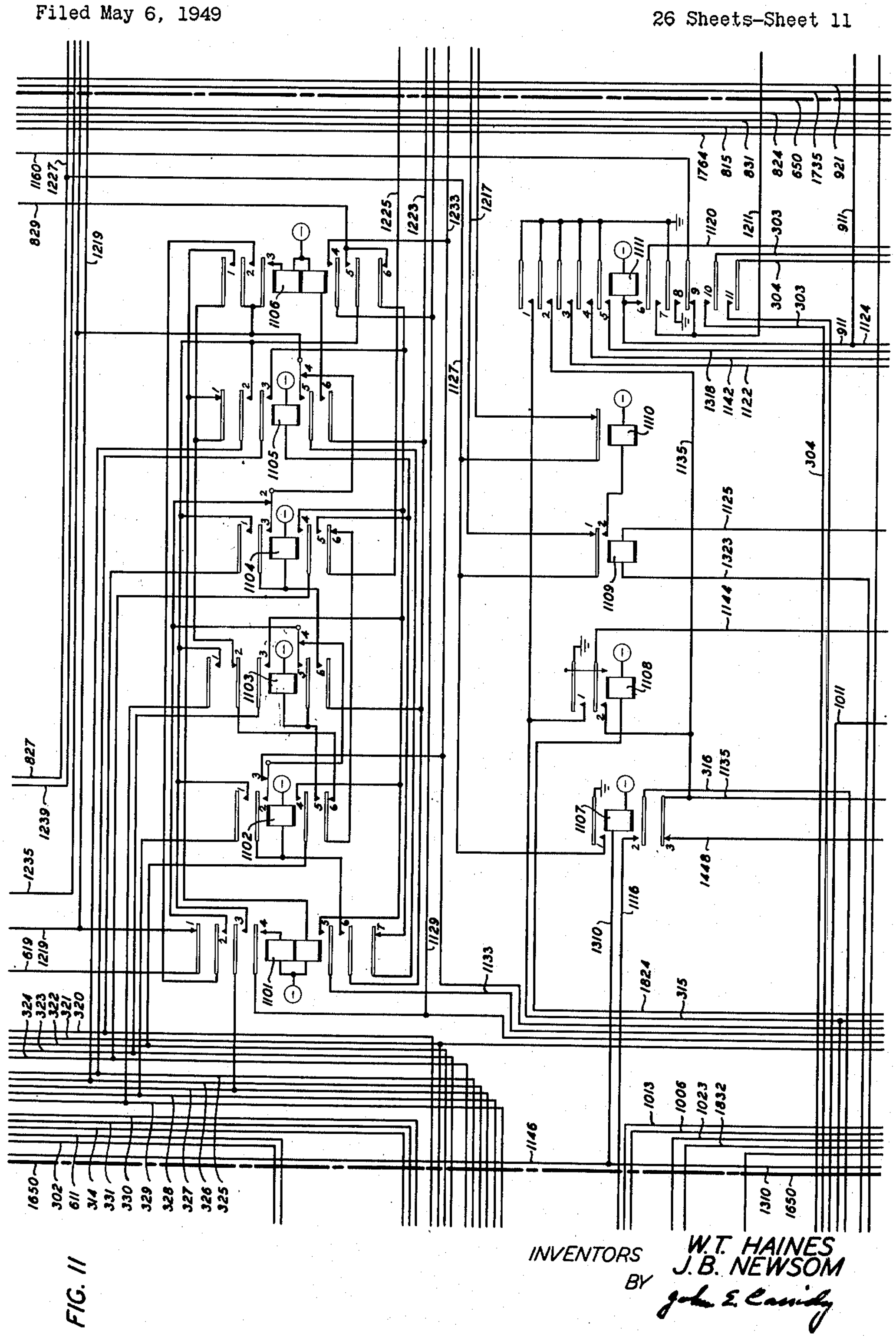
Figure 12:
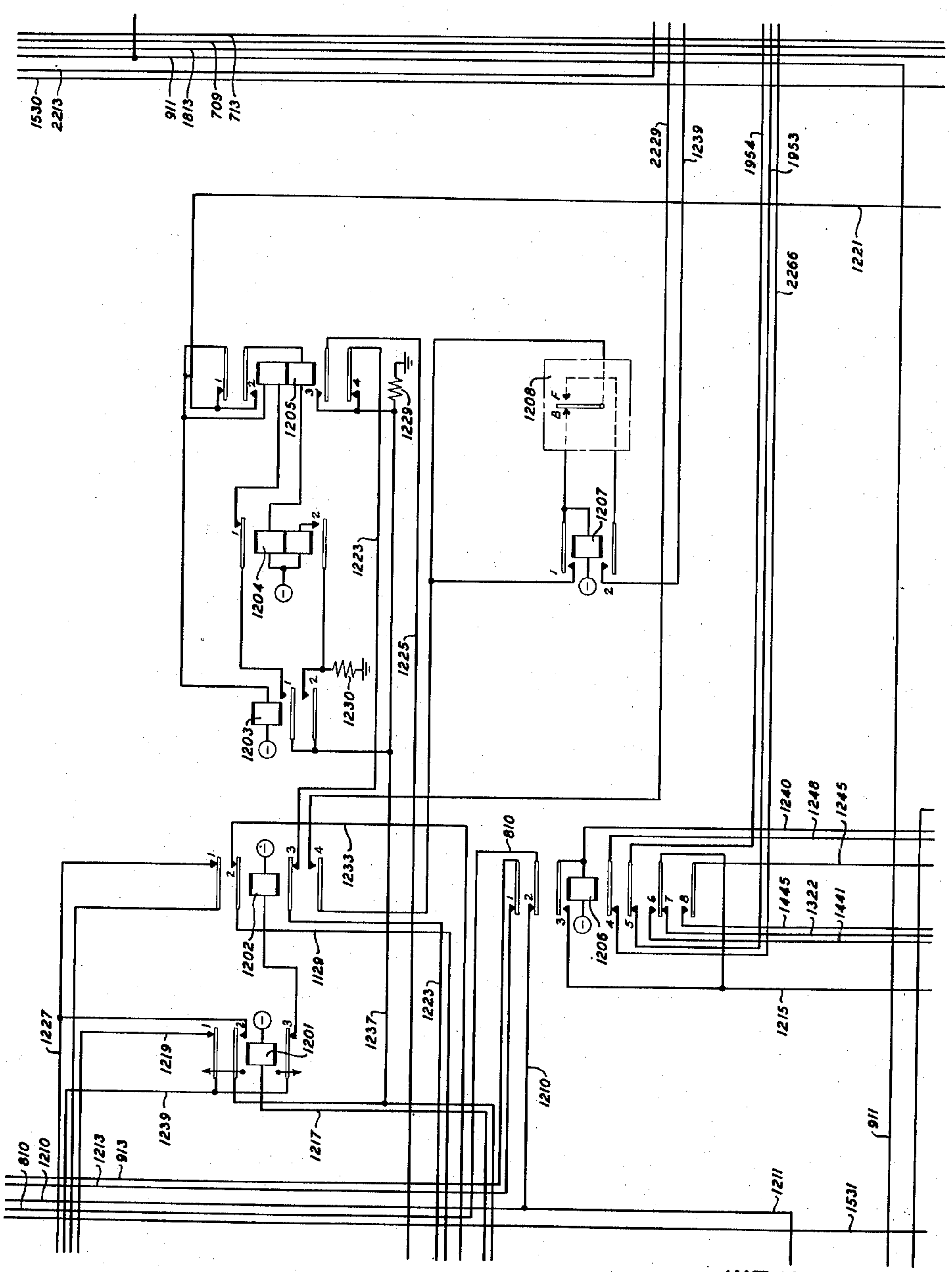

This section describes how the number of the incoming frame and class of trunk are registered in the sender when it is first seized. The frame indication comes from the sender link and control circuit in the form of ground on one of the ten leads designated 320 to 329, and on one of the two leads 330 and 331 and is registered on the left-hand or frame vertical of the cross bar register in Figs. 4 and 6. The class of trunk information comes from the sender link through contacts of relay 1001 over two leads of the group 340 to 346. When the sender is under test, the test circuit sends to the sender a frame and class identification by means of keys set up in the test circuit.

When the sender is first seized and relays 1001 and 1002 operate, they connect the above-identified leads into the sender circuit of the present invention. Before relay 1111 operates, one or the other of relays 803 or 802 operates depending on whether the units digit of the frame involved is in the group numbered under or over ten, respectively. To effect this, lead 330 or lead 331 is grounded and the circuit extends through contact 4 or contact 5 of relay 1001 and through the winding of relay 803 or 802, respectively to battery operating one or the other of these relays. Before relay 1111 operates, the off-normal ground lead connected to relay 804 is grounded from the link through the locking contact 3 of relay 803 which, it will be assumed, is the relay operated, through conductor 810, contact 2 of relay 1206, conductor 1210, resistance 808, contact 3 of relay 806 and the winding of relay 804 to battery. When relay 1111 operates, relay 803 will lock through its contact 3, through lead 810, contact 2 of relay 1206, lead 1211 and contact 7 of relay 1111 to ground. One of the ten leads 320 to 329 is grounded, according to the units digit of the incoming frame number, to operate a corresponding one of the ten select magnets, 600 to 609, of the cross bar switch, passing its operating ground on to operate relay 804. It will be assumed that the units digit of the incoming frame is 5 in which case ground will be connected to lead 325 in the link circuit and the circuit will extend through lead 325, through contact 5 of relay 1002 and continue through lead 325 through the winding of select magnet 405, conductor 410 and resistance 615 to battery operating select magnet 405. After select magnet 405 operates, its operating ground from the link is extended through the make contact of the select magnet 405, through lead 411, contact 3 of relay 806 and the winding of relay 804 to battery, operating relay 804.

Relay 804 operated, establishes a circuit from ground through its contact 1 and the top winding of relay 805 operating relay 805. Relay 805 operated establishes a circuit from battery through the winding of relay 806, contact 2 of relay 805, and conductor 815 which extends in parallel to contact 2 of class relay 1605 and contact 2 of class relay 1606. One or the other of class relays 1605 or 1606 will be operated and the circuit continues through the corresponding contact 2 and lead 1610 or 1611 which connect in parallel to lead 1612 and the circuit extends to contact 12 of each of relays 1600 to 1604 in parallel, one of which relays will be operated to ground the circuit.

The operation of relay 806 releases relay 804, but before doing so it establishes a circuit from ground in the link through the holding contact of relay 803, lead 810, contact 2 of relay 1206, lead 1210, lead 1211, contact 9 of relay 1111, lead 1120, contact 2 of relay 806, resistance 807, bottom winding of relay 805, lead 817, contact 5 of relay 902, contact 4 of relay 904, contact 1 of relay 905, lead 913, contact 1 of relay 1206, lead 1213 and the winding of hold magnet 603, associated with the left-hand or frame vertical of the cross bar switch. This circuit holds relay 805 after relay 804 releases and it operates hold magnet 603.

Hold magnet 603 closes the contacts of the cross-point at the level of the operated select magnet, assumed to be select magnet 405. The energized hold magnet 603 also breaks the operating circuit of relay 1002 by opening its contact 1 which disconnects ground supplied to the winding of relay 1002 through lead 302 releasing relay 1002. The releasing of relay 1002 opens the operating circuit of the select magnet, assumed to be select magnet 405, but the select magnet is maintained energized through its holding contact, lead 411, contact 1 of relay 805, lead 1210, contact 2 of relay 1206 and lead 810 to ground supplied from the link through the holding contact of relay 803.

When hold magnet 603 operates its locking contact short circuits the secondary winding of relay 805 by establishing a path from battery through the winding of hold magnet 603, conductor 1213, contact 1 of relay 1206, lead 913, lead 916, contact 3 of hold magnet 603, lead 616, lead 1210, contact 2 of relay 1206, lead 810 and contact 3 of relay 803, to ground in the link. Relay 805 therefore releases which releases relay 806 in turn by opening contact 2 of relay 805. The select magnet is also released by the opening of contact 1 of relay 805.

Relay 1111 is unoperated at this time, the two ends of the secondary winding of relay 805 are connected to the same off-normal ground lead, and thus are at almost precisely the same potential.

When relay 806 operated ground is supplied over a path heretofore traced from the link through contact 3 of relay 803, contact 2 of relay 1206, lead 1210, contact 1 of relay 806, lead 819, contact 2 of relay 901, winding of relay 901 and resistance 907 to battery operating relay 901. When relay 806 releases, ground which is supplied through contact 1 of relay 806 and lead 819 is disconnected from contact 2 of relay 902 and a path is established from negative battery through resistance 908, winding of relay 902, contact 3 of relay 901, lead 1210, contact 2 of relay 1206 and lead 810 which extends through contact 3 of relay 803 to ground in the link over a path heretofore traced operating relay 902. When relay 902 operates it establishes a path from battery through resistance 909, winding of relay 903, contact 2 of relay 903 and contact 1 of relay 902 to conductor 1210 which has been traced to ground operating relay 903. Relays 901 and 902 lock up through contact 1 of relay 901 and relay 903 locks through its contact 1 until the first dialed digit is in process of registration. With one or the other of relays 802 or 803 released and relay 903 operated, relay 1111 operates from battery through the winding of relay 1111, lead 911, contact 3 of relay 903, lead 809, contact 4 of relay 802 or 803, contact of relay 801, lead 314, contact 6 of relay 1001 and lead 312 to ground in the link.

Relay 806 cannot operate until relay 802 or 803, class relay 1605 or 1606 and one of the class relays 1600 to 1604 operate. This insures that the frame hold magnet 603 shall not operate and release relay 1002 before a frame relay 802 or 803 is ready. It also insures that if no frame relay or class relay operates at all, relay 904 cannot operate and the operation of relay 1111 and the release of the link control circuit will be prevented. The latter circuit will then time out.

If on account of a cross between two leads or some other trouble both frame relays 802 and 803 should operate, they would open the operating circuit of relay 1111 by opening back contact 4 of each relay through one or the other of which the operating path of relay 1111 must extend while one or the other of relays 802 or 803 is released. If, due to some difficulty, more than one of frame selecting magnets 600 to 609 operate simultaneously, relay 801 will be operated over a path extending from battery through the top winding of relay 801 and lead 823 which connects in parallel to a plurality of contacts of the left-hand or frame vertical of the cross bar switch controlled by hold magnet 603 and selecting magnets 600 to 609. If any two of magnets 600 to 609 are energized, while hold magnet 603 is energized, a path can be traced from lead 823 to ground operating relay 801. The operation of relay 801 by opening its single contact through which ground is supplied from the link and through one or the other of contacts 4 of frame relays 802 and 803, lead 809, contact 3 of relay 903 and lead 911 to the winding of relay 1111 to battery, prevents the operation of relay 1111. A path may also be traced from battery through the bottom winding of relay 801 and lead 824 which connects in parallel to various contacts on class relays 1600 to 1604, inclusive, and to contact 3 on class relay 1606. If, due to a trouble condition, any two of relays 1600 to 1604, inclusive, are operated simultaneously the circuit from lead 824 extends in series through a contact of one of the pair to ground on a contact of the other of the pair so operated. If due to a trouble condition relays 1605 and 1606 are operated simultaneously, lead 824 extends through contact 3 of relay 1606 and contact 3 of relay 1605 to ground. When lead 824 terminates in ground in the class relays due to a trouble condition, the bottom winding of relay 801 will be energized and the relay will open its contact to disconnect ground in the link from frame relays 802 and 803 so that relays 802 and 803 will be prevented from operating for this condition.

*Class-of-service relay cross connections*

Dependent upon the number of classes of trunks from originating senders, dial systems A operators, toll operators etc., served by the present tandem sender, class relays 1600 to 1606 are provided as follows:

Class of service relays 1600 to 1606 required—

| | |
|---|---|
| One class of service | None connect leads 815 and 831 |
| Two classes of service | 1600 and 1601 |
| Three classes of service | 1600 to 1602 |
| Four classes of service | 1600 to 1603 |
| Five classes of service | 1600 to 1604 |
| Six classes of service | 1600 to 1602, 1605 and 1606 |
| Seven or eight classes of service | 1600 to 1603, 1605 and 1606 |
| Nine or ten classes of service | 1600 to 1606 |

When relay 1605 is not provided, the two leads shown connected to each of contacts 1, 2 and 7 to 11 are joined together.

Relays 1600 to 1606 are provided with cross connection terminals 0 to 9 and 10 to 19 which permit any of the ten classes of service to ground leads C0 to C6 to the marker as required to obtain the corresponding marker classes. Terminal CS alone is used if the tandem sender serves only one class of trunk.

*Registration of class of service*

Ten class indications are provided through the operation of relays 1600 and 1606 by grounds on two of seven leads 340 to 346 from the sender link and control circuit. There are always two relays of the relay group of 1600 to 1606 operated for each class-of-service indication, one of the five relays in the group 1600 to 1604 and one of the two relays 1605 or 1606. When relay 1605 is operated the class of service is the same as that of the designation of relay 1600 to 1604. When relay 1606 is operated the class of service is numerically five higher than indicated by the designation of the operated relay of the group 1600 to 1604. If the sender has provision for five or less classes of service, in which case relays 1605 and 1606 are omitted, the class designation is the same as that of the operated relay of the group 1600 to 1604. The class-of-service indication is transmitted to the marker by grounds over class leads C0 to C6. These grounds are furnished by the corresponding relay in the group 1600 to 1606 through cross-connections of terminals 0 to 9 and 10 to 19 to class terminals C0 to C4 and C5 or C6 respectively, as described in the following sections.

*One class of service in the sender—One or more classes in the marker*

Since relays 1600 to 1606 inclusive are omitted, grounds on the necessary C0 to C4 class leads and either C5 or C6 leads to satisfy class requirements in the marker are furnished by cross-connecting from terminal CS to one of terminals C0 to C4 and from terminal CS to either terminal C5 or C6 as required by the marker. If there is provision for five or less classes in the marker, it is unnecessary to cross-connect from terminal CS to either of terminal C5 or C6.

*Five or less classes of service in the sender, relays 1605 and 1606 omitted—Five or less classes in the marker*

Figure 16:
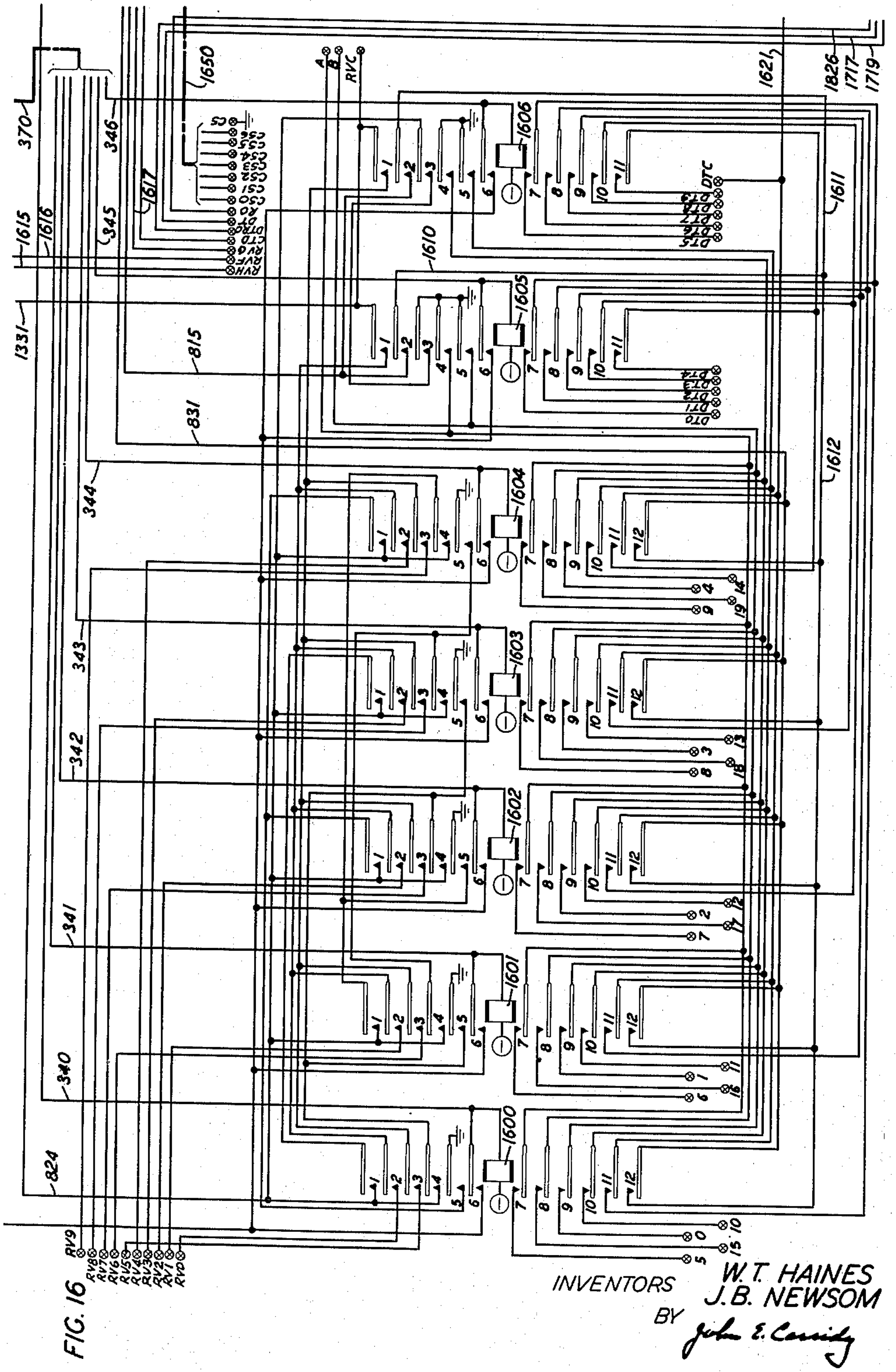
Figure 17:
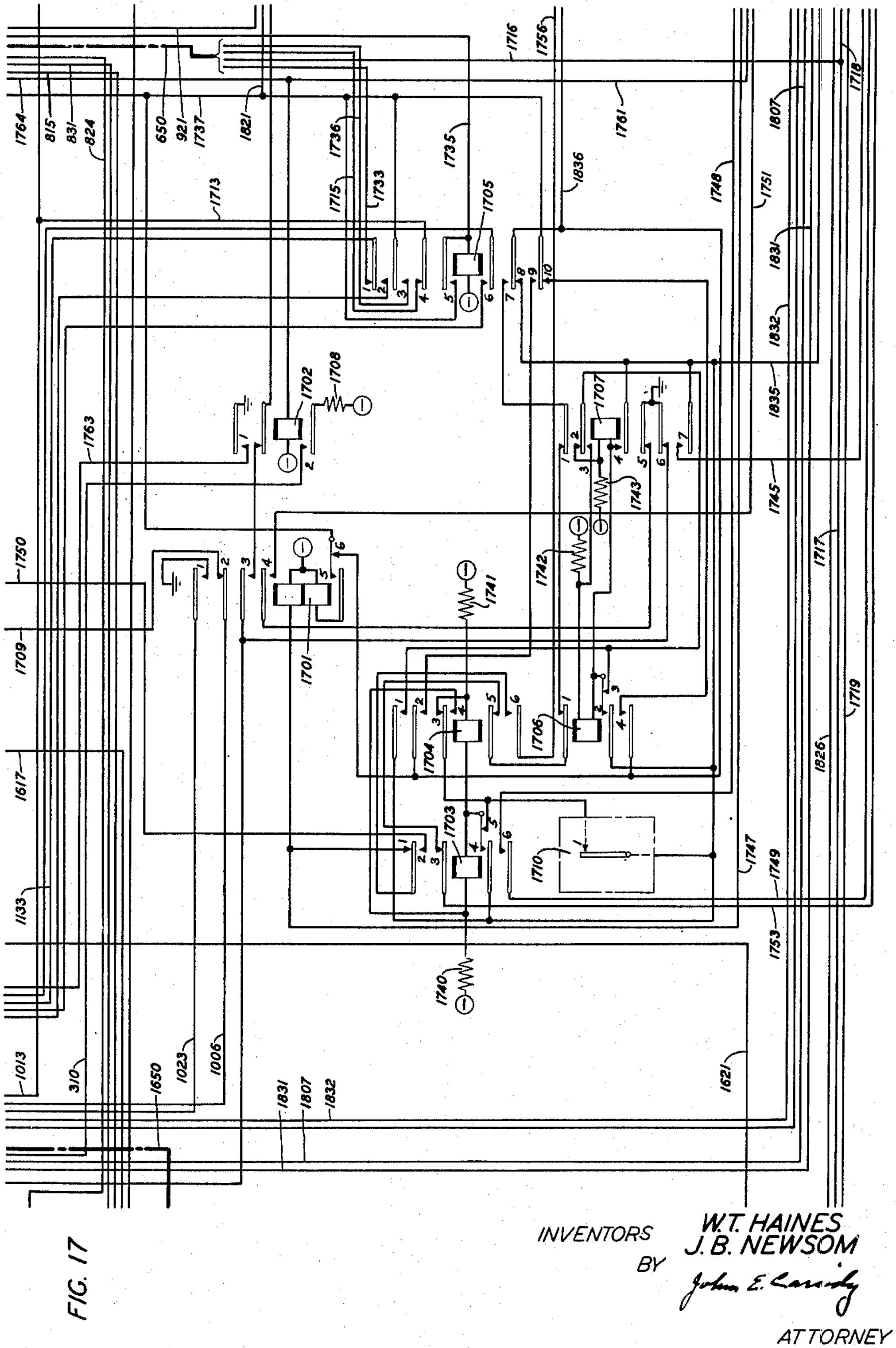
Figure 18:
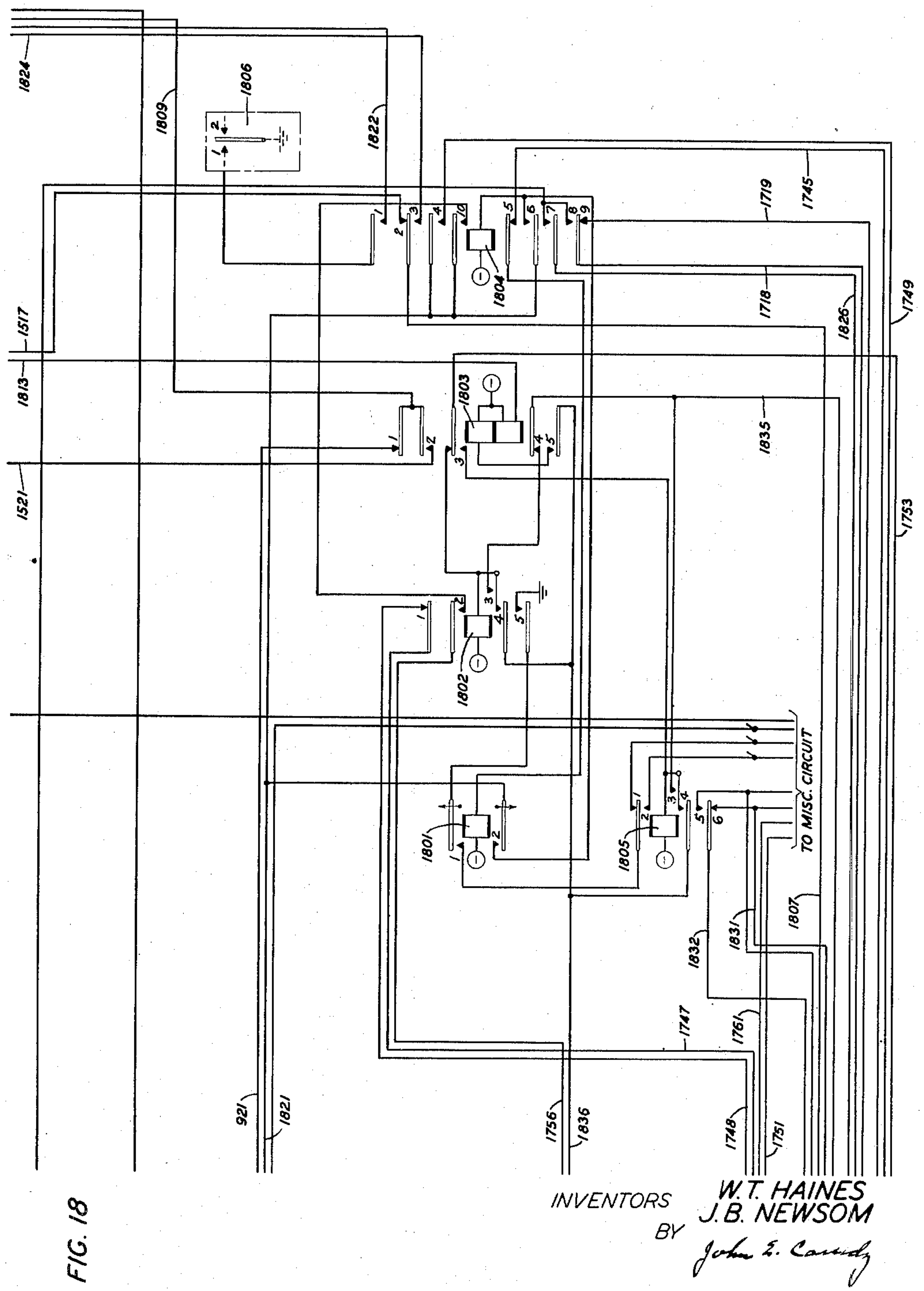
Figure 19:
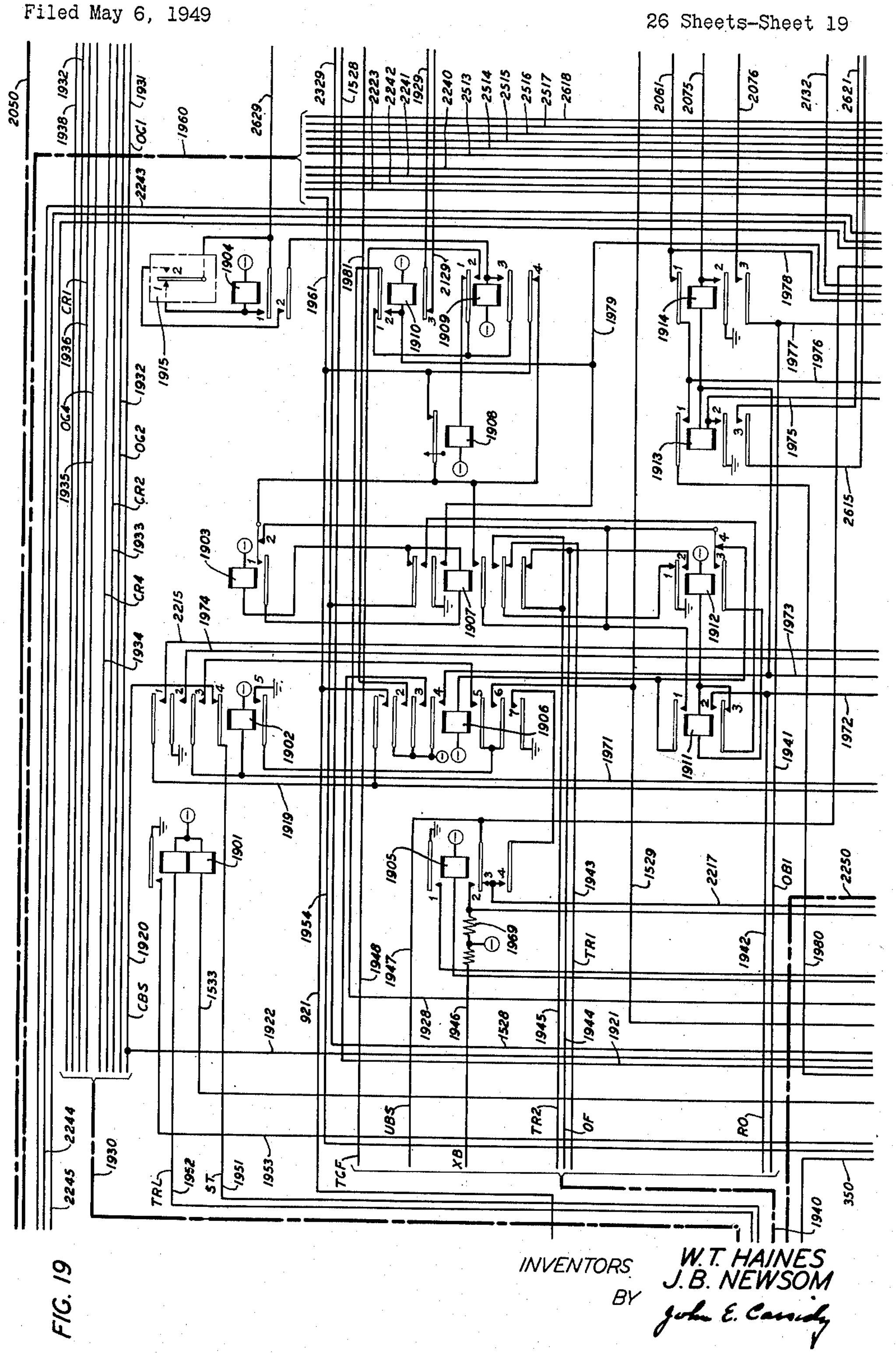
Figure 20:
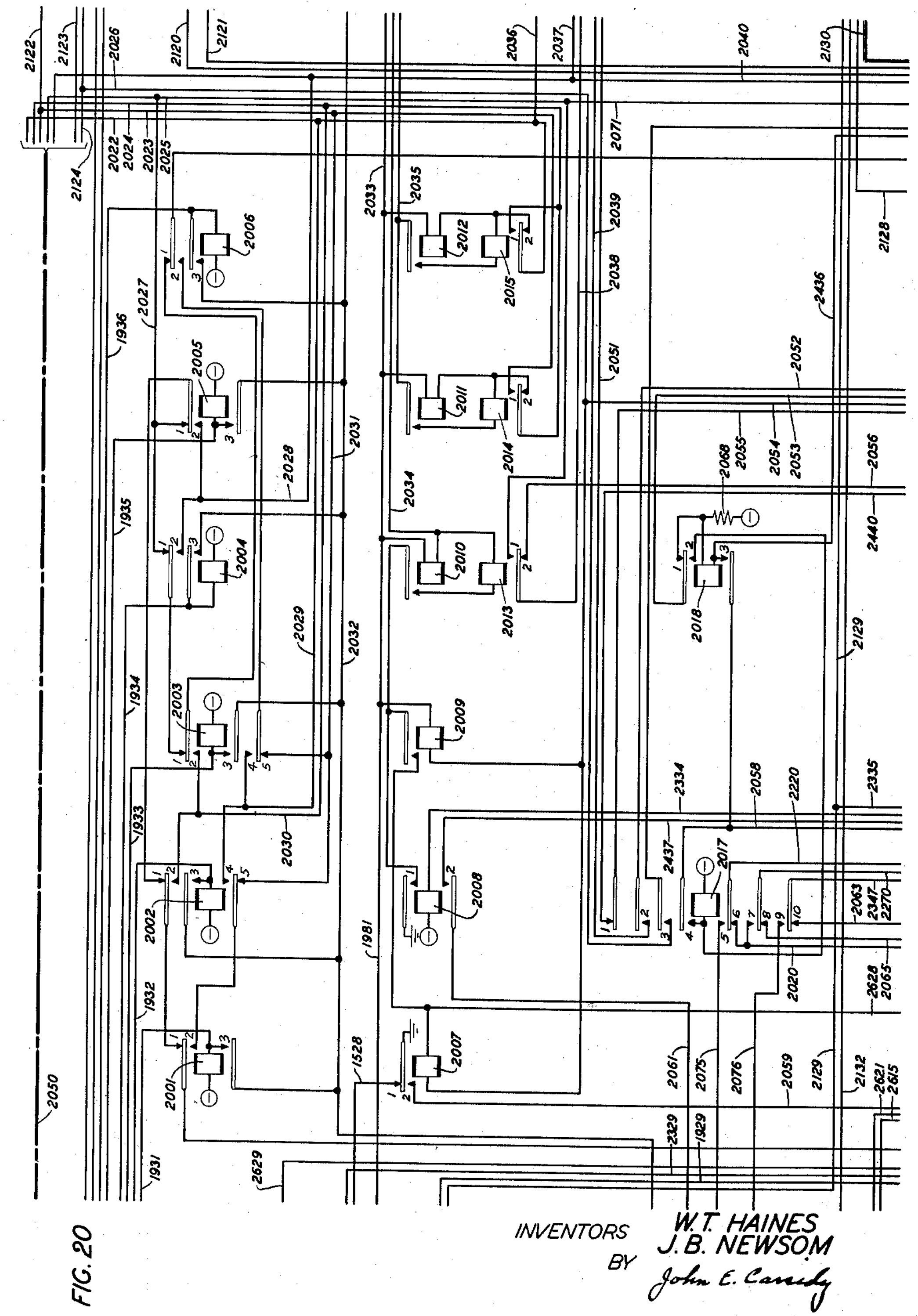

The operation of one of the relays in the group from 1600 to 1604 places ground on one of the similarly designated 0 to 4 terminals and on a corresponding one of the 10 to 14 terminals at the bottom of Fig. 16. The class of service information is transmitted to the marker for proper routing of the call by cross-connections from terminals 0 to 4 to class terminals C0 to C4, at the upper right of Fig. 16, as required by the marker. It is unnecessary to cross-connect terminals 10 to 14.

*Five or less classes of service in the sender, relays 1605 and 1606 omitted—More than five classes in the marker*

The operation of one of the relays in the group 1600 to 1604 grounds one of the terminals 0 to 4 and one of the terminals 10 to 14 as outlined above. The grounds are transmitted to the marker by cross-connections from terminals 0 to 4 to terminals C0 to C4 and from terminals 10 to 14 to either terminal C5 or C6. For example, on class of service 3, relay 1603 operates grounding terminals 3 and 13. If this call is to be handled as class 3 in the marker, terminal 3 is cross-connected to terminal C3 and terminal 13 is cross-connected to terminal C5. If this call were to be handled as class 7 in the marker, for instance, terminal 3 would be cross-connected to C2 and terminal 13 would be cross-connected to terminal C6. In this manner a particular sender class of service may be transmitted as any class of service required by the marker.

*More than five classes of service in the sender, more than five in the marker*

The class of service is indicated by operation of one of the relays in the group 1600 to 1604 and either relay 1605 or 1606, depending upon whether the class designation is below or above five. The operation of the relays grounds one of terminals 0 to 9 and one of terminals 10 to 19, which, to transmit the class information to the marker, are cross-connectable to terminal C0 to C4 and either C5 or C6 respectively. For example, on a sender call 8 call, relays 1603 and 1606 operate, grounding terminals 8 and 18. If the call is to be routed as class 8 in the marker, terminal 8 is cross-connected to terminal C3 and terminal 18 is cross-connected to terminal C6. If the call is to be handled as class 4 in the marker, for instance, terminal 8 is cross-connected to terminal C4 and terminal 18 is cross-connected to terminal C5.

Different sender classes of service which require the same treatment in the marker may be combined by cross-connections from different terminals 0 to 9 to the same C0 to C4 terminal, and from different terminals 10 to 19 to the same C5 or C6 terminal. For example, if classes 3 and 7 require different treatment in the sender, such as one provided with dial tone and the other not, but both require the same routing in the marker, designated Marker Class 5, they may be combined to reduce the number of marker classes by cross-connecting both terminal 3 and terminal 7 to terminal C0 and cross-connecting both terminal 13 and terminal 17 to terminal C6.

*Cross-connection of dial tone and RV-terminals, Fig. 16*

To provide the proper assignment of start-dial signaling and reorder disconnect signaling as determined by the incoming class of service, terminals "DT," "DTRO," and "RO" are cross-connected, as required, to terminals "DT0–DT9" or terminal "DTC" (if only one class of service is provided), and terminals "RVF," "RVG," "RVH" and "CTD" are cross-connected, as required, to terminals "RV0–RV9" or "RVC" (if only one class of service is provided). For each different incoming class of service, one of terminals "DT," "DTRO," "RO," and one of terminals "RVF," "RVG," "RVH," "CTD," are cross-connected to the proper terminals as indicated below.

| Cross-Conn. Term. | | Start.-Dial Signal Dial Tone | Hold [1] | Reorder Disconnect Signal | | See Note |
|---|---|---|---|---|---|---|
| RV- or RVC, To | DT- or DTC | | | T & R Reversal | Interrupted Dial Tone | |
| RVF | None | No | No | Yes | No | (A) |
| RVF | DT | Yes | No | Yes | No | (B) |
| RVF | DTRO | Yes | No | Yes | Yes | (C) |
| RVF | RO | No | No | Yes | Yes | (D) |
| RVG | None | No | Yes | Yes | No | (E) |
| RVG | RO | No | Yes | Yes | Yes | (F) |
| RVG | DT | Yes | Yes | Yes | No | (G) |
| RVG | DTRO | Yes | Yes | Yes | Yes | (H) |
| RVH | RO | No | Yes | No | Yes | (I) |
| RVH | DTRO | Yes | Yes | No | Yes | (J) |
| CTD | None | No | No | Yes | No | (K) |
| CTD | RO | No | No | Yes | Yes | (L) |
| CTD | DT | Yes | No | Yes | No | (M) |
| CTD | DTRO | Yes | No | Yes | Yes | (N) |

[1] This column refers to the restoration of the sender tip and ring to the initial polarity on abandoned calls. On calls from operators or certain types of senders, the trunk, when first selected, is in the "off-hook" condition as a "stop" signal. The sender, when first seized is also in the "off-hook" polarity, reversing to "on-hook," when it is ready to receive pulses. Under this condition, if the call is abandoned, the sender must restore to its initial "off-hook" condition to prevent giving a start signal if it is reseized before it has had time to completely restore to normal. On the other hand, if the call is from an operator or sender where the trunk is "on-hook" when first selected, and the sender initially "off-hook," reversing to "on-hook" when ready to receive dial pulses, then it is necessary that the sender hold the "on-hook" and not restore to its initial condition if the call is abandoned, so that, if it is reseized, the sender will return an "on-hook" to the originating office. When the sender finally restores and releases the link, the "on-hook" follows in the trunk after the sender releases, and another sender is selected, giving the normal start-dial signal. If the first sender, on abandonment, restored to "off-hook" it would, when released, restore the incoming "T" and "R" to the trunk where "on-hook" is received, and cause a false start-pulse signal to be given, which would mean that dialing would start before a second sender had been selected. On classes of calls where "on-hook" is initially received from the trunk, the sender, on abandonment, must "hold" the "on-hook," while on classes that are originally "off-hook" upon selecting a trunk, the sender must, on recognition of abandonment, restore to the "off-hook" polarity.

NOTES (A) This class will be used from certain types of senders and from toll and dial systems A operators that depend on lamp signals only for start-dial and reorder indications.

(B) This class is for calls from operators where both lamp signals and dial tone are desired for a start-dial signal, but without reorder tone. It may also be used for certain types of senders where initial dial tone is desired for maintenance purposes, but where no tone is desired on reorder.

(C) This class is for calls from operators where both tone and lamp signals are desired for start dial signal and reorder. It may also be used for calls from certain types of senders where reorder tone is desired.

(D) This class may be used for calls from certain types of senders and from operators where dial tone is not required but where reorder tone is desired.

(E) This class may be used from senders, such as step-by-step automatic ticketing senders, where neither dial tone nor reorder tone is desired, and where false charges will not be caused by reorder reversals.

(F) This class may be used for calls from senders as under (E) except that reorder tone is furnished.

(G) This class may be used for calls from senders as under (E), except that dial tone is furnished.

(H) This class may be used for calls from senders as under (E), except that both dial tone and reorder tone are furnished.

(I) This will be used for calls from senders, such as step-by-step automatic ticketing senders, which are used to complete calls from message rate lines without charge delay features, where reorder tone is desired without initial dial tone.

(J) This may be used for calls from senders as under (I), except where initial dial tone may be desired for maintenance purposes.

(K) This class will be used in senders in 2-digit or 2/3 digit areas for calls from distant operators or senders that insert a third code digit in office codes with two digit code listings and where neither dial tone nor reorder tone is desired.

(L) This may be used as under (K) except that reorder tone is furnished.

(M) This may be used as under (K) except that dial tone is furnished.

(N) This may be used as under (K) except that both dial tone and reorder tone are furnished.

*Dial registration*

The manner in which the sender is controlled by the originating loop and dial pulses, the start dialing signal, the registration of the called office code, and number on the cross bar register will now be described. The manner in which relay 1504 is operated to indicate the completion of dialing, as well as the operation of the delay feature which provides a time interval during which the subscriber may dial a seventh numerical digit, when the marker indicates that either six or seven digits may be dialed will also be described.

*Dial and loop control*

A circuit may be traced from battery through the bottom winding of polar relay 1311, resistance 1309, lead 1415, contact 4 of relay 1410, lead 1709, contact 2 of relay 1701, lead 1003, contact 2 of relay 1003, lead 1005 and contact 7 of relay 1001 to ground actuating the armature of polar relay 1311 to engage with its right-hand contact. Closure of the link cross-points and operation of relay 1111 establishes a circuit from ground through winding 1406 of tone coil 1401, contact 1 of relay 1409, contact 1 of relay 1412, ring lead 304 of the sender, contact 11 of relay 1111 and lead 304 into the link. It also establishes a circuit from battery through contact 1 of jack 1408, lead 1423, middle winding of polar relay 1304, lead 1426, contact 2 of jack 1408, winding 1405 of tone coil 1401, contact 6 of relay 1409, contact 5 of relay 1412, tip lead 303 of the sender, contact 10 of relay 1111 and tip lead 303 into the link. The effect of the current flowing through the middle winding of polar relay 1304 holds the armature of relay 1304 in engagement with its right-hand contact 2 except for a short period when relay 1001 or relay 1301 operated with relay 1003 and relay 1701 normally places a ground on the left-hand terminal of the bottom winding of polar relay 1304 to maintain the armature of relay 1304 in engagement with its right-hand contact. This prevents a momentary release of polar relay 1304 during reversals of tip and ring conductors 303 and 304. The armature of polar relay 1304 is therefore maintained in engagement with its right-hand contact except for a momentary release on each break of the dial until the sender is disconnected unless the loop is previously opened on an abandoned call. The bottom winding of polar relay 1304 is in series with condenser 1308 for the purpose of reinforcing the winding and makes the operation and release of the relay more energetic. A circuit may be traced from battery through the top winding of relay 1304, lead 1321, lead 1135 and contact 2 of relay 1111 to ground. The effect of the current in the top winding of relay 1304 tends to bias the armature of relay 1304 toward its contact 1 but this effect is overcome for the present condition and the armature of relay 1304 engages its contact 2. Jack 1408 affords a means of patching the middle winding of relay 1304 to a relay test set, disconnecting battery at opened contact 1 of jack 1408 from the middle winding of relay 1304.

Relays 1109 and 1110 operate and release with relay 1304, serving to provide additional contacts. The operating path for relay 1109 may be traced from battery through the winding of relay 1303 and resistance 1307 in parallel, lead 1323, winding of relay 1109, lead 1125, contact 5 of relay 1410, lead 1432, contact 2 and armature of relay 1304, lead 1322, contact 7 of relay 1205, lead 1215, lead 1515, lead 1135 and contact 2 of relay 1412 to ground. Relay 1303 operates in series with relay 1109. The operation of relay 1303 establishes a circuit from ground through contact 1 of relay 1303, lead 1310 and the winding of relay 1107 to battery operating relay 1107. The operation of relays 1107 and 1109 establishes a circuit from ground through contact 1 of relay 1107, contact 2 of relay 1109 and the winding of relay 1110 to battery, operating relay 1110.

Relays 1304, 1303, 1107, 1109, 1110 and 1111 all release when a call is completed or abandoned. Relays 1303 and 1107 once operated, hold up continuously until a call is completed or abandoned regardless of the momentary release of relay 1304 due to dial breaks. Relays 1301 and 1302 operate from battery in series through their windings, lead 1116, contact 2 of relay 1107 and lead 316 to ground in the link circuit.

Relay 1201 operates over a path from battery through the winding of relay 1201, lead 1217, contact 1 of relay 1109 and contact 1 of relay 1107 to ground on the first dial break of each digit dialed, and remains operated throughout that string of pulses despite the repeated momentary breaking of its operating path. It releases each time the dial comes to rest after sending pulses for one digit. Relay 1202 operates and releases in reverse to relay 1201 over a path from battery through the winding of relay 1202, contact 3 of relay 1201, contact 1 of relay 1201, lead 1219 and contact 2 of the frame hold magnet 603. It does not operate the first time until after the frame hold magnet 603 has operated. It provides additional contacts.

Relay 1201 is a slow to release relay. The delayed release may be obtained with a copper sleeve but preferably the relay is equipped with an additional winding, not shown, the terminals of which winding are connected together. The resistance of the winding is established at a fixed predetermined value to within ±1 per cent by winding an exact predetermined number of turns to hold the relay to the required slow-release time.

Relays 1203, 1204 and 1205 serve to transmit the dial pulses, represented by closures of contact 1 of relay 1304, over two leads 1223 and 1225 alternately to the pulse counting relays 1101 to 1106. Relay 1203 operates over a circuit from the battery through the winding of relay 1203, contact 1 of relay 1205, lead 1221, contact 2 of relay 1504, lead 1517, contact 2 of relay 1804, lead 1807, contact 3 of relay 1303 and contact 1 and armature of relay 1304 from which point the circuit has been traced to off-normal ground. This operation of relay 1203 takes place when relay 1304 releases on the first dial break of each digit.

When the armature of relay 1304 is actuated to open its contact 1 in response to the succeeding dial closure, ground is disconnected from the path last traced but a new path is available to operate relay 1205 while maintaining relay 1203 operated extending from battery through the winding of relay 1203, top winding of relay 1205, contact 1 of relay 1204, contact 1 of relay 1203, contact 2 of relay 1201, lead 1227, lead 1127 and contact 1 of relay 1107 to ground. When relay 1304 releases on the second dial break a path is established from battery through the top winding of relay 1204, bottom winding of relay 1205, contact 2 of relay 1205 to lead 1221 which extends over a path heretofore traced to contact 1 and the armature of relay 1304 and to ground operating relay 1204. The opening of contact 1 of relay 1204 releases relay 1203. Relay 1205 is maintained operated through its bottom winding. When relay 1304 operates in the second dial closure it disconnects ground from the path through the top winding of relay 1204 and the bottom winding of relay 1205 and relays 1204 and 1205 release. Any possibility of the release of relay 1204 before relay 1205, thereby preventing the release of relay 1203 and relay 1205, is prevented by locking the bottom winding of relay 1204 to contact 2 of relay 1203. The above cycle is repeated every two pulses of the digit. If the number of pulses is even the last pulse leaves all three relays normal. If the number of pulses is odd relay 1204 is left normal and relays 1203 and 1205 release after the last pulse because the operation of relay 110 and the release of relay 1201 break all ground connections which could hold the relays operated. The important fact for future reference is that each odd pulse of a digit operates relay 1205 and each even pulse releases it.

Relay 1410 operates over a path from ground through the armature and contact 1 of relay 1304, contact 2 of relay 1303, contact 6 of relay 1302, lead 1424 and the winding of relay 1410 to battery. Alternatively, relay 1410 may operate over a path from ground through contact 2 of relay 1111, contact 2 of relay 1108 and the winding of relay 1410 to battery. The relay is maintained operated over this latter path in case the calling end disconnects after relay 1301 operates and relay 1001 releases. Disconnect is ineffective so far as the sender is concerned while the link is attached and during the interval that relay 1003 is released.

*Start dialing and dial tone*

Figure 13:
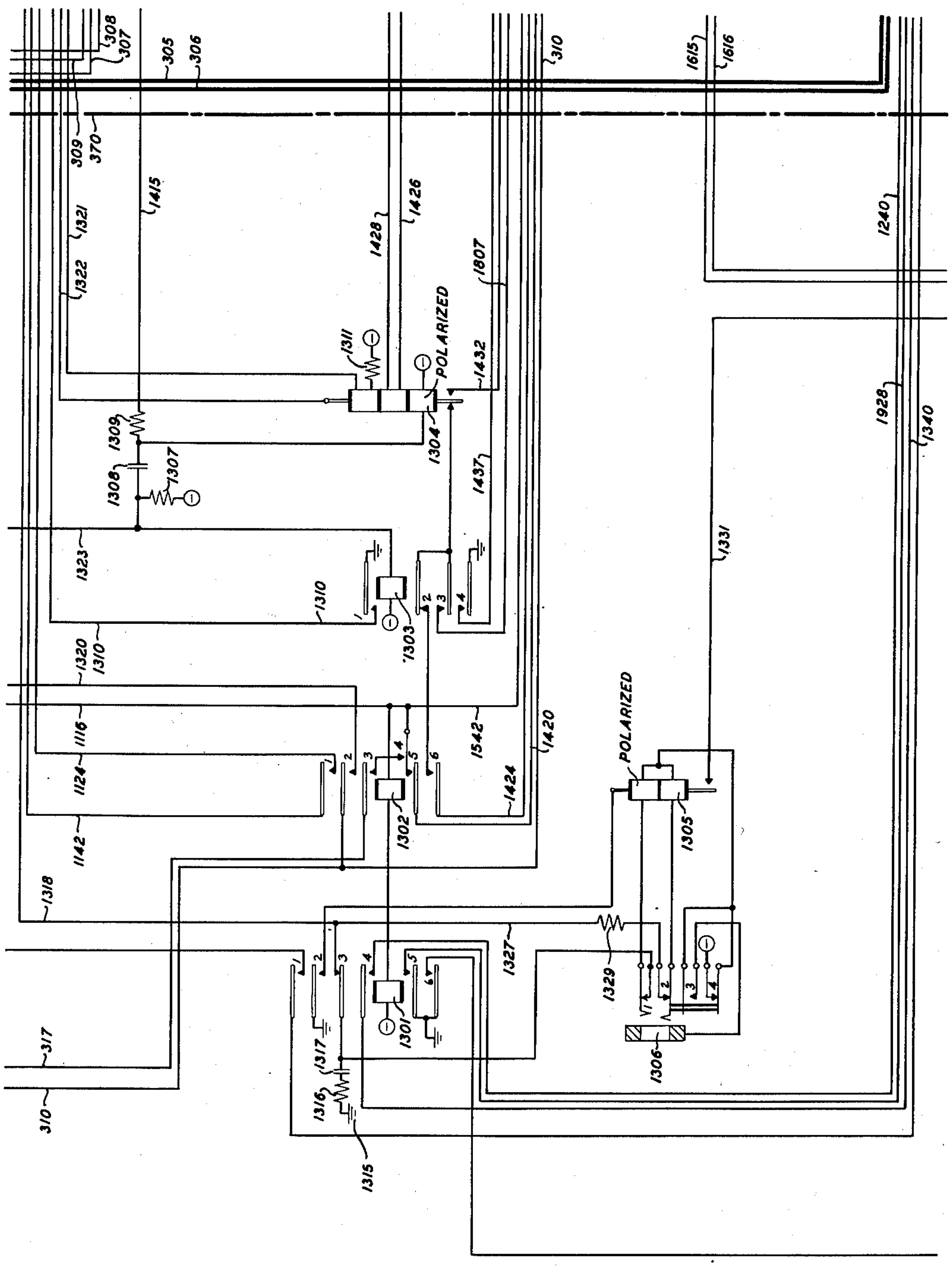
Figure 14:
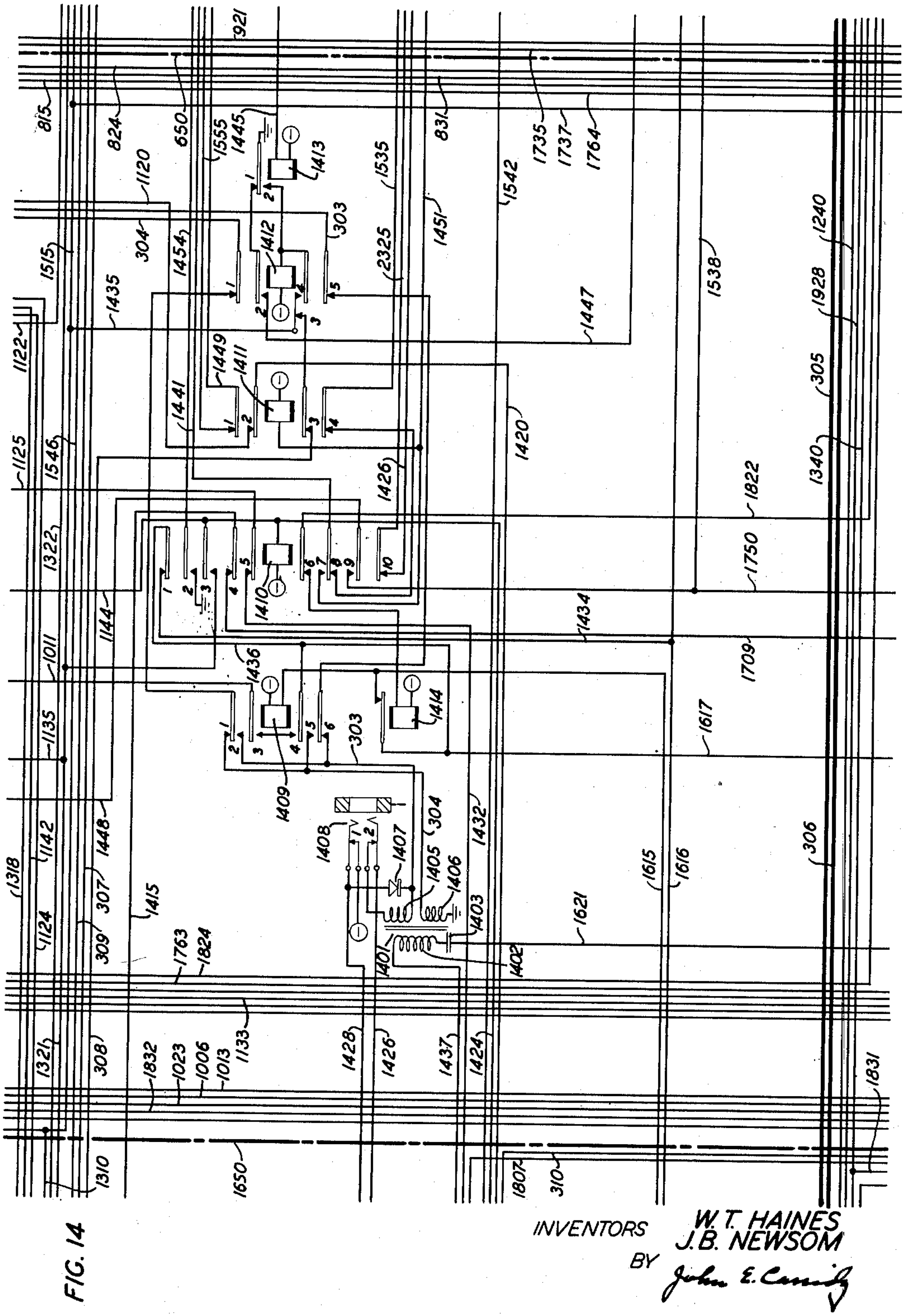
Figure 15:
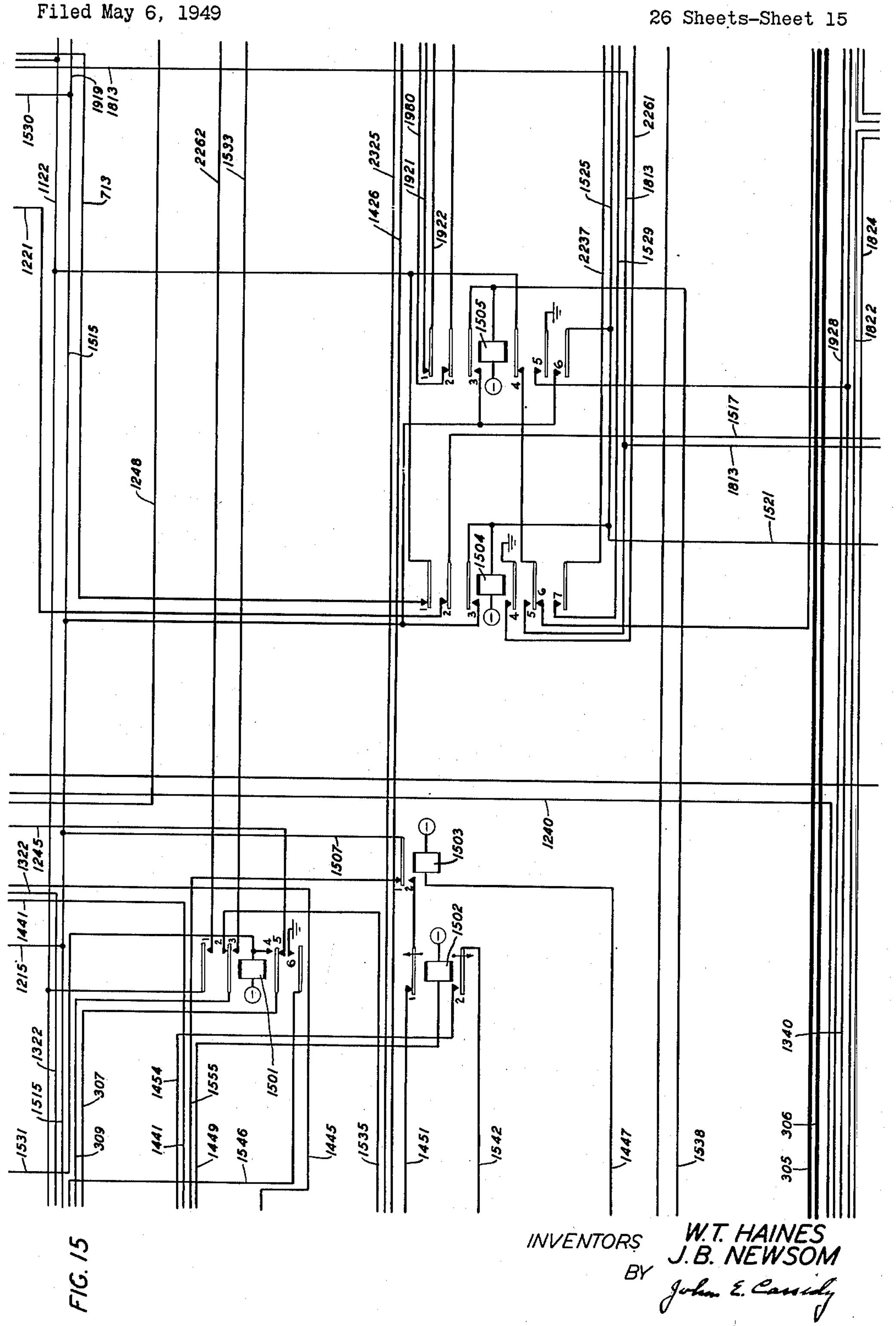

The action of the sender in sending the start dialing signal is as follows. When relay 1111 operates battery is placed on the tip through the middle winding of relay 1304 and ground is placed on the ring both as previously described. The subsequent operation of relay 1301 in series with relay 1302 opens the path from ground through contact 5 of relay 1111, lead 1318, contact 3 of relay 1301, contact 1 of jack 1306, top winding of polar relay 1305 and contact 4 of jack 1306 to battery, the effect of the current in which path has heretofore been maintaining the armature of polar relay 1305 actuated to the left as shown in Fig. 13. This path has also been shunting the path from ground 1315 through resistance 1316, contact 1 of jack 1306 and the top winding of relay 1305 to battery through contact 4 of jack 1306. The charging current for condenser 1317 maintains the armature of relay 1305 in its left-hand position to maintain its right-hand contact open as indicated for a short interval after relay 1301 operates. After the elapse of this interval the effect of the current flowing in the path from ground on contact 5 of relay 1111 through lead 1318, lead 1327, resistance 1329, contact 2 of jack 1306, bottom winding of relay 1305 and contact 4 of jack 1306 to negative battery actuates the armature of relay 1305 to engage its right-hand contact which closes a path from ground through contact 2 of relay 1301, armature of relay 1305 and lead 1330 to terminal RVC and to one of the terminals RV0 to RV9 depending on the class of service relay or relays operated. One of these terminals is cross-connected to terminal RVH, RVF or RVG and the ground is continued in each instance over a path through the winding of relay 1409 to battery operating relay 1409. If the cross-connection is made to terminal RVH the path extends through lead 1615 directly through the winding of relay 1409 to battery. If the cross-connection is made to terminal RVF the path extends through lead 1616, lead 1434, contact 1 of relay 1410, lead 1436, contact of relay 1414 and through the winding of relay 1409 to battery. If the connection is made to terminal RVG the path extends through lead 1617, contact of relay 1414 and the winding of relay 1409 to battery. When relay 1409 is normal the tip conductor of the sender extends through the top armature of relay 1409 and the ring conductor of the sender through the bottom armature of relay 1409. When relay 1409 is operated the connections of the tip and ring are reversed through these armatures, the tip extending through the bottom armature of relay 1409 and the ring through its top armature.

The operation of relay 1409 establishes a path from battery through the winding of relay 1003, lead 1011 and contacts 3 and 4 of relay 1409 which connects through one of the leads 1615, 1616 and 1617 to ground depending upon the cross-connection of terminal RVH, RVF or RVG to RVC as previously explained. The operation of relay 1003 connects a source of low voltage alternating current, which serves as a tone supply, through contact 1 of relay 1003, lead 1013, lead 1713, contact 4 of relay 1705, lead 1715, contact 3 of relay 609 and lead 1716 which connects in parallel to leads 1717 and 1718. Lead 1717 connects to terminal DTRO in Fig. 16. Lead 1718 extends through contact 9 of relay 1804 and lead 1719 which connects to terminal DT in Fig. 16. From terminals DT and DTRO the tone is supplied by cross-connections as required to terminals DT0 to DT9 of class relays 1605 and 1606. Upon the operation of one or the other of relays 1605 or 1606 and some one of relays 1600 to 1604 the tone path is extended through conductor 1621, condenser 1403, winding 1403 of tone coil 1401, conductor 1437 and contact 4 of relay 1303 to ground. Tone will be induced in windings 1405 and 1406 and through them to the tip and ring. The operation of relay 1003 also opens the holding path heretofore traced through the bottom winding of relay 1304.

*Counting pulses of each digit*

The pulses of each digit are counted on relays 1101 to 1106 which are operated in rotation by alternate closure of the front and back bottom contacts of relay 1205 and each of which locks until released by the operation of another, or by the operation of relays 1202 and 804 at the end of a train of pulses.

The first pulse of any digit operates relay 1205 and this establishes a circuit from ground, through contact 1 of relay 1107, lead 1127, lead 1227, contact 2 of relay 1201, lead 1237, in parallel with ground through high resistance 1229 and continuing through contact 3 of relay 1205, lead 1225, contact 6 of relay 1104, contact 6 of relay 1102, contact 2 of relay 1103, contact 1 of relay 1105 and the bottom winding of relay 1101 to battery, operating relay 1101. Relay 1101 operated locks over a path from battery through the top winding of relay 1101, lead 1129, contact 2 of relay 1202, lead 1233, contact 3 of relay 1102, contact 4 of relay 1103, contact 2 of relay 1104, contact 4 of relay 1105, lead 1235, contact 3 of relay 804, lead 827, lead 1127 and contact 1 of relay 1107 to ground. The second pulse releases relay 1205. This establishes a circuit from ground through contact 1 of relay 1107, lead 1127, lead 1227, contact 2 of relay 1201, lead 1237, in parallel with ground through high resistance 1229, and continuing through contact 4 of relay 1205, lead 1223, contact 3 of relay 1202, through lead 1223, contact 6 or relay 1101 through the winding of relay 1102 to battery operating relay 1102. The operation of relay 1102, in opening its contact 3, opens the locking path of relay 1101 thereby releasing relay 1101. Relay 1102 operated locks through its contact 2 over a path heretofore traced to ground for the locking of relay 1101. The third pulse operates relay 1205 which supplies ground through contact 6 of relay 1104, contact 5 of relay 1102 and the winding of relay 1103 to battery operating relay 1103. This unlocks relay 1102 by opening contact 4 of relay 1103 and locks itself through its contact 5 to the same locking ground as heretofore locked relays 1101 and 1102, both now released. The fourth pulse operates relay 1104 releases relay 1103 and locks relay 1104. The fifth pulse operates relay 1105, releases relay 1104 and locks relay 1105 in a manner which should be apparent from the foregoing. The sixth pulse operates relay 1106 through contact 6 of relay 1105 and locks up during the reception of the remaining pulses of the digit but does not release relay 1105. The seventh pulse again operates relay 1101 through contact 1 of relay 1106, instead of through contact 1 of relay 1105 as when first operated. Relay 1105 is released by the opening of contact 7 of relay 1101. Relay 1101 locks through contact 4 of relay 1106. The eighth, ninth and tenth pulses operate relays 1102, 1103 and 1104 respectively. As each one of these relays operates in turn it releases the last preceding relay to operate and each relay as it operates locks over a path heretofore traced. Pulsing relays 1101 to 1106 operate after each pulse as tabulated below:

| *Pulse Number* | *Pulsing Relays Operated* |
|---|---|
| 1 | 1101 |
| 2 | 1102 |
| 3 | 1103 |
| 4 | 1104 |
| 5 | 1105 |
| 6 | 1105 and 1106 |
| 7 | 1101 and 1106 |
| 8 | 1102 and 1106 |
| 9 | 1103 and 1106 |
| 10 | 1104 and 1106 |

*Special service codes; preliminary pulse absorption*

When a preliminary pulse is received, or if an initial "one" is dialed, relay 1101 provides a path for the operation of relay 607. This path may be traced from ground through contact 2 of frame hold magnet 603, lead 1219, contact 1 of relay 1201, which has been operated by the single preliminary pulse or the "one" pulse and thereafter released, lead 1239, contact 4 of relay 804, lead 829, contact 6 of relay 1106, contact 5 of relay 1101, lead 1133, contact 1 of relay 1705, lead 1733, contact 1 of relay 608 and the bottom winding of relay 607 to battery operating relay 607. Relay 607 operated locks over a path from battery through its top winding and contact 1 of relay 607 to ground through contact 2 of the hold magnet 603. The operation of relay 607 prepares a path which, when relay 601 releases, as it will before the next digit is dialed, extends from battery through the winding of relay 608, contact 2 of relay 607, lead 619, contact 1 of relay 1101, lead 1219 and contact 2 of holding magnet 603 to ground, operating relay 608.

If now any digit 2 to 9 is dialed, this digit is registered on the A register, relays 1101 to 1106 and the preliminary pulse or initial "one" is ignored.

However, if a second "one" is dialed, the second operation of relay 1101 operates relay 609 from ground over a circuit heretofore traced to lead 1733, which now extends through contact 2 of relay 608 and the top winding of relay 609 to battery. Relay 609 operated locks through its bottom winding and its contact 2, lead 615 to ground on contact 2 of hold magnet 603. The operation of relay 609 opens the dial tone circuit at its contact 3. It also operates relays 610 over an obvious circuit.

Further dialing of the digit "one" is ineffective; but any digit 2 to 9 inclusive is registered on relays 1101 to 1106. Relay 1705 operates over a path from battery through the winding of relay 1705 and contact 1 of the A hold magnet 604 which has been operated in a manner to be described. The operation of relay 1705 and of relay 610 operates relay 1906 over a circuit from battery through the winding of relay 1906, contact 4 of relay 1912, contact 2 of relay 1903, contact of relay 1908 and contact 4 of relay 1909 in parallel, contact 5 of relay 610, contact 3 of relay 1705, lead 1737 and lead 1515 which extends to ground over a path heretofore traced. The operation of relay 1906 connects the circuit to a marker. The A register connects the registered digit to the B leads to the marker and relay 610 grounds leads D1, DB5, G1 and GB5 to the marker through contacts 1, 2, 3 and 4 respectively of the relay. Thus a service code 11X, where X is a digit 2 to 9 is transmitted to the marker as X11, and the corresponding cross-points in the marker may be cross-connected to route relays as required. The code 110 is not available, since "0" on the A register is connected to the vacant code route relay in the marker.

*Registering first digit*

When relay 1201 releases at the end of the first train of pulses, some one of the ten select magnets, other than select magnet 601, operates, depending upon the number dialed and the pulsing relays 1101 to 1106 operated. Before the release of relay 1201 can be effective in operating a select magnet, hold magnet 603 must have been properly operated by the frame indication, to ground the contact of relay 1201. This is to insure that the first dialed digit cannot be registered on the frame vertical of the switch in case the frame registration fails. Assuming that the frame hold magnet has operated the circuit may be traced from ground through contact 2 of hold magnet 603, lead 1219, contact 1 of relay 1201, lead 1239, contact 4 of relay 1204, lead 829 and, assuming that relay 1105 in the A register is operated and the others are unoperated, through contact 6 of relay 1106, contact 3 of relay 1105, lead 325 and the winding of select magnet 405 to ground operating select magnet 405.

The select magnet passes its operating ground on to operate relay 804. Relay 804 operates relay 805 through its primary winding. Relay 805 operates relay 806 which latter releases relay 804. The circuits in each instance have been heretofore traced. Before relay 806 releases relay 804, it closes a circuit from ground on contact 8 of relay 1111, through contact 2 of relay 806, bottom winding of relay 805, contact 4 of relay 902, contact 6 of relay 904 and contact 7 of relay 905 to battery through the winding of the A hold magnet 604, which operates. This circuit momentarily holds relay 805 when relay 804 releases.

The A hold magnet 604 closes the contacts of the cross-points at the level of the operated select magnet. The A hold magnet 604 locks up from battery through its winding and its contact 3 to ground through contact 2 of hold magnet 603. This short circuits the ground through the bottom winding of relay 805 which releases followed by the release of relay 806. Hold magnet 604 operates relay 1705 over a path from battery through the winding of relay 1705, lead 1735 and contact 1 of hold magnet 604 to ground. Operation of relay 1705 opens the dial tone circuit at its contact 4.

The operation of relay 804 breaks the last locking path for the pulsing relays 1101 to 1106 by opening contact 3 of relay 804. Relay 1202 operates in parallel with whatever select magnet operates. Assuming that select magnet 405 operates, the parallel path extends through contact 3 of relay 1105, contact 6 of relay 1106, lead 829, contact 4 of relay 804, lead 1239, contact 3 of relay 1201 and the winding of relay 1202 to battery. Whatever relays of the group of relays 1101 to 1106 are operated release. The operation of relay 804 also opens the operating path for the select magnet, but before breaking either of these circuits relay 804 locks both itself and the select magnet over a circuit from battery through resistance 615, winding and contact of the select magnet, lead 411 in parallel with battery through the winding of relay 804 and contact 3 of relay 806, through contacts 2 and 5 of relay 804 in parallel, leads 1210, 1211 and contact 7 of relay 1111 to ground. Relay 805 operated, by closing its contact 1, closes another circuit through leads 1210 and 1211 to ground on contact 7 of relay 1111 to lock the select magnet, such as magnet 405, after relay 805 shall have released. The select magnet finally releases when relay 805 releases after the operation of the hold magnet 604.

The registration of the frame register left relays 901, 902 and 903 operated. The operation of relay 806 just described short circuits relay 901 through contact 1 of relay 806 and contact 3 of relay 903 and relay 901 releases. The release of relay 806 breaks the holding circuit of relay 902 through contact 2 of relay 901 and contact 1 of relay 806, at contact 1 of relay 806, and relay 902 releases. When relay 902 is operated a path, from battery through resistance 910, contact 1 of relay 904 and contact 1 of relay 902 to ground at contact 7 of relay 1111, short circuits a path from battery through resistance 910, winding of relay 910 and contact 1 of relay 903. When relay 902 releases, opening its contact 1, relay 904 operates. Relay 902 remains released until the second digit is registered and relay 904 remains operated until the third digit is registered.

In case a preliminary pulse is sent relay 1201 operates in a manner heretofore described and releases thereafter as for any legitimate digit but no magnet operates because the operating path from relay 1101 to the number 1 select magnet 601 is not closed until after relay 1705 has operated. Relay 1101 will be unlocked by a back contact on relay 1202 which contact is ineffective for a 7 or higher numbered digit because it is paralleled by front contacts on relay 1106 and relay 1705.

*Registering successive digits*

As many digits as may be dialed after the first are registered in the same way on the succeeding registers upon the successive releases of relay 1201. There is no further restriction against registering a one.

The hold magnet operating path from the contacts of relay 806 through the bottom winding of relay 805 is directed to the successive hold magnets 605, 606, 701, 702 etc. by transfer contacts on relays 902, 904, 905 and 906. In general a contact on each hold magnet provides a locking ground for the next one as described for the locking of hold magnet 604 through its contact 3 and contact 2 of hold magnet 603.

Every time a registration is made the operation and release of relay 806 either operates relays 901 and 902 or releases them. The operation and release of relay 902 on two registrations either operates relays 903 and 904 or releases them. Relay 905 operates from ground through contact 1 of the hold magnet 606 and lead 621, through the winding of relay 905 to battery when the C digit is dialed. Relay 906 operates from ground through contact 2 of hold magnet 703, lead 707, and the winding of relay 906 to battery when the tens digit is dialed.

*Indication that dialing is completed*

Relay 1504 operates, and then locks through its contact 3, on all calls when dialing has been completed and the marker has sent a regular release to the sender, in order to indicate that certain functions may proceed and also to prevent false registration, in case of belated dialing or switchhook manipulation, by breaking the connection through contact 1 of relay 1304 and contact 3 of relay 1303.

On straightforward class calls, the marker operates relay 2209, to indicate that no number is expected, over a path from ground in the marker through lead 350 and the winding of relay 2209 to battery. This establishes a path from battery through the winding of relay 1504, lead 1525, contact 4 of relay 2209, relay 2209 having been operated in a manner to be described, lead 2215, contact 1 of relay 1902 and lead 1919 to lead 1515, which has been traced to ground, operating relay 1504.

The marker route relays for office codes when seven digits are always required are cross-connected so as to operate relay 2208 over a circuit from battery through the winding of relay 2209, contact 2 of relay 2205, lead 2217, contact 3 of relay 1905, lead 1947, which extends through cable 1940 to ground through the marker connector. Relay 2209 operated establishes a path from ground through its contact 1, lead 2223, which extends through cable 1960, and through the winding of relay 705 to battery operating relay 705. On codes to units which may require either six or seven digits both relay 2208 and relay 2204 operate, the latter from battery through the winding of relay 2204, lead 2225, which extends through cable 2250, to ground in the marker. On codes always requiring six digits, neither relay 2208 nor 2204 are operated.

On six-digit calls, the final or units digit is registered on the tens register, which is the register associated with holding magnet 703, which operates relay 906. Relay 1504 is operated in this case from battery through the winding of relay 1504, lead 1525, contact 13 of relay 2208, contact 6 of relay 2204, lead 2213, contact 3 of relay 906, lead 921, contact 1 of relay 1803, lead 1809 and lead 2215 which extends through contact 1 of relay 1902 to ground.

On seven-digit calls the units digit is registered on the U or units register associated with hold magnet 704. The operation of hold magnet 704 establishes a circuit from battery through the lower winding of relay 1803, lead 1813, contact 1 of hold magnet 704, lead 709, lead 1122 and contact 3 of relay 1111 to ground operating relay 1803. Relay 1504 then operates from battery through the winding of relay 1504, lead 1521, contact 2 of relay 1803, lead 1809, lead 2215 and contact 1 of relay 1902 to ground. The operation of relay 906 does not operate relay 1504 in this case because relay 2208 is operated.

*Timing for seventh digit*

On calls on which the office code, that is the first three digits, does not indicate whether the complete number will consist of six or seven digits, a time delay of 3 to 6 seconds is measured during which the seventh digit may be dialed. In this case when relay 906 operates, when the sixth digit is dialed, a circuit is established from ground through contact 1 of relay 1902, lead 2215, lead 1809, contact 1 of relay 1803, lead 921, contact 3 of relay 906, lead 2213, contact 5 of relay 2204, lead 2229, contact 4 of relay 1202, to the armature of interrupter 1208. The interrupter 1208 is actuated by a mechanism well known in the art so as to engage alternately with its back contact B and its front contact F at three-second intervals. When the interrupter closes its back contact B, which may be immediately or after an interval of up to three seconds duration, the path traced from ground is extended through contact B of interrupter 1208 and the winding of relay 1207, to battery operating relay 1207 which locks through its contact 1 over the operating path. After a further interval of three seconds the armature of interrupter 1208 will engage with its front contact F and the circuit from ground will be extended through contact F, contact 2 of relay 1207, lead 1239 and the winding of relay 2205 to battery operating relay 2205 which locks through its contact 5 to ground. The operation of relay 2205 establishes a circuit from battery through the winding of relay 1504, lead 1525 and contact 6 of relay 2205 to ground operating relay 1504. If during this three to six-second interval a seventh digit is dialed, before relay 2205 is operated, the release of relay 1202 due to completion of a series of pulses constituting a digit by pulsing relays 1304 and 1109 releases relay 1207, which is locked through a contact of relay 1202. The operation of the units register under control of relay 704 operates relay 1803, as heretofore described, which operates relay 1504 and removes the operating ground from interrupter 1208.

The operation of relay 2205, in opening its contact 2, releases relay 2208 to provide the correct connections between the digit register and the selection directing relays as heretofore described.

If the seventh digit is dialed within the permitted three to six-second time interval, the operation of relay 1504 establishes a circuit from battery through the winding of relay 2206, contact 2 of relay 2204, contact 1 of relay 2205, lead 2237, contact 7 of relay 1504, lead 1529, contact 6 of relay 1906 and contact 5 of relay 1902 to ground. The operation of relay 2206 releases relay 2111 to enable trunk test to be made and it provides for five-digit out pulsing to be described hereinafter.

*Communication with marker*

The manner in which a sender seizes a marker will be described in the following sections, together with the manner the sender sends to the marker the office code and other information, how it receives back all necessary information for the sender to make its selections, breaks down the direct connection by which the above information was transmitted, and receives a signal by way of the trunk when the marker has established a connection through trunk and office frames, so that the sender may proceed with its selection beyond those frames. The manner in which the sender rejects all information received from the marker and seizes a marker for a second or third trial in case the first or second marker encounters any trouble in its functions or the sender later encounters a recorder condition in its selections beyond will also be described under the following headings.

*First trial with marker*

When relay 905 operates indicating that three digits have been dialed, off-normal ground is supplied from contact 2 of relay 1111, lead 1135, leads 1515 and 1530 through contact 5 of relay 905, lead 921, contact of relay 1908, contact 2 of relay 1903, contact 4 of relay 1912 and the winding of relay 1906 to battery operating relay 1906. Relay 1906 also operates when relays 610 and 1705 are both operated on an 11X code over a path from off-normal ground through leads 1515 and 1737, contact 3 of relay 1705, lead 1736, contact 5 of relay 610, lead 1961, which extends through cable 1960, contact of relay 1908 and contact 2 of relay 1903, from which point the path has been traced to battery through the winding of relay 1906.

Relay 1906 operated connects battery through its contact 3, lead 1921, contact 1 of relay 1505 and lead 1922 to parallel branches. One branch extends directly through lead 1920 in cable 1930 to the marker connector. The other extends through contact 9 of relay 1902 and lead 1951 to the marker connector. This connects the sender to an idle marker as soon as a connector and a marker are available.

Office code and other information passes from the sender to the marker over some of these leads as described hereinafter, and after decoding, selection information passes from the marker to the sender over other leads.

After decoding and seizing office and incoming trunk frame connections, the marker grounds lead 1531, which is one of the leads through the marker connector and which extends through the winding of relay 1501 to battery operating the relay. The ground applied by the marker, after operating relay 1501, extends the path through contact 4 of relay 1501, lead 307, through the sender link and continuing into the trunk through contact 4 of relay 296 and the winding of relay 202 to battery operating relay 202. The operation of relay 202 extends the connection through contact 4 of relay 202 to another point in the marker, not shown, where another ground is applied to it. This second ground holds relay 1501 locked up for a time after the direct connection between sender and marker is broken by the release of the marker connector.

When the marker has sent its selection information to the sender and has also operated relay 1501, it grounds lead 2253 through the marker connector. This establishes a circuit from ground through lead 2253, contact 1 of relay 2201 and the winding of relay 1902 to battery operating relay 1902, which locks through its contact 3 and contact 5 of relay 1906 to ground through contact 5 of relay 1902, as long as relay 1906 remains operated. Relay 1906 remains operated for the duration of sender usage unless a second trial is required. Relay 1902 operated breaks lead 1951, at contact 4, thereby releasing the marker connector and breaking all direct connections between sender and marker.

The sender is still in indirect communication with the marker through the sender link and incoming trunk. When the marker has completed its work of establishing a connection, it removes ground from lead 1931 and relay 1501 releases. This signals the sender to proceed with its work.

*Second trail with marker*

If the first marker encounters trouble in receiving information from the sender, in decoding, or in transmitting information to the sender, it sends a trouble release by grounding lead 1952 which extends through the top winding of relay 1901 to battery operating relay 1901, which in turn establishes a path from ground through the contact of relay 1901, lead 1953, contact 5 of relay 1206, lead 1954, contact 1 of relay 1907 and the winding of relay 1903 operating relay 1903. Relay 1903 operated releases relay 1906 by opening its contact 2 which in turn disconnects battery from lead 1951, thereby releasing the connector and breaking all direct connections between the sender and the marker. Lead 1952 being broken with the rest, relay 1901 releases and relay 1907 operates in series with relay 1903 over a path from battery through the winding of relay 1903, winding of relay 1907, contact 1 of relay 1903, contact of relay 1908 and contact 4 of relay 1909 to conductor 1961 which extends to ground. Relay 1907 operated closes a path from ground through lead 1961, contact of relay 1908 and contact 4 of relay 1909 in parallel, contact 4 of relay 1907, and contact 4 of relay 1912 through the winding of relay 1906 to battery reoperating relay 1906. This establishes a second connection through the marker connector to the marker. This may be the same marker as before but usually will be a different one, since the first marker holds itself busy momentarily after sending a trouble release. Relay 1907 being operated on the second trial, ground, which was formerly supplied through contact of relay 1912 and contact 6 of relay 1907 through lead 1943 to the marker connector for the first trial, is transferred at contact 5 of relay 1907 to lead 1945 to the marker connector for the second trial, thus notifying the marker of this condition. The marker to which the sender is connected on the second trial will try to establish the connection as did the first marker except that the order of testing trunks is reversed.

If the first marker encounters trouble or an all-paths busy condition when trying to establish connection to a chosen idle trunk or overflow trunk after its direct connection to the sender is broken down, it sends a trouble release by grounding lead 309 through the trunk frame connector and incoming trunk for a moment only. The marker grounds lead 1942 on first trials, lead 1952 on second trials and leads 1942 and 1952 on third trials when all trunks including overflow trunks are found busy. In the case of all channels busy ground on lead 309 with relay 1501 operated establishes a circuit from ground over lead 309 through contact 3 of relay 1501, lead 1533 and the bottom winding of relay 1901 to battery operating relay 1901. Relay 1903 then operates over a path heretofore traced. Removal of the ground releases relay 1901 and permits relay 1907 to operate in series with relay 1903 as heretofore described. The operation of relay 1903 by opening its contact 2 releases relay 1906 which by opening its contact 5 in turn releases relay 1902, releases also all selection register relays and all relays fed by off-normal battery. The operation of relay 1907 operates relay 1906 again, as heretofore described, with the result that a second connection is made through the marker connector to the marker. The marker now engaged will try to establish the connection as did the first marker.

If a reversed battery reorder signal is received from the terminating trunk, polarized relay 2302 operates to engage its contact 2. The operation of relay 2302 in turn operates relay 2303, from ground through the armature and contact 2 of relay 2302, lead 2327, contact 1 of relay 2506, lead 2527, contact 2 of relay 2203, contact 6 of relay 2017, lead 2020 and the top winding of relay 2303 to battery operating relay 2303. The operation of relay 2203 establishes a path from ground through its contact 5, lead 2329, contact 1 of relay 1907, if relay 1907 is released, and through the winding of relay 1903 to battery operating relay 1903, or through contact 2 of relay 1907, if relay 1907 is operated, contact 3 of relay 1911 and the winding of relay 1912 to battery operating relay 1912. The operation of relay 1903 by opening its contact 2, or the operation of relay 1912 by opening its contact 4, releases relay 1906 which in turn, by opening its contact 5, releases relay 1902. The release of relay 2603 opens the fundamental circuit which releases relays 2302 and 2303, whereupon relay 1907 operates, in series with relay 1903, or relay 1911 operates, in series with relay 1912 and through lead 1961 to ground. The operation of either relay 1907 or 1911 reoperates relay 1906. The path through contacts 4 of relays 1907 and 1912 for the operation of relay 1906 has heretofore been traced. The path through the contact of relay 1911 extends from ground on lead 1961 through contact of relay 1908, contact 2 of relay 1903 and contact 1 of relay 1911 to battery through the winding of relay 1906 operating relay 1906.

When a test for an open trunk is required but fails, a second trial is made. Relay 2103 operates over a path from battery through contact 2 of relay 1906, lead 1981, winding of relay 2103, contact 1 of relay 2105 and contact 1 of relay 2111 to ground. Relay 2107 then operates from battery through lead 1981, winding of relay 2107, contact 4 of relay 2103 and contact 1 of relay 2111 to ground. This establishes a path from ground through contact 3 of relay 2107, lead 2129, contact 3 of relay 1910, lead 1929, contact 3 of relay 2605, contact 1 of relay 2607 and lead 2629 to the armature of interrupter 1915. Assuming that relay 1907 does not operate, the first time contact 1 of interrupter 1915 closes, it extends the circuit through the winding of relay 1904 to battery operating relay 1904 which locks directly to lead 2629. Three seconds later relay 1909 operates and locks when the armature of interrupter 1915 engages its front contact 2 which extends the ground from lead 2629 through the winding of relay 1909 to battery. The locking path for relay 1909 extends through its contact 3, contact 1 of relay 1910, lead 1926 and contact 5 of relay 1301 to ground. The operation of relay 1909 extends ground from the interrupter contacts, contacts 3 and 2 of relay 1909 to lead 1948 which extends through cable 1940 to the marker. This indicates to the marker when reseized that it was called in because of a failure on a previous attempt to find an available trunk. Slow to release relay 1908 releases when contact 1 of relay 1909 opens. During the interval while relays 1908 and 1909 are both operated relay 1906 releases as the operating path for relay 1909 extends in parallel through the contact of relay 1906 and contact 4 of relay 1909 which are both opened. Since relay 1902 is now released the start lead 1951 to the marker connector is reclosed and a marker is seized with lead 1948 grounded. Once relay 1910 operates, either following a successful trunk test as indicated by the operation of relay 1902 or during a second trial as indicated by the operation of relay 1903 it locks and prevents the open trunk failure test from being made once more.

*Third trial with marker*

If a trouble condition, an all paths busy or reverse battery signal causes two trouble releases, a third marker will be called in, much as the second was, except that this time relays 1912 and 1911 will operate because relays 1903 and 1907 are operated and locked up. The operation of relay 1912 by closing its contact 2 grounds lead 1944 to the marker.

Relay 1912 being operated on the third trial, lead 1944 to the marker will be grounded to notify the marker to establish connection to an overflow trunk. The marker will send selection information to the sender, operate relay 1591, operate relay 1902, connect the incoming trunk to an overflow trunk and then release relay 1591 just as described for connecting to a regular trunk. Trunk test is cancelled. In case the marker cannot find an idle reorder trunk, or finding one cannot find an idle path to it, it will take the action described hereinafter.

If the third trial encounters any one of the trouble conditions which cause a retrial, lead 1952 will be momentarily grounded a third time operating relay 1901. Relays 1903, 1907, 1912 and 1911 all being locked up, the operation of relay 1901 will in turn operate relay 2201 over a path from ground through the contact of relay 1901, lead 1953 contact 5 of relay 1206, lead 1954, contact 2 of relay 1907, contact 2 of relay 1911 and the winding of relay 2201 to battery operating relay 2201, which locks to ground through lead 1919. The operation of relay 2201 in turn operates relay 1902 over a path from battery through the winding of relay 1902, lead 1971 through contact 2 of relay 2201 to ground. Relay 1902 operated holds the relays operated by the marker. Relay 1902 operated breaks start lead 1951 at its contact 4 releasing the marker connector. When relay 1504 operates indicating that dialing has been completed relay 1206 operates from battery through the winding of relay 1206, lead 1240, contact 4 of relay 1301, lead 1340, contact 4 of relay 2201, lead 2261 and contact 4 of relay 1504 to ground. Relay 201 in the trunk operates from battery through its winding contact 8 of relay 202, lead 309, which extends through the sender link and controller circuit, lead 309, contact 2 of relay 1501, lead 1535, contact 4 of relay 1411, contact 8 of relay 1410, lead 1441, contact 6 of relay 1206, lead 1215, lead 1515, lead 1135 and contact 2 of relay 1111 to off-normal ground. Relay 201 operated locks through its contact 2 to ground through contact 1 of relay 205. Relay 201 operated establishes a circuit through its contact 1 and the winding of relay 206 operating relay 206. Relay 1413 operates from battery through its winding, lead 1445, contact 8 of relay 1206, lead 1445, contact 4 of relay 1501 and lead 307 which extends into the trunk through the sender link, contact 5 of relay 206, contact 5 of relay 205, contact 2 of relay 204, contact 1 of relay 203 and through contact 1 of relay 205 to ground. Relay 1413 operated in turn operates relay 1412 from ground through contact 2 of relay 1413 and the winding of relay 1412 to battery. Relay 1412 operated locks through its contact 4, lead 1435, lead 1321, lead 1135 and contact 2 of relay 1111 to ground. Relay 1412 operated, by opening its contact 3, releases relay 205 in the trunk. This in turn releases relay 1413 by opening contact 5 of relay 205. Relay 1503 now operates from ground through contact 1 of relay 1413, contact 2 of relay 1412, lead 1447 and the winding of relay 1503 to battery. This in turn releases slow to release relay 1502 by opening contact 1 of relay 1503. Relay 1502 was operated heretofore from ground through contact 2 of relay 1111, lead 1135, lead 1321, lead 1515, lead 1507, contact 1 of relay 1503, lead 1535, contact 1 of relay 1411, lead 1449 and the winding of relay 1502 to battery. The release of relay 1502 establishes a path from battery through the winding of relay 1411, lead 1451, contact 1 of relay 1502, contact 2 of relay 1503, lead 1507, lead 1515, lead 1321, lead 1135 and contact 2 of relay 1111 to ground operating relay 1411. The operation of relay 1411 by opening its contact 2 opens the locking path through conductors 1120 and 1420 which was holding relays 1111, 1301 and 1302 operated. This leaves the trunk with no cross points closed in the no-connection condition.

*Information from sender to marker*

The sender transfers to the marker the number of the incoming frame involved, the class of trunk, the office code, first, second or third trial signal and a trunk guard failure signal by grounding a selections of leads F00 or F10, CS0 to CS6, F0 to F4, FA5 or FB5, B0 to B4, BA5 or BB5, D0 to D4, DA5 or DB5, G0 to G4, GA5 to GB5, 1943, 1945, 1944 and 1948.

The code used in transmitting frame and code to the marker is as follows. One lead in the set 0 to 4 is always grounded and only one, and one lead in the set A5 or B5, the A5 standing for above 5 and the B5 standing for below 5. The combination then gives the number required. In addition, in the case of frame indication, one of the leads F00 or F10 is grounded to indicate a frame below ten or above 10 respectively.

Lead 1943 is grounded on first trials, lead 1945 on second trials and 1944 on third trials. Lead 1948 is grounded when the marker is called in to record a trunk test failure.

*Information from marker to sender*

The marker transmits selection information to the sender by grounding a selection of leads to operate selection register relays in the sender. The selection register relays do not lock up until relay 1902 is operated by the marker so they may be released and set up in a different pattern if the marker reroutes the call. Even after they are locked up they may be released for a second or third trial by releasing relay 1906.

Relays 2203 and 2208 are used to control the start pulsing signal and the connections between the digit registers and the selection steering relays 2503, 2509, 2504, 2510, 2506, 2511, 2601 and 2604. The treatment of reverse battery received from the terminating equipment, due to reversed trunks for example, is also the function of relay 2203 as described hereinafter.

Relay 2203 is operated by the marker if the step-by-step pulses are to be transmitted directly to a terminating sender associated with the outgoing tandem trunk. In this case the pulsing will not start until the tandem sender receives a reverse battery signal (off hook) followed by normal battery (on hook).

Relay 2203 is not operated in connections to step-by-step selectors, even though a terminating sender is associated with some trunks subsequent to the first step-by-step selector. In this case the out pulsing starts immediately after open trunk test, assuming the outgoing trunk is connected with normal (on-hook) polarity which does not operate relay 2302. If a terminating sender is associated with the connection the trunk with which it is associated, by a link circuit or sender selector, must be connected to have its tip and ring polarity normally off-hook. The tandem sender, if relay 2203 is not operated, will recognize this reverse-battery signal as a stop-dialing signal. When the terminating link or sender selector has selected an idle sender and this terminating sender is in condition to receive dial pulses, the tip and ring polarity is restored to on-hook condition. The tandem sender then pulses the remaining digits into the terminating sender. A reverse battery signal subsequent to a stop-dialing signal, but before tens digit has been sent will be recognized by the tandem sender as a recorder signal.

Relay 2208 is operated by the marker for offices where seven digits are dialed, or where either six or seven digits may be dialed. Relay 2208 is not operated on calls to offices for which six digits are dialed. Relay 2208 operates relay 705 from battery through the winding of relay 705 and lead 2213, which extends through cable 1960 and continues through contact 1 of relay 2208 to ground. The function of relays 2208 and 708 is to connect the selection steering relays 2503, 2509, 2504, 2510, 2527, 2511, 2601 and 2604 to the proper digit register cross points and hold magnet off-normal springs, whether six digits or seven digits are registered for the called number. Relays 2503 and 2509 are operated for the transmission of the thousands digit, relays 2504 and 2510 for the transmission of the hundreds digit, relays 2506 and 2511 for the tens digit, and relays 2601 and 2604 for the units digit. When a seven digit number is registered, the numerical digits, thousands, hundreds, tens and units are recorded on the correspondingly designated registers. With relays 2208 and 705 operated, therefor, relays 2503 and 2509 are connected to the thousands register, relays 2504 and 2510 to the hundreds register, relays 2506 and 2511 to the tens register and relays 2601 and 2604 to the units register.

However, when a six-digit number is dialed the thousands digit is recorded on the C register, the hundreds digit on the thousands register, the tens digit on the hundreds register and the units digit on the tens register.

Therefore with relays 2208 and 705 now operated, the connections to the four sets of relays 2503, 2509; 2504, 2510; 2506, 2511; and 2601, 2604 are shifted to the new positions of the digits on the registers.

Relay 2208 also affects the operation of relay 1504 as heretofore described.

When class of service relay 1905 is operated for distant operator class of incoming trunk, the sender expects to receive seven digits, even on calls listed locally as six-digit numbers. In this case the operated class-of-service relay 1905 connects lead 1947 from the marker, which lead is employed to operate relay 2208 when relay 1905 is normal, through make contact 2 of the operated relay 1905 and resistance 1969 to battery, to satisfy the marker and relay 2208 is operated from ground through contact 7 of relay 1906, contact 4 of relay 1905, lead 2217 contact 2 of relay 2205 and the winding of relay 2208 to battery.

Relays 2001, 2002, 2005 and 2101 are operated by the marker when six digit out pulsing is required. The sixth digit may be any digit 0 to 9 as determined by these relays as follows:

| Sixth Digit | Leads Grounded | Relays Operated |
|---|---|---|
| 1 | None | None |
| 2 | 1931 | 2001 |
| 3 | 1932 | 2002 |
| 4 | 1931–1932 | 2001–2002 |
| 5 | 1935 | 2005 |
| 6 | 1937 | 2101 |
| 7 | 1937–1931 | 2101–2001 |
| 8 | 1937–1932 | 2101–2002 |
| 9 | 1937–1931–1932 | 2101–2001–2002 |
| 0 | 1937–1935 | 2101–2005 |
| No Sixth Digit | 2254 | 2202 |

If no sixth digit is to be out pulsed the cross-connection in the marker is made so as to operate relay 2254 in the sender. If relay 2254 is not operated the out pulsing starts when relays 2501 and 2507 relays are operated. These two relays are operated following trunk test and connect the counting relays to the relays indicated in the above table for pulsing the required sixth digit. If relay 2254 is operated the out pulsing starts with relays 2502 and 2508 or 2503 and 2509 for five digit or four digit out pulsing and the relays in the above table are not used.

The class of call is indicated by the operating of the following relays.

| Relays | Class |
|---|---|
| 2209 [1] | Overflow vacant codes or straightforward routing does not wait for numerical digits. |
| 2402–2202 | Four-digit step-by-step class (loop pulsing A). |
| 2404–2202 | Four-digit step-by-step class (loop pulsing B). |
| 2402–2404–2202 | Four-digit step-by-step class (battery and ground pulsing). |
| 2402–2206–2202 | Five-digit step-by-step class (loop pulsing A). |
| 2404–2206–2202 | Five-digit step-by-step class (loop pulsing B). |
| 2402–2404–2206–2202 | Five-digit step-by-step class (battery and ground pulsing). |
| 2402 | Six-digit step-by-step class (loop pulsing A). |
| 2404 | Six-digit step-by-step class (loop pulsing B). |
| 2402–2404 | Six-digit step-by-step class (battery and ground pulsing). |

[1] The route relays in the marker for this class are cross-connected to operate a particular relay in the marker which grounds leads 350 and 1946. Battery on lead 1946 is supplied from the sender in order to satisfy the marker operation in this case.

Relays 2209, 2402, 2404 and 2206 are operated from the marker in the above combinations by the proper cross connection of the terminals of the route relays. Relay 2254 is operated in connection with the six-digit out pulsing relay cross connection as described above.

Loop pulsing A is used for pulsing into—
1. Local switch train.
2. AB toll train.
3. Incoming repeaters.

Loop pulsing B is used for pulsing into—
1. Local repeater circuits.

Battery and ground pulsing is used for pulsing into—
1. Local switch train.
2. AB toll train.

For six-digit out pulsing neither relay 2254 nor relay 2206 is operated and pulsing begins with relays 2501 and 257 operated. For five-digit out pulsing both relay 2254 and relay 2206 are operated and pulsing begins with relays 2502 and 2508 operated. For four-digit out pulsing only relay 2254 is operated and pulsing starts with relay 2503 and 2509 operated.

In the case of office codes where either six or seven digits may be dialed, it is required that when six digits are dialed four digits be out pulsed, consisting of the digits recorded on the C register and the thousands, hundreds and tens registers; whereas if seven digits are dialed five digits shall be out pulsed consisting of an arbitrary digit 0 to 9 and the digits recorded on the thousands, hundreds, tens and units registers.

For these codes the marker route relays are cross-connected to operate relays 2204, 2202 and 2208 and relays 2006, 2003, 2004 and 2102 to give the required arbitrary digit.

Relay 2204 is the distinctive class relay for this type of call. As described in the foregoing relay 2205 will operate on six-digit calls. Operation of relay 2204 by opening its contact 2 releases relay 2208, which, in turn, by opening its contact 1, releases relay 705. Relays 2208 and 705 connect the selection steering relays to the digit registers for four-digit out pulsing. Operation of relay 2204 also releases relay 2111 to permit trunk test to proceed. Since relay 2202 is operated and relay 2206 is not operated, relays 2503 and 2509 will be operated following trunk test, which is also the condition required for four-digit out pulsing.

If the seventh digit is dialed relay 2205 is not operated. When relay 1504 operates relay 2206 is operated through back contact 1 of relay 2205 and front contact 2 of relay 2204. Operation of relay 2205 releases relay 2111 to permit trunk test to proceed and causes steering relays 2502 and 2508 to be operated for five-digit out pulsing. Relays 2502 and 2508 are connected to relays 2006, 2003, 2004 and 2101 for the arbitrary fifth digit. Since relays 2208 and 705 are operated the steering relays are also properly connected to the digit registers for five-digit out pulsing.

When five-digit out pulsing is required the fifth digit, which may be any digit from 0 to 9, is set up by the marker on relays 2006, 2003, 2004 and 2101 as shown in the following table.

| Fifth Digit | Leads Grounded | Relays Operated |
|---|---|---|
| 1 | None | None |
| 2 | 1936 | 2006 |
| 3 | 1933 | 2003 |
| 4 | 1936-1933 | 2006-2003 |
| 5 | 1934 | 2004 |
| 6 | 1938 | 2102 |
| 7 | 1938-1936 | 2102-2006 |
| 8 | 1938-1933 | 2102-2003 |
| 9 | 1938-1933-1936 | 2102-2003-2006 |
| 0 | 1938-1934 | 2102-2004 |

*All regular and overflow trunks busy; all channels busy*

If all trunks to the called point and all overflow trunks are busy the marker grounds lead 1942 on first trials and lead 1952 on second trials, thereby operating relay 2201 or relay 1901. Relay 2201 locks and operates relay 1902. Relay 1902 locks the relays operated by the marker and releases the marker connector. When relay 1504 operates, indicating that dialing is completed, relay 1206 operates and sets the trunk in the no connection position, as heretofore described. If relay 1901 operates, a third trial requesting an overflow trunk is made. On third trial if all overflow trunks are busy, the marker grounds leads 1942 and 1952 and the sender responds as heretofore described.

On first, second or third trials if all channels are busy, the marker grounds lead 1952 and the sender responds as to any trouble release signal.

*Step-by-step completion—Step-by-step classes*

Step-by-step calls can be classified under four different classifications as follows:

With respect to the number of digits to be transmitted, either four, five or six digits. The marker operates relay 2202 for four-digit out pulsing; relays 2202 and 2206 for five digits and neither of relays 2202 or 2206 for six digits.

With respect to the type of pulsing, either "loop A," "loop B" or battery and ground pulsing.

The marker operates relay 2402 for "loop A" pulsing. In this case the only resistance in the pulsing loop in the sender is the 80-ohm winding of relay 2302 shunted by a 60-ohm noninductive winding 2309. However, initially, and during the interdigital interval between each train of pulses a 300-ohm resistance 2422 is introduced into the fundamental to avoid a possible singing condition of a voice repeater in route, this is necessary particularly when the loop between sender and repeater is short.

The marker operates relay 2404 for "loop B" pulsing. In this case an additional resistance 2421 is inserted in the sender pulsing loop to limit the current in the pulsing relay of local repeater circuits.

The marker operates both relay 2402 and 2404 for battery and ground pulsing. In this case the sender loop is a 250-ohm resistance 2409, but when pulsing starts battery on the ring and ground on the tip each through a 210-ohm resistance 2451 and 2408 are substituted for the resistance bridge. Relay 2403 disconnects the contacts of the pulsing relay 2304 from the pulsing loop and connects them to the winding of relay 2448. The contacts of relay 2448 are connected to the pulsing loop for battery and ground pulses.

With respect to the number of digits registered, either three digits, six digits or seven digits.

Three-digit codes are indicated by the operation of relay 2209 by the marker. The connections are completed on a straight-forward basis to operator type trunks from the tandem office multiple.

When seven-digit numbers are dialed relay 2208 is operated by the marker. Relay 2208 and its auxiliary relay 705 make proper connections between the digit registers and the selection steering relays as heretofore described.

With respect to the type of completion, either to a step-by-step selector, or to a dial pulse terminating sender.

Relays 2402 and 2403 are operated for calls to step-by-step selectors.

Relay 2203 in addition to relay 2402 and 2403 are operated for connections to a terminating sender. The function of relay 2203 was previously described.

*Trunk test*

When the marker has been seized and the route relay corresponding to the registered office code has been operated the marker operates the necessary sender relays for the particular classification of the call as described in the last preceding section. The marker also operates relay 1501, followed by relay 1902. On regular step-by-step class relay 2606 operates from battery through the winding of relay 2606, lead 2624, contact 4 of relay 2203, lead 2262, contact 1 or relay 1501, lead 1122 and contact 3 of relay 1111 to ground. When the marker has established connection to an outgoing trunk it releases relay 1501 which was being held by a connection from the marker through the tandem trunk and sender link circuits through lead 307.

The operation of relays 2606 and 1902 operates relay 2602 over a path from battery through contact 4 of relay 1906, lead 1973, lead 2513, winding of relay 2602, contact of relay 2606, lead 2643, lead 1974 and contact 2 of relay 1902 to ground. When relay 2606 is released by the release of relay 1501, relay 2505 operates over a path from battery through contact 4 of relay 1906, lead 1973, lead 2531, winding of relay 2602, winding of relay 2505, contact 5 of relay 2602, lead 2644, contact 1 of relay 2507, contact 1 of relay 2508, contact 1 of relay 2509, lead 2643, lead 1974 and contact 2 of relay 1902 to ground. This closes the fundamental tip and ring from the selected trunk to the trunk test circuit in the sender as follows: From tip lead 305 in the sender link and control circuit through contact 2 of relay 2607, lead 2615, contact 5 of relay 2605, lead 2130, contact 1 of relay 2107, contact 3 of relay 2111, 21,500-ohm resistance 2113, winding of relay 2112, lead 2131, lead 2616, contact 5 of relay 2607 and lead 306 to the sender link and controller circuit.

This trunk test requires relay 2111 to be normal and relay 2107 to be operated. Relay 2107 is operated by the operation of relay 2103 with relay 2111 normal when off-normal battery is supplied to the windings of relay 2103 and 2107 by the operation of relay 1906. The circuit for the operation of relay 2103 extends from battery through contact 2 of relay 1906, lead 1981, winding of relay 2103, contact 1 of relay 2105 and contact 1 of relay 2111 to ground. After the operation of relay 2103 the path for the operation of relay 2107 may be traced from lead 1981 through the winding of relay 2107, contact 4 of relay 2103 and contact 2 of relay 2111 to ground. Relay 2107 operated locks to this same ground through its contact 2. However, relay 2111 may be operated under certain conditions by the selection progress synchronizing circuits, that is, the connections between the selection steering relays and the digit registers, whereby trunk test and out pulsing are not allowed to proceed unless the dial registration has progressed to a suitable point.

When relay 2602 operates, the winding of relay 2111 is connected to a synchronizing path for trunk test and relay 2602 will be operated and trunk test thereby halted under the following conditions:

For four-digit out pulse class, on a seven-digit dialed class, a path is established from battery through the winding of relay 2111, lead 2128, contact 3 of relay 2602, lead 2645, contact 4 of relay 2206, contact 4 of relay 2202, contact 5 of relay 2208, lead 2245, contact 1 of the thousands hold magnet 701, lead 713, contact 1 of relay 1504, lead 1122 and contact 3 of relay 1111 to ground operating relay 2111, which will be released when the thousands digit is dialed.

If relay 2204 is operated on a call on which either six or seven digits may be dialed, relay 2111 is operated from battery through its winding, lead 2128, contact 3 of relay 2602, lead 2645, contact 4 of relay 2206, contact 4 of relay 2202, contact 1 of relay 2206, contact 4 of relay 2205, contact 4 of relay 2204, lead 1122 and contact 3 of relays 1111 to ground. If six digits are dialed this path is broken when relay 2205 operates. If seven digits are dialed this path is broken by the operation of relay 2206 which occurs when relay 1504 operates. In either case relay 2111 releases.

Relay 2606 has a minimum release time of 0.3 second. This delay is introduced in order that the total time from the seizure of the trunk by the marker to the closing of the pulsing loop followed by trunk test will be about 0.75 second. This delay is provided to insure the release of terminating equipment on a trunk which has been reseized immediately after its release from a previous connection. This delay is not necessary on a step-by-step sender class, so the operation of relay 2606 is omitted on this class, since relay 2203 is then operated and the path to the winding of relay 2206 is opened at contact 4 of relay 2203. The operation of relay 2203 establishes a path for the operation of relay 2602 directly, extending from battery through contact 4 of relay 1906, lead 1973, lead 2531, winding of relay 2602, lead 2622, contact 5 of relay 2203, lead 2262, contact 1 of relay 1501, lead 1122 and contact 3 of relay 1111 to ground.

The trunk test circuit is of too high resistance to operate the trunk line relay, but relay 2112, through the winding of which the fundamental tip and ring path was traced, operates. This establishes a path from ground through the contact of relay 2112, lead 2132 and the winding of relay 2207 to battery operating relay 2207. The operation of relay 2207 establishes a path from ground through contact 2 of relay 2207, lead 2265, contact 4 of relay 2602, contact 1 of relay 2603, lead 2628, winding of relay 2007, winding of relay 2009, lead 1981 and contact 2 of relay 1906 to battery operating relays 2007 and 2009. The operation of relay 2107 established a circuit from ground through contact 3 of relay 2107, lead 2129, lead 2335, contact 2 of relay 2603, lead 2334 and the winding of relay 2008 to battery operating relay 2008. Locking ground is provided for relays 2007 and 2009 through contact 1 of relay 2008 and the contact of relay 2009.

The operation of relay 2007 operates either relay 2501, 2502 or 2503 depending on whether six, five or four digits, respectively, are to be out pulsed. The circuit may be traced from ground through the contact of relay 2007, lead 2059, contact 2 of relay 2602, contacts 5 of relay 2604, 2511, 2510, 2509, 2508, 2507 and lead 2542 to the top armature of relay 2202. Assuming relay 2202 is not operated for the six-digit out pulsing condition, the circuit continues through contact 1 of relay 2202, lead 2543, winding of relay 2507, lead 1973 and contact 4 of relay 1906 to battery. For five-digit out pulsing relays 2202 and 2206 will be operated and the circuit extends from the top armature of relay 2202 through its contact 2, contack 5 of relay 2206, lead 2266, contact 4 of relay 1206, lead 1248, winding of relay 2502, lead 1973 and contact 4 of relay 1906 to battery operating relay 2502. If relay 2202 is operated and relay 2206 is not operated, for the four-digit out pulsing condition, the path extends from the top armature of relay 2202 through its contact 2, contact 6 of relay 2206, lead 2267, winding of relay 2503, lead 2513, lead 1973 and contact 4 of relay 1906 to battery operating relay 2503.

Whichever relay 2501, 2502, or 2503 is operated a path is closed from battery through the winding of relay 2111, lead 2128, which extends either through contact 2 of relay 2503, contact 3 of relay 2502, contact 1 of relay 2501, depending on which of these three relays is operated, and then continues through lead 2546, contact 2 of relay 2605, lead 2643, lead 1974 and contact 2 of relay 1902 to ground operating relay 2111. Relay 2111 operated releases relay 2107, which in turn releases relay 2008. The release of relay 2107 releases the trunk test circuit, releasing relay 2112, which in turn releases relay 2207. The release of relay 2008 opens the locking circuit for relays 2007 and 2009.

The release of relay 2007 allows relay 2507, 2508 or 2509 to operate each in series with its respective counter relay 2501, 2502, or 2503, and the particular operated relay locks. In the case of relay 2507 the circuit extends from ground through contact 2 of relay 1902, lead 1974, contact 1 of relay 2509, contact 1 of relay 2508, contact 3 of relay 2501, winding of relay 2507, and winding of relay 2501, from which point the circuit has been traced to battery. In the case of relay 2508 ground is supplied from the same source through contact 1 of relay 2509, contact 5 of relay 2502, winding of relay 2507, and lead 2538 to lead 2266, from which point the circuit has been traced through the winding of relay 2502 to battery. In the case of relay 2509 ground is supplied over the same lead 1974 and the circuit extends through contact 1 of relay 2510, contact 5 of relay 2503, winding of relay 2509 and the winding of relay 2503 to battery over the same path through lead 1973. Relays 2501 and 2507 operated lock through contact 3 of relay 2501. Relays 2502 and 2508 operated lock through contact 5 of relay 2502. Relays 2503 and 2509 operated lock through contact 5 of relay 2503. The operation of any one of relays 2507, 2508 and 2509 opens the locking circuit for relays 2602 and 2605 which extends through contact 1 of each of these relays 2602 and 2605 release.

*Generation of step-by-step pulses*

The step-by-step pulsing circuit consists of start-step-pulsing relay 2405, pulse generating relay 2406, pulsing relay 2304, and check relay 2305. Relay 2406 is a non-biased condenser-timed polar relay. In series with the bottom winding of relay 2406 are connected polar relay 2305 and polar relay 2304, which operate and release with polar relay 2406. Pulsing relay 2405, sometimes with relay 2448, furnishes step-by-step pulses and check relay 2305, together with other relays, count them. When relay 2603 operates the circuit is prepared for pulsing by connecting ground to the windings of the pulse generating relay 2406. The circuit is established from ground through its contact 3, lead 2343, lead 2435, contact 1 of relay 2405, contact 3 of jack 2407, to the junction of the top and bottom windings of pulse generating relay 2406. The path through the bottom winding of relay 2406 continues through contact 2 of jack 2407, lead 2434, windings of relays 2305 and 2304 in series, lead 2328, and, if relay 2403 is normal, through its contact 12 and resistance 2415 to battery. The circuit through the top winding of relay 2403 extends through contact 1 of jack 2407 to the right-hand terminal of the timing condenser 2428. The left-hand terminal of the timing condenser 2428 is connected in parallel to the fixed terminal of the armature of relay 2406 which for this condition is grounded. The armatures of relays 2304 and 2305, through the windings of which the path through the bottom winding of relay 2406 was traced, and the armature of relay 2406 are all actuated to engage with their respective right-hand contacts. When relay 2405 operates, in a manner to be described, to start pulsing, ground is removed from the windings of relay 2406 and its associated network and this causes relays 2304 and 2305 to release and, after a timed interval, relays 2406, 2304 and 2305 reoperate. These relays will then release and operate in unison at time intervals determined by the contestants of the network. When sufficient pulses have been sent relay 2405 releases thereby preventing relay 2406 from reoperating after the last pulse and holding relays 2304 and 2305 operated until the circuit is ready to transmit the next digit.

The pulse generating circuit is arranged to provide two sets of timed intervals, one for loop pulsing and the other for battery and ground pulsing. With relay 2403 normal the resistance network is such as to provide one set of timed intervals for loop pulsing and when relay 2403 is operated a different resistance network is connected into the circuit to provide the proper set of timed intervals for battery and ground pulsing. Since relay 2403 is controlled by the marker the proper intervals are provided as required for the particular routing of the call.

*Preparation to transmit pulses*

The operation of the pulsing relay 2406 is started by the operation of relay 2405. The operation of relay 2405 depends on whether relay 2203 is operated or not. Relay 2203 is operated when the outgoing trunk is associated with a terminating sender, in which case a reverse battery followed by a normal battery is required as a start signal. If the outgoing trunk connects to a step-by-step selector, relay 2203 is not operated and pulsing starts immediately after trunk test. The operating path for relay 2405 is controlled by contact 1 of relay 1913 as follows: ground through contact 1 of relay 2007, lead 1528, contact 2 of relay 1505, lead 1980, contact 1 of relay 1913, contact 1 of relay 1914 or contact 1 of relay 2203, lead 2061, contact 2 of relay 2008, lead 2437 and the winding of relay 2405 to battery.

On regular step-by-step class relay 1913 is operated over a path from ground through contact 1 of relay 2302, contact 1 of relay 2301, lead 2063, contact 10 of relay 2017, lead 2347, contact 7 of relay 2203, lead 2620, contact 4 of relay 2605, lead 2645, contact 6 of any one of relays 2509, 2508 and 2507, lead 1975, winding of relay 1913, lead 1973 and contact 4 of relay 1906 to battery.

On terminating sender class the above operating path for relay 1913 is opened at relay 2203. The sender waits for reverse battery from the terminating sender to operate the armature of relay 2302 to its contact 2. This establishes a circuit from ground through contact 2 of relay 2302, lead 2327, contact 1 of relay 2506, lead 2527, contact 3 of relay 2203, lead 2270, contact 8 of relay 2017, lead 2065, winding of relay 2301, lead 2333, lead 2531, lead 1973 and contact 4 of relay 1906 to battery operating relay 2301. When the reverse battery signal terminates, indicating that the terminating sender is ready to receive pulses, relay 2302 reengages its contact 1. This establishes a circuit from ground through contact 1 of relay 2302, contact 2 of relay 2301, and lead 2351 which connects to lead 2645 from which point the circuit extends as heretofore traced through contact 6 of relay 2509, 2508 or 2507, lead 1975 winding of relay 1913, lead 1973, and contact 4 of relay 1906 to battery operating relay 1913. Relay 1913 operated locks to ground through its contact 2. The operation of relay 1913 closes the fundamental circuit to the pulsing loop.

Before sending the first open pulse, a complete pulse cycle is simulated with the fundamental closed to provide a time interval for soaking the out trunk repeater relays before actual pulsing starts. When relay 2405 operates, relays 2304 and 2305 are actuated to engage their left-hand contacts. While the armature of relay 2305 was actuated to engage its right-hand contact it provided a shunt around the winding of relay 2018 extending from battery through resistance 2068, lead 2053, contact 2 of relay 2305, lead 2344, and contact 4 of relay 2603. When contact 2 of relay 2305 opens, this shunt is opened and relay 2018 operates from battery through resistance 2068, winding of relay 2018, lead 2436, contact 2 of relay 2405, lead 2435, lead 2343 and contact 3 of relay 2603 to ground and locks through its contact 3, lead 2058, lead 2343 and contact 3 of relay 2603 to ground. Relays 2304 and 2305 are now energized to again close their right-hand contacts. This establishes a circuit from ground through the armature and contact 2 of relay 2305, lead 2053, contact 2 of relay 2018, and the winding of relay 2017 to battery operating relay 2017 which locks through its contact 4 over a path to ground heretofore traced. The release of relay 2304 and its engagement with its right-hand contact did not transmit a pulse, because its contacts were short-circuited by the contacts of relay 2017 over a path from the fixed terminal of the armature of relay 2304, through lead 2440, contact 1 of relay 2017 and lead 2055 to the right-hand contact of relay 2304. When relay 2017 operates this short circuit is removed and when relay 2304 again releases to open its contact a pulse will be transmitted over leads 305 and 306. Relay 2017 operated also closes a circuit from the ground through contact 4 of relay 2603, armature and contact 1 of relay 2305, lead 2052, contact 2 of relay 2017, lead 2051, to the armature of relay 2110. Assuming relay 2110 normal the path continues through lead 2038, contact 2 of relay 2013, lead 2056, contact 3 of relay 2307, lead 2339 to the armatures of the counting relays 250 to 2511 and 2604 in parallel for the counting of pulses, from which point the further extension of the circuit depends upon operation of the particular relay in a manner to be described hereinafter.

In the case of the operation of relay 2403 for battery and ground pulsing relay 2304 does not close the fundamental circuit as for loop pulsing but operates relay 2448 from battery through the winding of relay 2448, contact 8 of relay 2403, lead 2439, contact and armature of relay 2304, lead 2440, and contact 3 of relay 2403 to ground. The first release of relay 2448 operates relay 2401 which is slow to release and holds during a train of pulses. The circuit for the operation of relay 2401 extends from battery through the winding of relay 2401, contact 3 of relay 2448, lead 2432, contact 3 of relay 2017, lead 2039, contact 1 of relay 2402 and contact 1 of relay 2404 to ground. Relay 2401 operated, by opening its contact 2, removes the bridge from the fundamental circuit and connects battery through resistance 2451 and ground through resistance 2408 thereto. At the end of each pulse train relay 2401 releases thereby removing battery and ground from the fundamental and restoring the bridge. Relay 2401 when operated, by closing its contact 1, also short circuits the winding of relay 2302.

*Counting step-by-step pulses*

The counting of step-by-step pulses will first be described in a general way and then in detail.

When relays 2304 and 2305 release to transmit the first pulse following the operation of relay 2017 a circuit is closed as mentioned to the counting relays. These relays are counted up as relay 2305 pulses and when the correct number of pulses have been sent the operation of relay 2305 on the last pulse will permit relay 2007 to operate in series with relay 2009. Relay 2007 operated, by opening its contact 2, releases relay 2405 to stop pulsing and also operates relay 2308 over a path from ground through contact 1 of relay 2007, lead 2059, contact 1 of relay 2602, lead 2332, contact 1 of relay 2306, contact 2 of relay 2308, and winding of relay 2308 to battery. Relay 2308 operated locks through its contact 1 lead 2343, and contact 4 of relay 2603 to ground. Relay 2308 operated also operates relay 2111 from battery through the winding of relay 2111, lead 2128, contact 4 of relay 2308 and contact 8 of relay 2307 to ground. The operation of relay 2111 releases relays 2103 and 2107 by opening contact 2 of relay 2111. Relay 2107 released, releases relay 2008 by opening contact 4 of relay 2107. Relay 2107 released releases all counting relays except relays 2009 and 2007 and the release of relay 2008 releases these. Relay 2007 released removes a shunt from around the winding of relay 2307. The shunt extends from ground through contact 2007, when operated, lead 2059, contact 1 of relay 2602, lead 2332, contact 1 of relay 2306, and contact 5 of relay 2307 to a junction between the lower terminal of the winding of relay 2307 and the top terminal of resistance 2310, the bottom terminal of which is connected to battery. Relay 2307 now operates from battery through resistance 2310, winding of relay 2307, contact 1 of relay 2308, lead 2343 and contact 3 of relay 2603 to ground. The operation of relay 2307 releases relay 2111 by opening contact 8 of relay 2307. The release of relay 2111 now reoperates relay 2103 which, in turn, reoperates relay 2008 both over paths heretofore traced. The pulsing circuit is now prepared for counting the interdigital interval.

For a detailed description of the foregoing, a typical selection of the out pulsing of the thousands digit for four-digit out pulsing on a seven-digit dialed call may be taken. For this example as explained heretofore relays 2503 and 2509 have been operated following trunk test. Relay 2111 is normal if the thousands digit has been dialed, therefore relays 2103 and 2107 will be operated.

Figure 21:
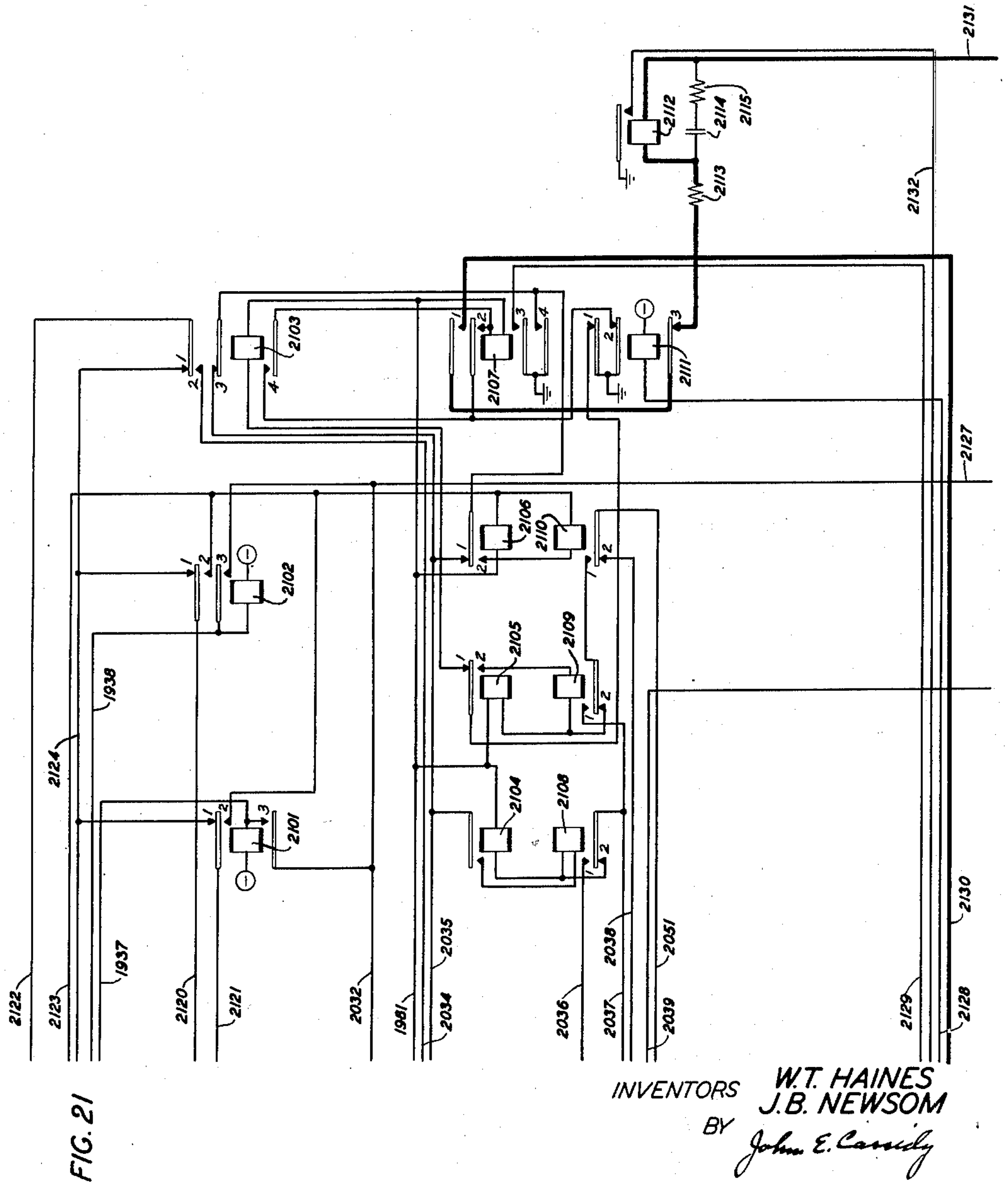
Figure 22:
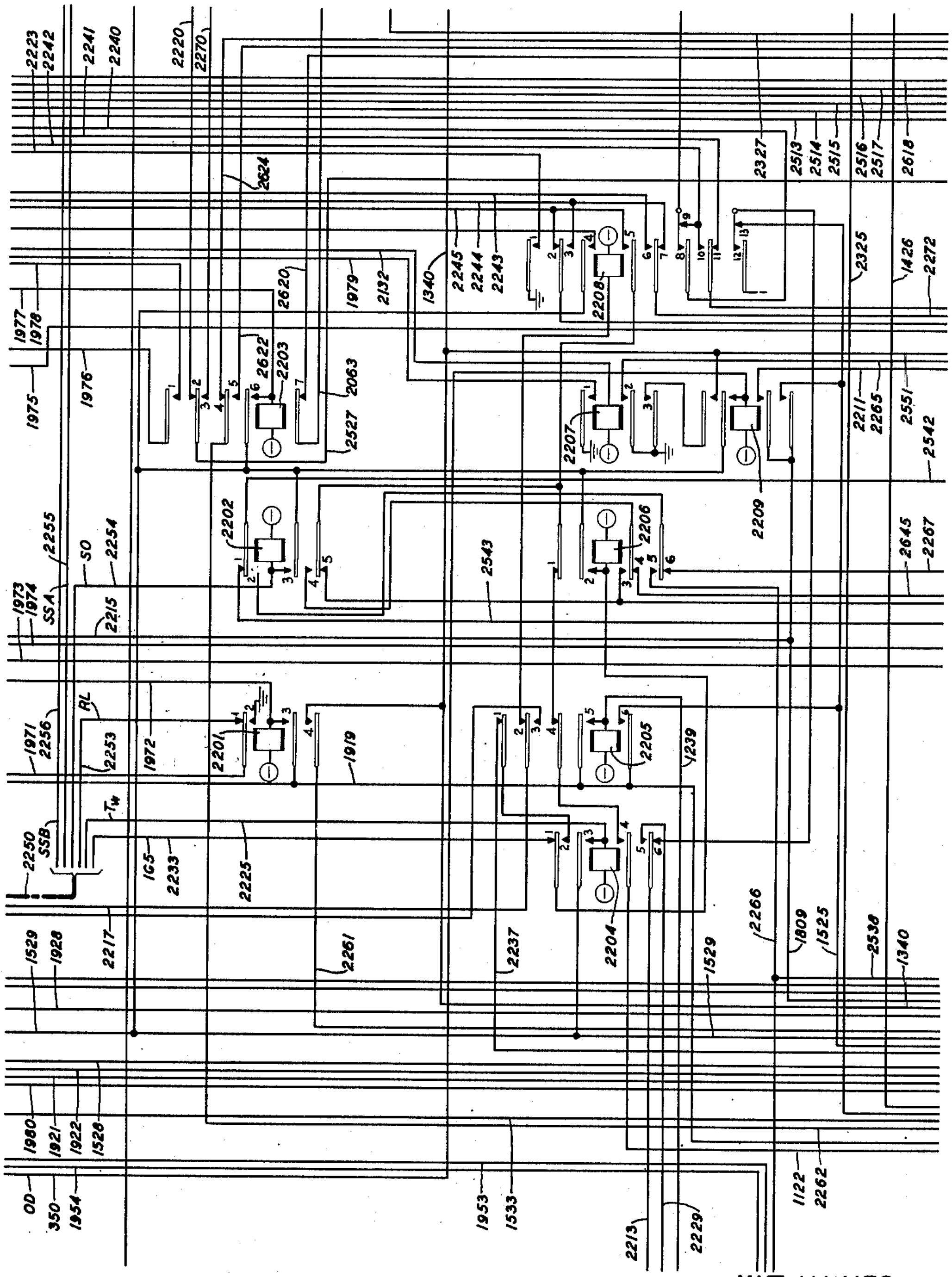
Figure 23:
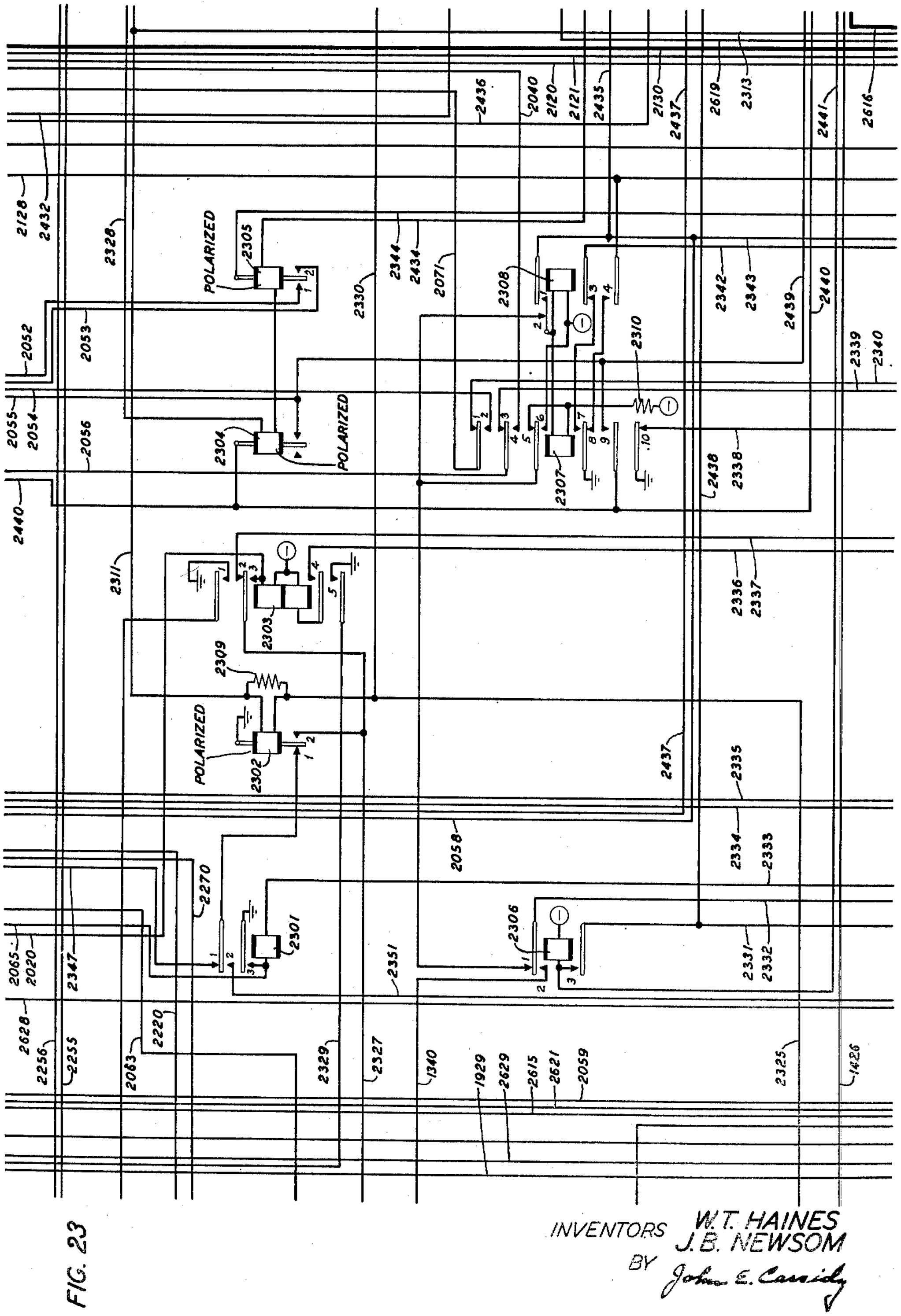
Figure 24:
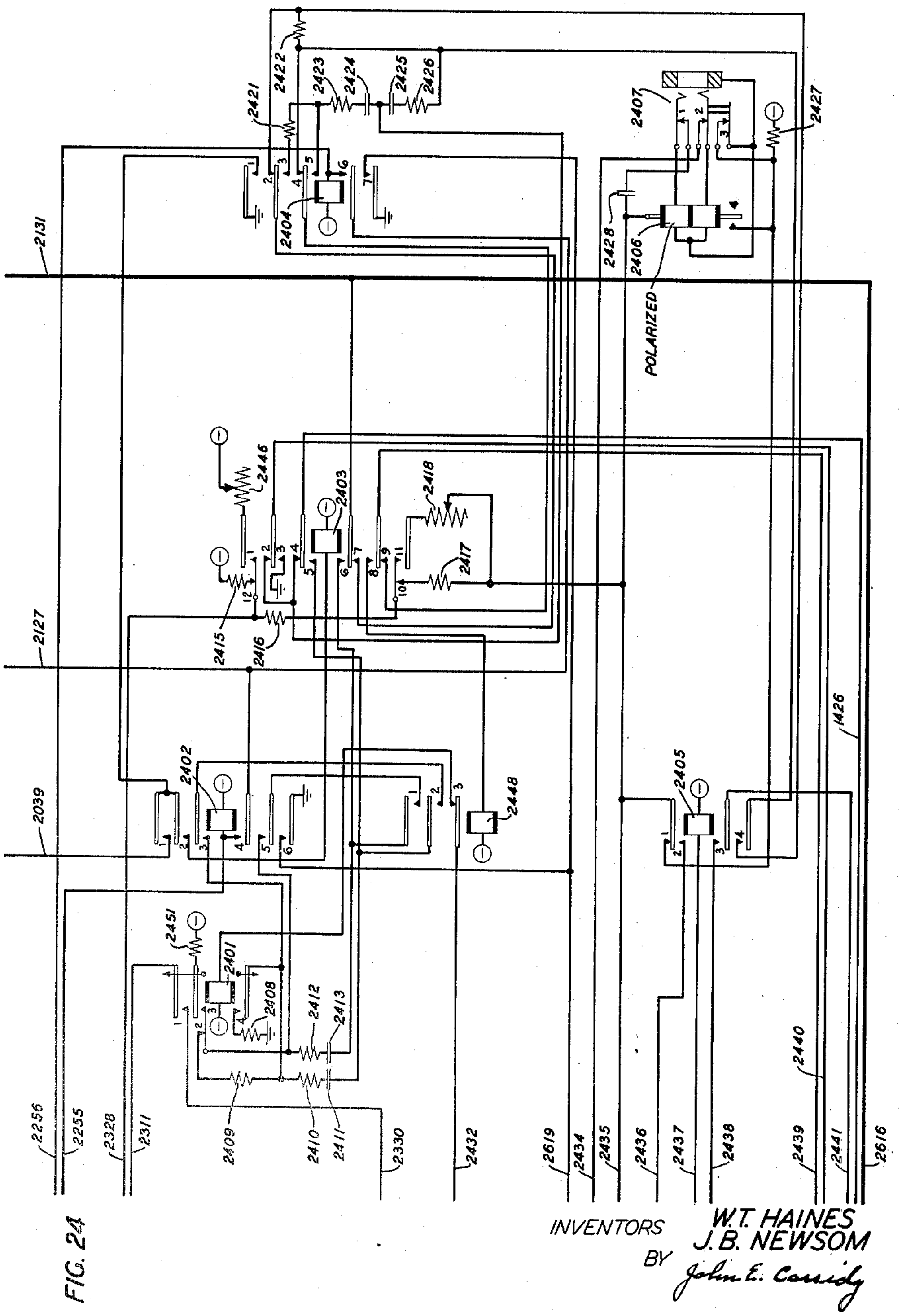
Figure 25:
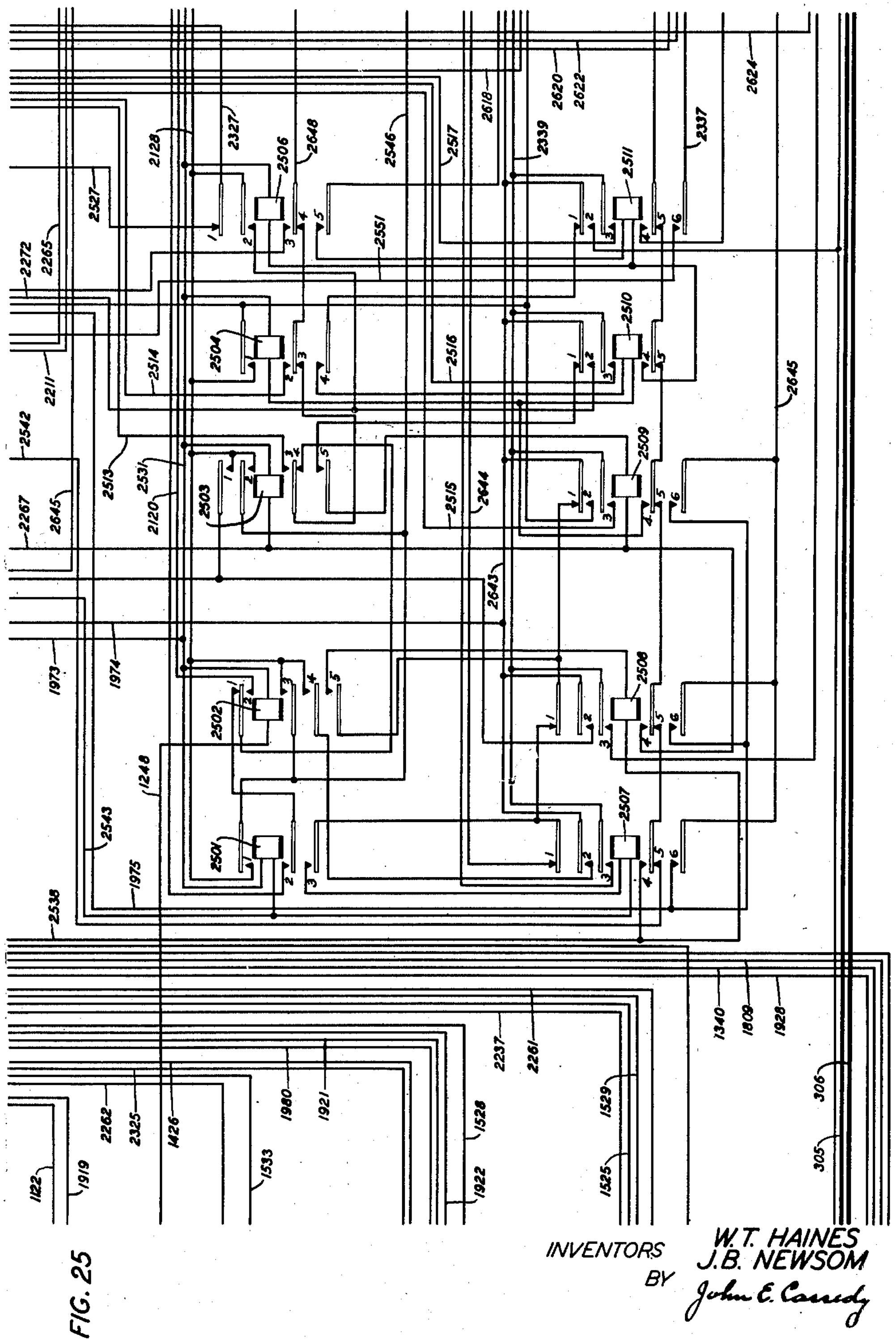
Figure 26:
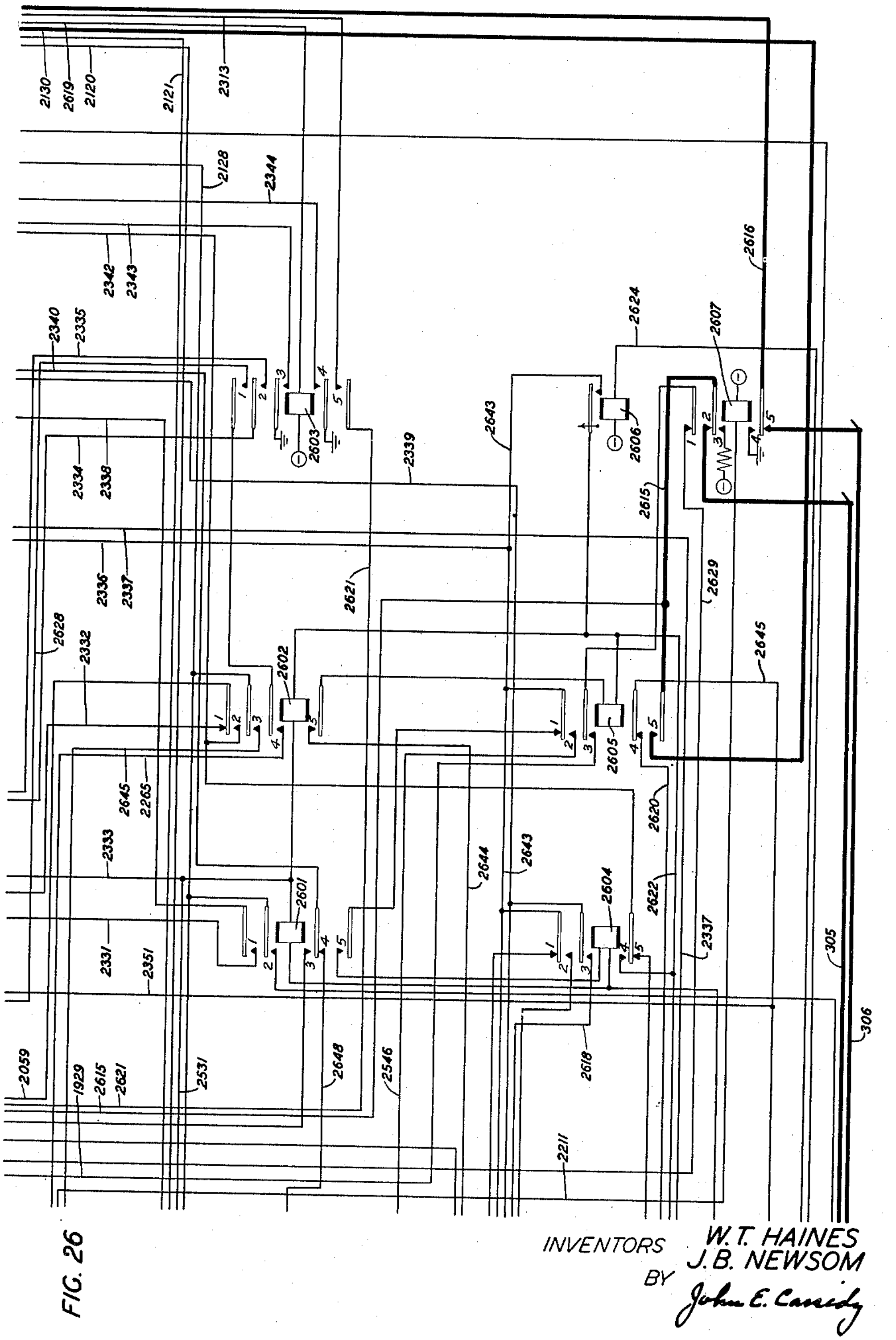

When relay 2405 operated the release and reoperation of relay 2304 sends a pulse to the terminating equipment, while simultaneously the release and reoperation of checking relay 2305 sends a pulse to the counting relays. Assume the number recorded on the thousands register is five. Then the first release of relay 2305, after relay 2307 has operated operates the No. 4 counting relay 2104 in Fig. 21. The path may be traced from ground through contact 4 of relay 2603, armature and contact 1 of relay 2305, contact 2 of relay 2017, lead 2051, contact 2 of relay 2110, lead 2038, contact 2 of relay 2013, lead 2056, contact 3 of relay 2307, lead 2339, contact 3 of relay 2509, lead 2515, contact 11 of relay 705, lead 717, contact 501 which is the No. 5 crosspoint of the thousands register, lead 2040, lead 2037, number 2 contact of relay 2108, winding of relay 2104 which is the number 4 counting relay, lead 1981 and contact 2 of relay 1906 to battery. Relay 2108 associated with the number 4 counting relay 2104 and the number 4 counting relay 2104 are both provided with a locking ground by the operation of relay 2104. The path may be traced through the contact of relay 2104, contact 1 of relay 2106 and contact 4 of relay 2107 to ground. Relay 2108 does not operate however because both ends of its winding are connected to ground. When relay 2305 reoperates to disengage from its contact 2, relay 2108 operates in series with relay 2104, from battery over lead 1981, through the windings of relays 2104 and 2108 in series to locking ground as traced. On the following pulse, when the armature of relay 2305 engages contact 2, ground will be supplied over a path heretofore traced to the armature of relay 2108. With relay 2108 operated the path continues through contact 1 of relay 2108, lead 2036, contact 2 of relay 2015, associated with the number 3 counting relay 2012, winding of relay 2012 and lead 1981 to battery operating the number 3 counting relay 2012. This establishes a path through the contact of relay 2012 to the same locking ground at contact 4 of relay 2017. When the armature of checking relay 2305 disengages from its contact 1, relay 2015 operates in the same manner as did relay 2108. The third pulse similarly operates the number 2 counting relay 2011 and its companion relay 2014 while the fourth pulse operates the number 1 counting relay 2010 and its companion relay 2013. The path for the fourth pulse does not extend directly between counting relay pairs but passes from contact 1 of relay 2014 through lead 2024, lead 2122, contact 2 of relay 2103 and lead 2034 to the winding of the number 1 counting relay 2010. Relays 2011 and 2014 lock in the same manner as described for the relay pairs 2012 and 2015 and 2105 and 2109. However, the number 1 counting relay pair, relays 2010 and 2013, lock through contact 1 of relay 2008.

In response to the fifth pulse ground is supplied as for the previous pulses through contact 2 of relay 2110, lead 2038, contact 1 of relay 2013, lead 2071, contact 1 of relay 2307, lead 2340, contact 4 of relay 2601, lead 2648, contact 4 of relay 2506, contact 3 of relay 2504, contact 3 of relay 2503, lead 2513, contact 4 of relay 705, lead 718, contact 502 which is one of the number 5 crosspoints of the thousands register, lead 2124, lead 2026, winding of relay 2009, lead 1981 and contact 2 of relay 1906 to battery operating relay 2009. When relay 2305 releases disconnecting ground from the left-hand terminals of relays 2007 and 2009 in parallel, a path is established from ground through contact 1 of relay 2008, contact of relay 2009 and the windings of relays 2007 and 2009 in series to lead 1981 which has been traced to battery, operating relay 2007 and holding relays 2007 and 2009 locked.

If the thousands digit had been 4, 3, 2 or 1, the first pulse from relay 2305 would have passed through corresponding successively lower-numbered crosspoints in the thousands register such as point 503 for digit 4, and the first pulse in the train, if 4 were dialed, would have operated the number 3 relay 2012 and its companion relay 2015, followed by the number 2 relays 2011 and 2014, and the number 1 relays 2010 and 2013 and finally the zero relay 2009. If three digits were dialed the number 2 pair of relays, 2011 and 2014, would first be operated followed by those lower in the chain and so on. If the number of the thousands digit were 6, 7, 8, 9, or 0 the pulse described as operating the zero relays, 2009 and 2007, would have operated the number 6 relay 2106 and its companion relay 2110 instead, through the "high-five" strapping of these points on the thousands register. The operation of the number 6 relay, by opening its contact 1, releases whichever pairs of relays 2104 and 2108, 2012 and 2015, or 2011 and 2014 were operated. The next pulse operates the number 5 relay 2105 and its companion relay 2109. Relay 2105, by opening its contact 1, releases relay 2103. The succeeding pulses operate the number 4 pair of relays 2104 and 2108, the number 3 pair of relays, 2012 and 2015 and the number 2 pair of relays 2011 and 2014. Because relay 2103 is released the number 1 pair of relays, 2010 and 2013, are skipped and the next pulse operates the zero relay 2009 and its companion relay 2008. The path in this case for the operation of the zero relay 2009 extends through contact 1 of relay 2014, lead 2023, lead 2122, contact 1 of relay 2103, lead 2124, lead 2026 and the winding of the zero relay 2009 to battery through lead 1981. Thus when a thousands digit is in the "high-five" group of digits, that is from 6 to 10, five additional pulses are sent.

As an example of the operation of the counter on a "high-five" digit it will be assumed that digit 9 is recorded on the thousands register. Relay 409 is operated and the thousands crosspoints are closed at the 9 level. The first pulse passes over a path heretofore traced as far as lead 717 and then through number 9 crosspoint 507, lead 2022 to contact 2 of relay 2015. This, as has been shown, effects the operation of the number 3 pair of relays, 2012 and 2015, in response to the first pulse. The second pulse will operate the number 2 pair of relays, 2011 and 2014. The third pulse will operate the number 1 pair of relays, 2010 and 2013, through contact 2 of relay 2103 which is operated at this time. The fourth pulse is directed through contact 1 of operated relay 1, through conductor 2071 and a path which has been traced to lead 718 which extends through contact 508 at crosspoints 9 on the register, lead 2123, through the winding of the number 6 counting relay 2106 to battery through lead 1981 operating relay 2106, followed by its companion relay 2110. The operation of relay 2106 releases any of the pairs of relays locked through its contact 1 as described. After the operation of relay 2110, the subsequent pulses received by way of lead 2051 are directed through contact 1 of relay 2110 to operate first the number 5 pair of relays, relays 2105 and 2109, which releases relay 2103, followed in turn, in response to succeeding pulses, by each succeeding lower-numbered pair as described. Relay pair 2010 and 2013 corresponding to number 1 are skipped due to the operation of relay 2103. The final pulse operates relays 2009 and 2007. Thus if 9 is registered as the thousands digits, relay pairs corresponding to counting relays numbered 3, 2, 1 and 6 are first operated followed by relay pairs corresponding to counting relays numbered 5, 4, 3, 2 and 0. If the thousands digit, instead of 9, were 8, relay pairs corresponding to number 2 would first be operated and the entire sequence would be 2, 1, 6, 5, 4, 3, 2, 0. For 7 the sequence would be 1, 6, 5, 4, 3, 2, 0. For 6 the sequence would be 6, 5, 4, 3, 2, 0. In connection with the registering of 6, the first pulse passes through crosspoint 509 and the circuit continues through lead 2025 which connects directly to lead 2071, from which point the circuit has been traced to lead 718, which extends through crosspoint 510, then through lead 2123, which operates relay 2106 of the number 6 counting pair in response to the first pulse. Succeeding pulses are directed through contact 1 of relay 2110 directly to the lower-numbered counting pairs of relays for the sequence. Thus relay pairs 6, 5, 4, 3, 2, 0 are operated when 6 is dialed for the thousands digit. For the fifth and sixth digits when these are transmitted, the "high-five" connection is provided by front contacts of relays 2102 and 2101 respectively.

The operation of relay 2007 releases relay 2405 to stop the pulsing and as mentioned in the foregoing prepares the circuit for measuring the interdigital interval.

*Measuring the interdigital interval*

The interdigital interval which is approximately .6 second is measured from the end of the last pulse of a pulse train to the beginning of the first pulse of the succeeding train and is obtained by using the pulsing circuit for counting five full pulses. The fundamental is held closed during this interval by contact 9 of relay 2307, which is operated, and shunts the pulsing contacts of pulsing relay 2304. Relay 2307 when operated disconnects the contacts of counting relay 2305 from the register circuit and connects it to the number 4 counting relay pair, 2104 and 2108. The circuit may be traced from ground through contact 4 of relay 2603, lead 2344, contact 1 of relay 2305, lead 2052, contact 2 of relay 2017, lead 2051, contact 2 of relay 2110, lead 2038, contact 2 of relay 2013, lead 2053, contact 4 of relay 2307, lead 2040, lead 2037, contact 2 of relay 2108 and the winding of relay 2104 to battery. The operation of relay 2008 reoperates relay 2405 to start the pulsing. When five pulses have been run through, relays 2009 and 2007 operate as previously described, except that relay 2007 operated now shunts relay 2308, holding relay 2307 operated. The shunting path may be traced from battery through contact 6 of relay 2307, contact 1 of relay 2306, lead 2332, contact 1 of relay 2602 and lead 2059 to ground through contact 2 of relay 2007. Relay 2308 remains unoperated and relay 2307 is held operated. With relay 2308 released and relay 2307 operated, one of the selection relays 2502, 2503, etc. depending upon the selection to be made, operates. The path may be traced from ground through contact 8 of relay 2307, contact 4 of relay 2308 and lead 2342 to contact 5 of relay 2604, from which point the circuit has been traced for the operation of the various relays 2502, 2503, etc. for the various numbers of digits to be out pulsed. Relay 2111 operates from battery through the winding of relay 2111, lead 2128, through a contact of whichever one of relay 2502, 2503, etc. is operated, such as contact 3 of relay 2502, lead 2546, contact 2 of relay 2605, lead 2643 and lead 1974 to ground. The operation of relay 2111 by opening its contact 2 releases relays 2103 and 2107. Relay 2008 is released by the opening of contact 3 of relay 2107. The opening of contact 1 of relay 2008 in turn releases relay 2007 and 2009. Relay 2007 by opening its contact 2 releases relay 2307. The release of relay 2307 permits the companion relays 2507, 2508, 2509, etc. of relays 2501, 2502 and 2503, etc. to operate by disconnecting ground supplied through contact 7 of relay 2307, contact 3 of relay 2308, lead 2342 and contacts 5 of 2604, 2511, 2510, etc. which shunted ground supplied from contact 2 of relay 1902 through lead 1974 to the windings of each of relays 2507 to 2511. When the shunting ground is removed a particular one of these companion relays will operate from battery through the winding of its partner relay in series therewith as heretofore described. The operation of a particular companion relay, by opening its contact 1, opens the locking path for relay 2605, thus releasing relay 2111 provided the next digit to be out-dialed has been registered. The release of relay 2111 is followed by the operation of relays 2103, 2107 and 2008. Relay 2008 operated operates relay 2405 to start the interrupter for the succeeding pulse train. If the next digit to be out-dialed has not been registered relay 2111 holds through a back contact of the hold magnet corresponding to the digit. For instance, if the next digit is the hundreds digit the path may be traced from ground through contact 3 of relay 1111, lead 1122, contact 1 of relay 1504, lead 713 and, assuming the next digit is the hundreds digit, contact 1 of hold magnet 702, lead 2244, contact 7 of relay 2208, lead 2272, contact 2 of relay 2506, lead 2128 and the winding of relay 2111 to battery.

*Selection progress synchronization*

It is necessary to hold up out pulsing of any digit until that digit has been registered.

The synchronization of trunk test was described under the heading trunk test. The method of delaying the out pulsing is to provide a path through the front contact of each of the steering relays 2503, 2504, 2506 and 2601, connecting the winding of relay 2111 to a ground at a back contact of a digit register holding magnet, such as contact 1 of hold magnets 701, 702 or 703, or relays 1504, 2206 or 2205, whereby relay 2111 is held operated until the ground path is broken by the registration of the required digit. The release of relay 2111 when the necessary digits are registered operates relays 2103 and 2107. Relay 2107 operates relay 2008 which allows relay 2405 to operate for the continuation of out pulsing.

The hold magnet or relay which supplies the synchronizing ground depends upon the class of call with respect to the number of digits dialed and upon the digits out pulsed. The controlling contact for each out pulsed digit, and for trunk test, is listed in the following table for the various conditions.

TABLE SHOWING RELAY OR HOLD MAGNET CONTACT OF WHICH CONTROLS THE SYNCHRONIZING GROUND FOR SUCCESSIVE DIGITS

| Class of Call | No. of Digits Transmitted | Trunk Test | Sixth Digit | Fifth Digit | TH | H | T | U |
|---|---|---|---|---|---|---|---|---|
| 7 Digit | 6 | | | | 701 | 702 | 703 | 1504 |
| | 5 | | | | 701 | 702 | 703 | 1504 |
| | 4 | 701 | | | | 702 | 703 | 1504 |
| 6 Digit | 6 | | | | | 701 | 702 | 1504 |
| | 5 | | | | | 701 | 702 | 1504 |
| | 4 | | | | | 701 | 702 | 1504 |
| 7 2207 | 5 | 2206 | | | | | | |
| or | | | | | | | | |
| 6 operated | 4 | 2205 | | | | | | |

When five or six digits are to be transmitted on regular six-digit or seven-digit dialed calls, trunk test and the pulsing of these digits can proceed without delay because the digits are registered on the 2001 to 2006 and 2101 and 2102 relays by the marker. However, when either six or seven digits may be dialed, the marker operates relay 2204 over lead 2225 to provide for a time interval for dialing the seventh digit and no digit can be out-pulsed until relay 1504 operates, indicating that dialing is completed. If seven digits are dialed relay 1504 when operated operates relay 2206 over a path from battery through the winding of relay 2206, contact 2 of relay 2204, contact 1 of relay 2205, lead 2237, contact 7 of relay 1504, lead 1529 and contact 7 of relay 1906 to ground. Relays 2204 and 2206 when operated lock to ground on contact 7 of relay 1906. The operation of relay 2206 releases relay 2111, by opening lead 2645 at contact 4 of relay 2206, and permits trunk test and pulsing to proceed. If only six digits are dialed, relay 2205 operates as heretofore described, opening its contact 4 which releases relay 2111.

When four digits are to be transmitted on a six-digit dialed call, trunk test and the pulsing of the thousands digit can proceed immediately after the marker releases relay 1501 to indicate that an out trunk has been selected, since the thousands digit already has been recorded on the "C" digit register. When four digits are to be transmitted on a seven-digit call, trunk test and the pulsing of the thousands digit must wait until the thonsands digit is registered, as indicated by the operation of the thousands hold magnet 701.

With five or six-digit out-pulsing on seven-digit calls, the pulsing of the thousands, hundreds, tens and units digits awaits the registration of these respective digits.

With five or six-digit out-pulsing on six-digit calls, there is no delay until the hundreds digit, which will wait for the registration of the hundreds digit, as indicated by the operation of the thousands hold magnet 701. The pulsing of the tens digit then waits for the dialing of the tens, as indicated by the operation of the hundreds hold magnet 702. The pulsing of units awaits the operation of relay 1504.

*Stop-start signal*

On regular step-by-step calls, a terminating sender may be encountered after one or more digits have been pulsed. Further pulsing must be halted to permit the sender to be attached and prepared to receive pulsing.

The trunk with which the terminating sender is associated is connected to give a normal off-hook (reversed) polarity on the tip and ring. The terminating sender is also poled for normal off-hook polarity changing to on-hook when the sender is ready to receive pulsing.

The stop-start feature is accomplished as follows. Relay 2017 is operated following the first operation of relay 2405 as heretofore described. Therefore, if relay 2302 operates after one or more digits have been pulsed, by encountering a reverse battery from the trunk associated with the terminating sender, relay 1914 is operated from ground through contact 2 of relay 1902, lead 2327, contact 1 of relay 2506, lead 2527, contact 2 of relay 2203, lead 2220, contact 5 of relay 2017, lead 2075, winding of relay 1914, lead 1973 and contact 4 of relay 1906 to battery. Relay 1914 operated, by opening its contact 1, opens the operating path for relay 2405 which was released at the end of the preceding digit. Relay 1914 operated locks to ground at its own contact 2.

Relay 1914, like relay 2301 and relay 1913 are connected to off-normal battery at relay 1906 to permit its release in case relays 1902 and 1906 are released for a second or third marker trial.

When the terminating sender restores the tip and ring polarity to normal, relay 2302 reengages with its contact 1 establishing a circuit from ground through contact 1 of relay 2302, contact 1 of relay 2301, lead 2065, contact 9 of relay 2017, lead 2076, contact 3 of relay 1914, lead 1977 and winding of relay 2203 to battery operating relay 2203. Relay 2203 operated locks to ground through its contact 6, lead 1529, contact 6 of relay 1906 and contact 5 of relay 1902. Relay 2203 operated reoperates relay 2405 through contact 1 of relay 2203, so that pulsing may be resumed, if sufficient digits have been dialed.

*Completion of step-by-step call*

During the pulsing of the units digit the step-by-step district control relay 2306 is operated over a circuit from battery through the winding of relay 2306, lead 2441, contact 3 of relay 2405, lead 2438, lead 2331, contact 1 of relay 2601, lead 2338, and contact 10 of relay 2307 to ground. When operated relay 2306 locks through its number 3 contact directly to lead 2331. The operation of relay 2007 at the completion of units pulsing releases relay 2405 to stop further pulsing and operates relay 1206 over a circuit from ground through contact 2 of relay 2007, lead 2059, contact 1 of relay 2602, lead 2332, contact 2 of relay 2306, lead 1340, contact 4 of relay 1301, lead 1240, and the winding of relay 1206 to battery. The operation of relay 1206 establishes a circuit from battery through the winding of relay 201 in Fig. 2, contact 8 of relay 202, lead 309, through the sender link and continuing through contact 2 of relay 1501, lead 1535, contact 4 of relay 1411, contact 8 of relay 1410, lead 1441, contact 6 of relay 1206, lead 1215, contact 3 of relay 1206, lead 1240, contact 4 of relay 1301, lead 1340, contact 2 of relay 2306, lead 2332, contact 1 of relay 2602, lead 2059 and contact 2 of relay 2007 to ground, operating relay 201. The operation of relay 201 in turn operates relay 206 over an obvious circuit to cut the trunk through for the talking condition and releases the sender as described heretofore. It will be observed that the locking circuit for relay 2306 traced above bypasses contact 3 of relay 2405 through which relay 2306 operated, so that relay 2306 will remain operated after relay 2405 releases.

*Reorder signals and stop-start signals from terminating office*

The operation of relay 2302 on regular step-by-step class, stops the pulsing as described in the foregoing. However, if the initial trunk connection from the tandem office multiple should be reversed, the operation of relay 2302, following trunk test, will operate relay 2303 over a circuit from ground through the armature and contact 2 of relay 2302, lead 2327, contact 1 of relay 2506, lead 2527, contact 2 of relay 2063, lead 220, contact 6 of relay 2017, lead 2020, and the top winding of relay 2303 to battery. Relay 2303 operated locks over a circuit from battery through its bottom winding and contact 4, lead 2336, lead 2643, lead 1974, and contact 2 of relay 1902 to ground resulting in a second or a third trial as described heretofore.

A locking path is also provided from battery through the top winding of relay 2303 and its contact 3 directly to contact 2 and armature of relay 2303 to ground. This locking path serves as a safeguard against failure of relay 2302 to release through maladjustment. In this case the continued operation of relay 2303 holds relay 1111 operated over a path from ground through contact 1 of relay 2303 and the winding of relay 1111 to battery. This prevents the release of the sender by the normal release of relay 1111 at the end of the call, or by the timing circuit. The operation of the timing circuit lights the stuck sender lamp, not shown, at the sender make-busy frame.

On regular step-by-step class in which no terminating sender is involved, if a reverse battery is encountered after the first step-by-step selection has been made but before the tens digit has been pulsed, relay 1914 will operate to stop further pulsing. If the reverse battery is continuous the sender will time out as described hereinafter. If the reverse battery is momentary, the pulsing will continue. If it is intermittent the second operation of relay 2302 will operate relay 2303 as described resulting in a second or third trial.

If the terminating sender on regular step-by-step class, should return reverse battery to the tandem sender after the release of relay 2302 following its operation as a stop-pulsing signal, but before the tens digit has been sent, then the second operation of relay 2302 will operate relay 2303 and cause another trial to be made.

On step-by-step sender class, the initial operation and release of relay 2302, by the sender associated with the outgoing tandem trunk is required as a start-pulsing signal. If the outgoing trunk is reversed, the polarity of the sender signals will be reversed also. Relay 2302 will therefore operate twice. The second operation of relay 2302 will operate relay 2303 over a circuit from ground through the armature and contact 2 of relay 2302, lead 2327, contact 1 of relay 2506, lead 2527, contact 3 of relay 2203, lead 2270, contact 7 of relay 2017, lead 2020 and the top winding of relay 2303 to battery resulting in a second or third trial.

If the terminating sender should reverse its polarity as a recorder signal, due to trouble or all-trunks busy conditions for example, after the original start signal, but before tens has been sent, the operation of relay 2302 will operate relay 2303 through the path just traced. The operation of relay 2303 will result in a second or third trial.

A reverse battery received in the interdigital interval between tens and units will cause the sender to cut the trunk through as a completed call. This is effected in the following manner. Relays 2506 and 2511 are operated under these conditions as described heretofore. This opens the paths previously traced over which relay 2303 operated when relay 2302 operated. Relay 2303 is therefore in the released condition. A path may therefore be traced from ground through the armature and contact 2 of relay 2302, contact 2 of relay 2303, lead 2337, contact 6 of relay 2511, lead 1340, contact 4 of relay 1301, lead 2340 and the winding of relay 1206 to battery operating relay 1206. This feature will be operative in permitting a connection to be completed to a private branch exchange trunk reached through a level-hunting connector, in case the operator answers the call following the transmission of the tens digit but before the units digit has been transmitted or registered.

*Straightforward calls*

The straightforward class is used to complete connections to overflow or reorder trunks, vacant code trunks, to desk positions such as information desk, or to "B" operators.

Trunk test is not made on straightforward class and the sender proceeds to cut the tandem trunk through to its talking condition as soon as the marker indicates that a connection has been established to an outgoing trunk.

The marker operates relay 2209 from ground in the marker over lead 350 and through the winding of relay 2209 to battery. The marker also operates relay 1501 from ground in the marker over lead 1531. The marker also operates relay 1902 from ground in the marker over lead 2253, contact 1 of relay 2201, lead 1971 and the winding of relay 1902 to battery. Relay 1501 operated, operates relay 2606 from battery through the winding of relay 2606, lead 2624, contact 4 of relay 2203, lead 2262, contact 1 of relay 1501, lead 1122 and contact 3 of relay 1111 to ground. Relay 2602 is operated from battery through contact 4 of relay 1906, lead 1973, lead 2531, winding of relay 2602, front contact of relay 2606, lead 2643, lead 1974 and contact 2 of relay 1902 to ground. When the marker has established the connection to the outgoing trunk, relay 1501 is released which in turn releases relay 2606. This establishes a circuit from battery on lead 1973 through the windings of relays 2602 and 2605 in series, contact 5 of relay 2602, lead 2644, and contacts 1 and relays 2507, 2508 and 2509 in series, lead 2643 to ground through lead 1974 operating relay 2605. Relay 2112 then operates from ground through contact 4 of relay 2607, lead 2616, winding of relay 2112, resistance 2113, contact 3 of relay 2111, contact 1 of relay 2107, lead 2130, contact 3 of relay 2605, and contact 3 of relay 2607 to battery. Relay 2112 operated in turn operates relay 2207 over a path heretofore traced. Relay 2207 operated, establishes a circuit from battery through the winding of relay 1206, lead 1240, contact 4 of relay 1301, lead 1340, contact 1 of relay 2209 and contact 3 of relay 2207 to ground, operating relay 1206. This releases the sender as heretofore described.

With relay 2607 operated, the timing for trunk test is cancelled by opening contact 1 of relay 2607 which supplies ground through lead 2629 to the armature of interrupter 1915.

*Abandoned calls*

On abandoned calls the sender is released almost immediately without operating the tandem trunk relay 201. Since the tandem trunk may be seized very soon after it is released at the originating end, the sender is arranged to maintain an overlap of the sender battery and the trunk battery when the trunk relay 205 is released and to provide the proper tip and ring polarity to insure that a false start-dialing signal will not be sent to the originating operator or sender which reseized the trunk.

If a call is abandoned before completion the release of relay 1304 long enough to release relay 1303, which was held operated through contact 2 of relay 1304, operates relay 1410 over a path from battery through the winding of relay 1410, lead 1424, contact 6 of relay 1302, contact 1 and armature of relay 1304, lead 1322, lead 1135 and contact 2 of relay 1111 to ground. The release of relay 1303 by opening its contact 1 releases relay 1107.

Relay 1410 operated, opens the fundamental tip and ring to release terminating trunk relays and operates relay 1505 over a path from battery through the winding of relay 1505, lead 1538, contact 9 of relay 1410, lead 1448, contact 3 of relay 1107, lead 1135, and contact 2 of relay 1111 to ground. Relay 1505 operated opens the operating path of relay 2405 to stop the pulsing and operates relay 1206 from battery through the winding of relay 1206, lead 1240, contact 4 of relay 1301, lead 1340 and contact 5 of relay 1505 to ground. Relay 1411 now operates from battery through the winding of relay 1411, contact 7 of relay 1410, lead 1441, contact 6 of relay 1206, lead 1215, lead 1515, lead 1321, lead 1135 and contact 2 of relay 1111 to ground. The operation of relay 1411, by opening its contact 3, opens lead 308 which extends through the winding of relay 205 in the trunk circuit, releasing relay 205. The operation of relay 1411, by opening its contact 1, also releases slow-to-release relay 1502.

On a normal completed connection the operation of relay 1411 together with the release of relay 1107 releases relays 1111, 1301 and 1302. But on an abandoned call, relay 1502 must release after relay 1411 operates to open the holding path of relays 1301 and 1302 from ground through contact 2 of relay 1410, lead 1454, contact 2 of relay 1502, and lead 1542 through the winding of relays 1302 and 1301 to battery. This is done to insure complete release of relay 205 in the trunk, to connect the windings of trunk relay 207 to the originating tip and ring before relays 1111, 1301 and 1302 release and disconnect the sender. Thus the trunk closes the tip and ring leads before the sender opens them.

On calls from originating senders which require a reverse battery start-pulsing signal the tandem trunk is wired to give normal on-hook tip and ring polarity and to pick the tandem sender with off-hook polarity. The tandem sender then operates relay 1409 to give the on-hook signal. The originating sender thus receives the off-hook condition followed by on-hook condition as a start pulsing signal.

On this class of call the cross-connection of one of the RV0 to RV9 leads to the RVG or RVH lead in Fig. 16 supplies ground through lead 1617 and the contact of relay 1414 or through lead 1615 and the winding of relay 1409 to battery to operate relay 1409 directly. Therefore, on an abandoned call the operation of relay 1410 does not release relay 1409. If a second originating sender reseizes the tandem trunk during the brief interval before the tandem sender has restored to normal, the originating sender will receive on-hook polarity of the tandem trunk when its relay 205 releases. Thus no false or premature start pulsing signal will be transmitted, as might have been the case if relay 1410 had released relay 1409.

On calls from originating senders which start pulsing on an on-hook signal the tandem trunk is wired to give normal off-hook signal and to pick the sender with its polarity normally off-hook. The operation of relay 1409, by means of ground supplied through a cross-connection from one of the RV0 to RV9 terminals, either to the RVF terminal and through lead 1616, lead 1434, contact 1 of relay 1410 and the winding of relay 1409 to battery, or through connection from the RV0 to RV9 terminals, to terminal CVD and leads 1617, contact of relay 1414 and the winding of relay 1409 to battery, reverses the sender polarity to on-hook to start the pulsing. On an abandoned call the operation of relay 1410 releases relay 1409 which restores the sender polarity to its normal off-hook polarity, for this type of trunk, so that if reseized before the sender is released the originating sender will not receive a premature start-pulsing condition.

On operator class calls the trunk wiring is arranged to give off-hook tip and ring polarity, so that the operator's supervisory lamp is not lighted. The trunk wiring is also arranged so that the sender is picked with off-hook signal. Then relay 1409 operates to reverse the tip and ring leads 303 and 304 giving the on-hook signal to the operator. The lighted lamp, not shown, is her start-dialing signal. Either terminal RVF or CTD is cross-connected to one of the terminals RV0 to RV9 in this case.

If the call is abandoned before completion the operation of relay 1410 releases relay 1409 which restores the polarity of tip and ring to the original off-hook condition. If the trunk should now be reseized before the tandem sender has restored to normal, the second connection will receive off-hook supervision until the trunk makes a new sender connection. The operator will therefore have a dark lamp until the new sender is connected and has operated its relay 1409 to give the on-hook signal.

If a call is abandoned at the time the sender is associated with a marker, relay 1303 releases and relay 1410 is operated, but relay 1107 does not release, being held operated by a ground from the marker connector over leads 1146 and 1130 to battery through the winding of relay 1107 and also from ground through contact 6 of relay 1501, lead 1546, and lead 1310 through the winding of relay 1107 to battery. Relay 1505, the operating path of which extends through contact 3 of relay 1107, cannot operate, therefore, until the marker is released, and the sender does not proceed to release until this event.

The operation of relay 1505 upon the release of the marker, opens the battery connection from contact 3 of relay 1906, which has been traced through lead 1921, contact 1 of relay 1505, when closed, lead 1922 and lead 1920 into the marker connector. The sender will therefore not proceed to the seizure of a marker after relay 1505 operates on an abandoned call.

*Timing circuit*

The timing circuit will now be described and the manner of its operation in case of permanent signal, partial dial and stuck sender. Time is measured by a timing interrupter which has a twenty second cycle, closing its contact for ten seconds and breaking it for ten seconds.

*Measurement of time intervals*

Whenever ground is connected to interrupter 1710, in a manner to be described, relays 1703, 1704, 1706 and 1707 being normal, relay 1703 operates at once, or as soon as contact 1 of interrupter 1710 closes, over a circuit from contact of interrupter 1710, contact 5 of relay 1703, winding of relay 1703 and resistance 1740 to battery. The path from battery through resistance 1741, winding of relay 1704 and contact 5 of relay 1703 to ground through the contact of interrupter 1710 is shunted by a path through contact 3 of relay 1704 directly to the contact of interrupter 1710, so that the winding of relay 1703 is not energized and relay 1703 does not operate until the contact of interrupter 1710 opens, when ground is supplied through contact 4 of relay 1703 directly to the ground supply to interrupter 1710. Relay 1703 releases on the second closure of the contact of interrupter 1710, since the winding of relay 1703 is then shunted from ground through contact 4 of relay 1704. Relay 1703 releases on the second break of contact of interrupter 1710 since its path to ground through contact 4 of relay 1703 is open at this time as relay 1703 is released. An interval of forty seconds is provided by this cycle and it is repeated as long as ground is supplied to interrupter 1710.

Relay 1706 is operated over a path from the interrupter ground supply through contact 1 of relay 1704 when operated, contact 3 of relay 1706, winding of relay 1706 and resistance 1742 to battery. The winding of relay 1707 is shunted by this ground so that relay 1707 cannot operate while relay 1704 is operated. After relay 1706 operates, upon the succeeding release of relay 1704, relay 1707 operates from battery through resistance 1743, winding of relay 1707, contact 2 of relay 1706 to the interrupter ground supply. Relay 1706 operates in from zero to twenty seconds after the connection of the ground supply to interrupter 1710. Relay 1707 operates twenty seconds later and locks up and after twenty seconds more relay 1706 releases.

*Timing for dialing to start*

When the sender is seized and off-normal ground supply relay 1111 is operated the timing circuit starts to measure a period of from twenty to forty seconds. If the first digit is registered in that time the timing circuit is restored and starts again. Otherwise a reorder flash or tone is returned for ten seconds and then the trunk is set in the "no connection" condition and the sender is dismissed. If the sender fails to release within ten seconds the stuck sender lamp is brought in.

The ground supply for interrupter 1710 is furnished after the off-normal ground relay 1111 is operated, through its contact 2, lead 1135, lead 1321, lead 1737, contact 6 of relay 1701 and contact 8 of relay 1705, to the armature of interrupter 1710.

Figure 4:
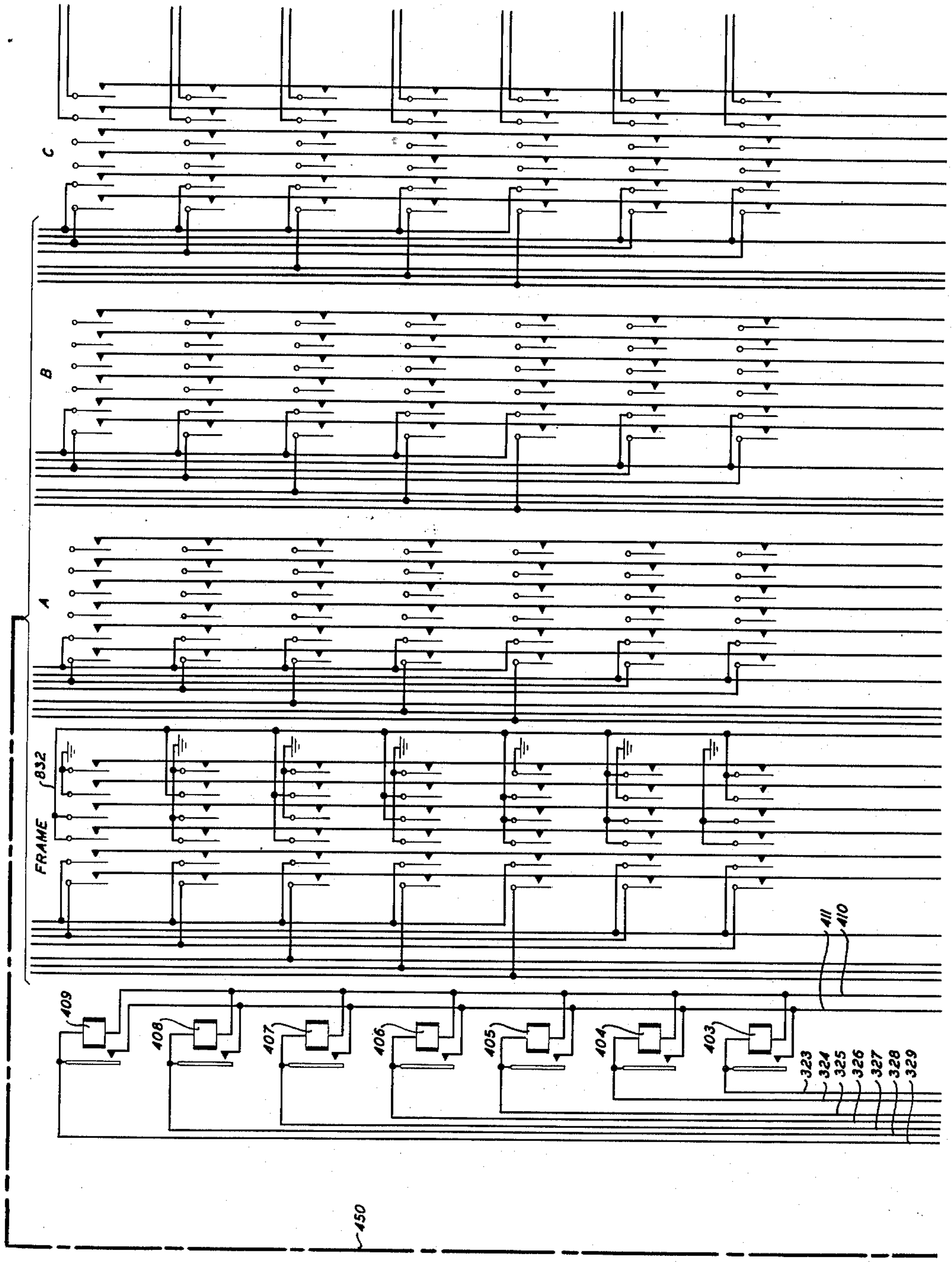
Figure 5:
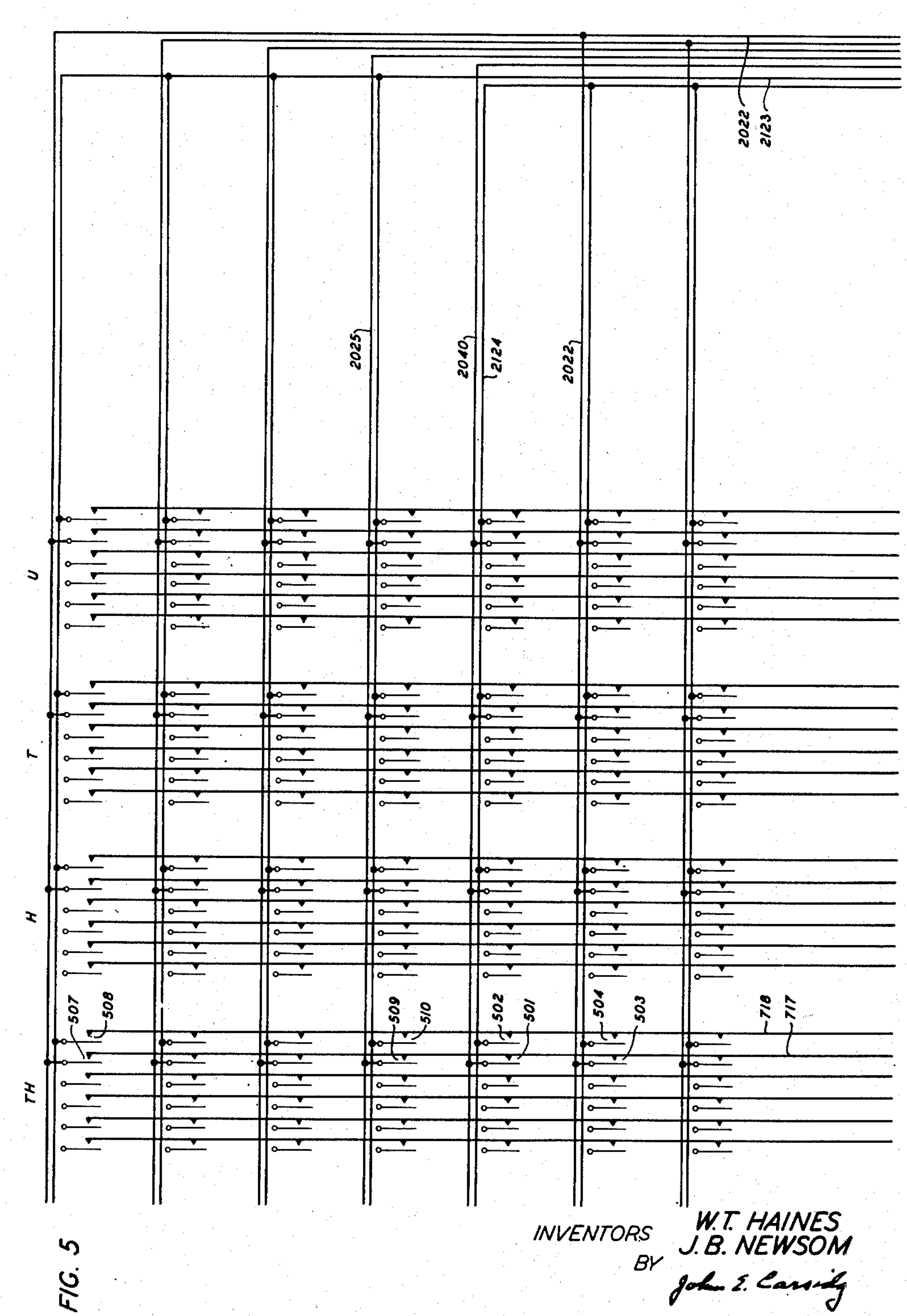

If a digit is dialed in time it registers on the "A" register in Fig. 4, and relay 1705 operates over a path traced through contact 1 of hold magnet 604 of the A register. Relay 1705 operated, locks up through its contact 5, lead 1737, lead 1321, lead 1135 and contact 2 of off-normal ground relay 1111 for the remainder of the duration of the connection. Relay 1705 when operated, by opening its contact 8, breaks ground from the interrupter 1710 and any operated relays of the timing group 1703, 1704, 1706 and 1707, thereupon release. When they are normal, relay 1802 operates, in a manner to be described, unless relay 1701 should be operated also in a manner to be described.

If a digit is not dialed in time, relay 1707 operates and locks. The operation of relay 1707 establishes a path from the off-normal ground traced through contact 8 of relay 1705, contact 7 of relay 1707, lead 1745, contact 5 of relay 1804 and the winding of relay 1801 to battery, operating relay 1801. The operation of relay 1801 establishes a circuit from battery through the winding of relay 1804, contact 2 of relay 1801, lead 1821 and lead 1737 which has been traced to ground on a contact of off-normal ground relay 1111. Relay 1804 operated, locks through its contact 8 to ground over lead 1821 and also closes a path from battery through the winding of relay 1414, contact 6 of relay 1410, lead 1822 and contact 1 of relay 1804 to contact 1 of interrupter 1806. When contact 1 of interrupter 1806 closes, this path is extended to ground operating relay 1414 in turn releasing relay 1409 if the path through its winding extends through the contact of relay 1414 as a result of the cross-connection of one of the RV0 to RV9 terminals to one of terminals CTD, RVF or RVG. The release of relay 1409 will reverse the battery connection to the sender tip and ring leads 303 and 304 extending to the originating end. The operation of relay 1804, by opening its contact 2, disconnects the pulsing lead extending from contact 1 of relay 1304 through contact 3 of relay 1303, and lead 1807 which was connected through lead 1517 and over a path heretofore traced to the contacts of relay 1205 and transfers this connection through contact 3 of relay 1304, lead 1824, and the winding of relay 1108 to battery, operating relay 1108. This is done in order to recognize an abandonment of the call during flashing when composite pulsing is employed. Relay 1108, being slow to operate, will not respond to the momentary opening of the tip and ring leads 303 and 304 when relay 1409 reverses the connections. However, when the call is abandoned the tip conductor 303 only is opened, the ring conductor 304 remaining grounded. Since relay 1303 is slow to release, during the flashing period when relay 1407 is released, relay 1108 is used. Relay 1108 will operate during this period and in turn will operate relay 1410 over a circuit from ground through contact 2 of relay 1111, lead 1135, contact 2 of relay 1108, lead 1144, and the winding of relay 1410 to battery. Relay 1108, through its contact 1, grounds lead 315 to prevent sender reseizure while relay 1108 is still operated.

The reorder signal may be reversals of the tip and ring as described above, interrupted tone or both as determined by the incoming class of service. As described under the heading "Cross connections of DT- and RV-terminals" reversals are provided, when required, by cross-connections from terminals "RV0–RV9" or "RVC" to one of terminals "CTD," "RVF" or "RVG" as determined by other requirements of that particular class of service. No reversals are sent when terminal "RVH" is used. Interrupted tone is sent to the originating end as a reorder signal as described also under the above-mentioned heading, when terminal "DT0–DT9" or "DTC" is cross-connected to either terminal "RO" or "DTRO." The tone supply is furnished to both the "RO" and "DTRO" terminals over a path through contact 1 of relay 1003, lead 1013, lead 1713, contact 4 of relay 1705, lead 1715, contact 3 of relay 607 and lead 1716 to parallel branches. One branch connects to lead 1717 which extends directly to terminal "DTRO." The other branch extends through lead 1718, contacts 8 and 7 of relay 1804, and lead 1826 to terminal "RO." Relay 1414 following the back contact closures of the interrupter, operates and releases relay 1409 directly, over lead 1615, if terminal "RVH" is used to provide the interruptions of the tone sent to the originating end.

If the sender is not released ten seconds after relays 1801 and 1804 operate, relay 1703 will operate and relay 1701 operates over a path from battery through the top winding of relay 1701, lead 1747, contact 1 of relay 1802, lead 1848, contact 6 of relay 1703, lead 1749, contact 4 of relay 1804, lead 1821 and leads 1737, 1321, 1135 and contact 2 of relay 1111 to ground. Relay 1701 operated, locks through its bottom winding and contact 5 to lead 1737 and the same ground. Relay 1701 operated, operates relay 1206 over a path from battery through the winding of relay 1206, lead 1240, contact 4 of relay 1301, lead 1340, lead 1831, contact 6 of relay 1805, lead 1832, contact 3 of relay 1004, lead 1023 and contact 1 of relay 1701 to ground. If the sender fails to release as a result of the operation of relay 1206, relay 1707 will release in ten seconds and light the stuck sender lamp, not shown, over a path which extends from ground through contact 5 of relay 1707, contact 4 of relay 1701 and lead 1751 which extends to the miscellaneous circuits on the sender make-busy frame.

*Timing for dialing to finish*

When the first digit has been dialed, the timing circuit starts again to measure a period of from twenty to forty seconds. If the units digit is registered in that time or the office code indicates no further dialing, the timing circuit is restored and starts again.

On the restoration of the timing circuit to normal, after the registration of the first digit, relay 1802 operates over a circuit from battery through the winding of relay 1802, contact 3 of relay 1803, lead 1753, contact 3 of relay 1703, contact 5 of relay 1704, contact 1 of relay 1706, contact 1 of relay 1707, contact 7 of relay 1705 and contact 6 of relay 1701 to lead 1737 from which point the circuit has been traced to ground on contact 2 of relay 1111. The operation of relay 1802 connects ground to the interrupted over a circuit from off-normal ground through lead 1737, contact 6 of relay 1701, lead 1836, contact 4 of relay 1802, and lead 1835 to the armature of the interrupter. This starts the timing relays 1703, 1704, 1706 and 1707 on another cycle.

If the units digit is dialed in time it registers on the units register "U" and relay 1803 is operated over a circuit from battery through the bottom winding of relay 1803, lead 1813, contact 1 of the units hold magnet 704, lead 709, lead 1122 and contact 3 of the off-normal ground, relay 1111 and remains operated for the remainder of the connection. When dialing is completed on an operator call without numerical digits, relay 1504 is operated and operates relay 1803 over a circuit from off-normal ground through lead 1122, contact 4 of relay 1505, contact 5 of relay 1504, lead 1813 and the bottom winding of relay 1803 to battery. Relay 1803 remains operated for the remainder of the connection. Relay 1803 operated, by opening its contact 4, breaks ground from the interrupter and any operated timing relays which later release. When the timing relays are all normal, relay 1805 operates from battery through the winding of relay 1805, and contact 3 of relay 1803 to lead 1753 which has been traced through the contacts of the timing relays when they are in the released condition and contact 6 of relay 1701 to off-normal ground. Relay 1805 remains operated for the remainder of the connection unless relay 1701 should operate.

If dialing is not completed in time, relay 1707 operates and locks and in turn operates relay 1801. Relay 1801 operated, operates relay 1804. The operation of relay 1804 results in the transmission of a reorder signal, all as heretofore described. The operation of relay 1801 also operates the partial dial register, not shown, from ground through contact 5 of relay 1802, contact 1 of relay 1801, and contact 2 of relay 1805 to the miscellaneous circuits on the sender make-busy frame. The timing continues and if the originating end does not release the sender in twenty seconds, the following operations are effected.

Relay 1703 operates followed by the operation of relay 1704. Then relay 1505 operates over a path from battery through the winding of relay 1505, lead 1538, lead 1750, contact 2 of relay 1703, contact 6 of relay 1704, lead 1756, contact 2 of relay 1802, contact 4 of relay 1804, lead 1821 and lead 1737 to off-normal ground. Relay 1505 operated, in turn operates relay 1206 from battery through the winding of relay 1206, lead 1240, contact 4 of relay 1301, lead 1340 and contact 5 of relay 1505 to ground. This causes the release of the sender and sets the trunk in the "no connection" condition.

If the sender is not released in ten seconds, relay 1703 releases and operates relay 1701 over a path from battery through the top winding of relay 1701, contact 1 of relay 1703, contact 6 of relay 1704, lead 1756, contact 2 of relay 1802, contact 10 of relay 1804 and lead 1821 which connects to lead 1737 and extends to off-normal ground. The operation of relay 1703 establishes another path for the operation of relay 1206 from battery through the winding of relay 1206, lead 1240, contact 4 of relay 1301, lead 1340, lead 1831, contact 6 of relay 1805, lead 1832, contact 3 of relay 1004, lead 1023 and contact 1 of relay 1701 to ground. If the operation of relay 1206 is not effective in releasing the sender in ten seconds the stuck sender lamp lights.

*Stuck sender*

When dialing has been completed, the timing circuit starts again to measure a period of from twenty to forty seconds. If the call is not disposed of, the sender transmits the reorder signal to the originating end for twenty seconds.

When relay 1805 operates on the restoration of the timing circuit after the completion of dialing, it grounds the interrupter and so starts the timing relay group on another cycle. The path for the ground supply to the interrupter for this condition is from off-normal ground through lead 1737, contact 6 of relay 1701, lead 1836, contacts 4 and 3 of relay 1805 and lead 1835 to the armature of interrupter 1710.

If the sender is not released within twenty to forty seconds, relay 1707 operates and locks and in turn operates relay 1801. Relay 1801 in turn operates relay 1804. Relay 1804, operated, sends reorder signals. Relay 1801 operates the stuck sender register all as described heretofore. The timing continues and if the sender is not released in twenty seconds, relay 1505 operates in turn operating relay 1206 to set the trunk in the "no connection" condition and releases the sender. In ten seconds relay 1701 operates and if the sender is not released in ten seconds more relay 1704 releases, releasing relay 1707 and lighting the stuck sender lamp.

*Automatic priming of stuck sender cancelled*

If it is desired to cancel the automatic priming feature for stuck sender conditions, in order to trace trouble, the cancel priming key is operated at the make-busy frame (not shown). Operation of this key transfers the path which extends from ground on contact 1 of relay 1701, through lead 1023, contact 3 of relay 1004, lead 1832 and contact 6 of relay 1805, which operates relay 1206, from the remainder of the path through the winding of relay 1206 and connects it to lead 1026 which extends through the winding of relay 1004 to battery. If all digits have been registered as indicated by the operation of relay 1805, then when the sender reaches the stuck sender position, relay 1701 operates, in turn operating relay 1004. Relay 1004 when operated, locks under control of the cancel priming key and opens lead 1320 which extended through contact 2 of relay 1302 and lead 310 thereby breaking down the connections between it and the sender. The sender is held and the stuck sender lamp is lighted. If a stuck sender condition is reached but all digits have not been dialed, then relay 1206 operates over a path through contact 6 of relay 1805 and the sender releases just as though the priming key had not been operated.

What is claimed is:

1. In a telephone system, a tandem sender having coding relays operated responsive to the reception of a number, $n$, trains of pulses, where the total number of trains of pulses to be received at a particular time may be $n$ or $(n+1)$ trains of pulses, a mechanism in said sender operative after the reception of the final pulse of either said $n$ trains of pulses or said $(n+1)$ trains of pulses, and a time measuring device operated responsive to said relays for introducing a delay after the reception of the $n$th train of pulses to provide time for the reception of said $(n+1)$th train of pulses before operating said mechanism and relay means responsive to said time measuring device for operating said mechanism after said delay.

2. In a telephone system, a sender having a first switching element required to be operated after the reception of the pulses defining the last digit of a train of digits, which train may comprise different numbers of digits at a particular time, electromechanical means in said sender operated responsive to the reception of pulses defining the last digit of a train having a fewer number of digits than the maximum number of digits receivable at said time, a second switching element operated responsive to said electromechanical element for conditioning said sender to await pulses defining said maximum number of digits before actuating said first element, and other electromechanical means responsive to said second switching element for thereafter actuating said first switching element.

3. In a telephone system, a sender, register and coding relays therein, said coding relays operated responsive to pulses received by said register, a first relay in said sender operable by said coding relays in response to the reception by said register of pulses defining a first number, $n$, of digits, if no more than $n$ digits are to be defined in a particular cycle, said first relay operable by said coding relays also in response to the reception by said register of pulses defining a second number, $n1$, of digits, greater than $n$, during said cycle, and a delay mechanism selectively operable by said coding relays in said sender responsive to the reception of pulses defining said $n$ digits for delaying the operation of said first relay to determine if pulses defining said $n1$ digits are to be received by said register.

4. In a telephone system, a sender having a register therein, a plurality of individual sections, including an intermediate section and a final section, in said register for successively registering individually a plurality of trains of pulses incoming to said sender, a circuit in said sender including a delay mechanism connectable to said intermediate section, said circuit operable upon the operation of said intermediate section, a relay in said sender operable upon the reception by said sender of the pulses defining the final digit of a train of digits, said delay mechanism delaying the operation of said relay, a first connection from said circuit to said relay so as to operate said relay after said delay and a second connection from said final section to said relay so as to operate said relay without delay.

5. In a telephone system, a sender, means for impressing either $n$ or $n1$ trains of pulses on said sender as separate independent complete codes, where $n$ and $n1$ are two different integers and $n$ is smaller than $n1$, and a delay mechanism in said sender operable upon the reception of said $n$ trains, so as to await the possible reception of said $n1$ trains.

6. In a telephone system, a tandem step-by-step sender, a first relay means in said sender operative in response to the reception of three-digit straightforward code pulses only, for terminating the reception of pulses incoming to said sender, a second relay means in said sender operative in response to the reception of three-digit special service codes, 11X, where X is any digit from 2 to 9, both inclusive, for terminating the reception of pulses incoming to said sender, a third relay means in said sender operative in response to the reception of six-digit codes for terminating the reception of pulses incoming to said sender, a fourth relay means in said sender operative in response to the reception of seven-digit codes for terminating the reception of pulses incoming to said sender, and a fifth relay means operative in response to the reception of either six-digit or seven-digit codes on a particular cycle of operation of said sender for terminating the reception of pulses by said sender.

7. In a telephone system, a sender, a first relay means in said sender operative in response to the reception of the final incoming digit in any cycle of operation of said sender, for initiating outpulsing by said sender, a register in said sender, a first individual section in said register for registering the sixth digit of a train of six incoming digits in a first cycle of operation of said sender, a second individual section in said register for registering the seventh digit of a train of seven incoming digits in a second cycle of operation of said sender, said first and said second section registering also the sixth digit of a train of six incoming digits or the seventh digit of a train of seven incoming digits, respectively, in a third cycle of operation of said sender when either six or seven digits may be received, and other relay means including relays individual to said first and said second section and relays common to said first and said second section, for operating said first relay means without delay when seven digits are received and with or without delay when six digits are received, dependent upon whether a seventh digit may be expected.

8. In a telephone system, a sender, a marker, means, including a register in said sender, operative in response to the reception of a portion of a group of trains of pulses by said register, of a particular code, for connecting said sender to said marker, switching elements in said sender to indicate to said sender that either of two different numbers of trains of pulses may be subsequently received by said sender before said code is completed and means extending from said marker to said sender for operating said switching elements.

9. In a telephone system, a sender, office code switching mechanism in said sender, a marker, means in said sender responsive to the operation of said office code switching mechanism for establishing first selective connections from said sender to said marker, relays in said sender responsive thereafter to the establishing of second selective connections from said marker to said sender for conditioning said sender to receive a number of trains of pulses, and other means including a delay mechanism in said sender, said other means and said delay mechanism both connected to said office code switching mechanism, for thereafter introducing a delay, after the reception of the last of said trains, before said sender proceeds.

10. In a telephone system, a sender, a register in said sender having a first individual section and a second individual section, a switching element in said sender to condition said sender to proceed with outpulsing, said switching mechanism operative after the reception by said register of pulses defining the final digit of a train of digits incoming to said sender, a first circuit interconnecting said first individual section of said register to said element to operate said element without delay in response to the operation of said first section, a second circuit connecting said second individual section of said register to said element, a delay mechanism in said second circuit, for introducing a delay after the operation of said second section before said element is operated and means interconnecting said circuits responsive to the operation of said first section, within a predetermined interval after said second section operates for disabling said delay mechanism and operating said switching element.

11. In a telephone system, a sender having a register, a plurality of individual sections in said register, an outpulsing circuit, a set of selection steering relays for interconnecting said circuit to said individual sections and selection steering control relays for actuating said selection steering relays, so as to shift the connection of said outpulsing circuit to different individual sections in said register at different times dependent upon the number of individual trains of pulses received by said sender in a particular code.

12. In a telephone system, a tandem sender, means in said sender comprising a first group of relays responsive to a first group of trains of pulses impressed on said sender from an originating office at a first time, for completing a first call to step-by-step selectors connected to said sender at said first time, means in said sender comprising a second group of relays responsive to a second group of trains of pulses impressed on said sender at a second time, for completing a second call through a terminating sender at a distant office at said second time and relay control means in said sender, connected to said first group and to said second group of relays, for discriminating between said first pulses and said second pulses, so as to actuate said first group of relays at said first time and said second group of relays at said second time respectively.

13. In a telephone system, an originating central office connected to a tandem office, a step-by-step sender in said tandem office, a first regular step-by-step central office and a second central office having a terminating sender, a first and a second trunk connecting said tandem office and said first and second central office individually, a first group of relays in said sender responsive to a first group of trains of pulses generated in said originating office at a first time, for interconnecting said originating office through said tandem office and said first trunk to said first step-by-step central office at said first time, a second group of relays in said sender, responsive to a second group of trains of pulses generated in said originating office at a second time, for interconnecting said originating office through said tandem office and said second trunk to said terminating sender in said second central office at said second time and relay control means in said sender, connected to said first group of relays and to said second group of relays for discriminating between said first pulses and said second pulses, so as to actuate said first group of relays at said first time and said second group of relays at said second time.

14. A telephone system in accordance with claim 13, and means comprising a polar relay in said sender responsive to a condition imposed on said relay from said second office for initiating pulsing to said terminating sender.

15. In a telephone system, a tandem office, a tandem sender in said office, step-by-step selectors, a first trunk connecting said tandem office to said selectors, a terminating sender, a second trunk connecting said tandem office to said terminating sender, first relay means in said sender for extending a calling connection through said first trunk to said selectors at a first time, second relay means in said sender for extending a calling connection through said second trunk to said terminating sender at a second time, a pulsing loop in said tandem sender, delay means in said second relay means for delaying the closing of said loop to said second trunk, to permit the release of terminating equipment, when said second trunk has been seized immediately after its release from a previous connection and control means in said tandem sender discriminating between different pulse codes impressed on said tandem sender to selectively operate said first relay means or said second relay means at said first and said second times respectively.

16. In a telephone system, a sender, an incoming trunk connected to said sender, a register in said sender, a plurality of switches in said register for recording a plurality of trains of pulses, incoming through said trunk, defining a multi-digit number, a marker connectable to said sender, a plurality of coding relays in said sender for defining another digit, means connecting said marker and said coding relays for operating said coding relays in various combinations to define said other digit, an outpulsing circuit, circuit means interconnecting said register, said coding relay and said outpulsing circuit, and control means for said circuit means for outpulsing pulse trains corresponding to said multi-digit number and said other digit.

WILLIAM T. HAINES.
JAMES B. NEWSOM.

REFERENCES CITED

The following references are of record in the file of this patent:

UNITED STATES PATENTS

| Number | Name | Date |
|---|---|---|
| 2,341,746 | Taylor | Feb. 15, 1944 |